(12) United States Patent
Inou et al.

(10) Patent No.: US 12,014,011 B2
(45) Date of Patent: Jun. 18, 2024

(54) CONDUCTIVE FILM, SENSOR, TOUCH PANEL, IMAGE DISPLAY DEVICE, AND CONDUCTIVE FILM WITH PROTECTION FILM

(71) Applicant: DAI NIPPON PRINTING CO., LTD., Tokyo (JP)

(72) Inventors: Masataka Inou, Tokyo (JP); Shoichiro Ogumi, Tokyo (JP); Yuji Shimizu, Tokyo (JP); Hiroaki Mutou, Tokyo (JP); Ryota Kitayama, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 911 days.

(21) Appl. No.: 16/957,940

(22) PCT Filed: Dec. 25, 2018

(86) PCT No.: PCT/JP2018/047666
§ 371 (c)(1),
(2) Date: Jun. 25, 2020

(87) PCT Pub. No.: WO2019/131679
PCT Pub. Date: Jul. 4, 2019

(65) Prior Publication Data
US 2021/0064164 A1    Mar. 4, 2021

(30) Foreign Application Priority Data

Dec. 25, 2017 (JP) ................................. 2017-247306
Dec. 28, 2017 (JP) ................................. 2017-254135

(51) Int. Cl.
| | | |
|---|---|---|
| *B32B 27/08* | (2006.01) | |
| *B32B 7/025* | (2019.01) | |
| *B32B 27/28* | (2006.01) | |
| *B32B 27/32* | (2006.01) | |
| *B32B 27/36* | (2006.01) | |
| *G06F 3/041* | (2006.01) | |
| *G06F 3/044* | (2006.01) | |
| *H01B 5/14* | (2006.01) | |

(52) U.S. Cl.
CPC .............. *G06F 3/044* (2013.01); *B32B 7/025* (2019.01); *B32B 27/08* (2013.01); *B32B 27/281* (2013.01); *B32B 27/325* (2013.01); *B32B 27/36* (2013.01); *G06F 3/0412* (2013.01); *H01B 5/14* (2013.01); *B32B 2255/26* (2013.01); *B32B 2262/10* (2013.01); *B32B 2264/10* (2013.01); *B32B 2307/202* (2013.01); *B32B 2457/208* (2013.01)

(58) Field of Classification Search
None
See application file for complete search history.

(56) References Cited

U.S. PATENT DOCUMENTS

| | | | |
|---|---|---|---|
| 2003/0017328 A1 | 1/2003 | Noue et al. | |
| 2004/0028936 A1 | 2/2004 | Kogiso et al. | |
| 2007/0284590 A1* | 12/2007 | Goto | ........................ H01L 33/42 257/79 |
| 2014/0055373 A1* | 2/2014 | Powell | ................ G02F 1/13363 345/173 |
| 2015/0004327 A1* | 1/2015 | Yamamoto | ................ H05K 1/11 174/253 |
| 2015/0200037 A1 | 7/2015 | Inoue | |
| 2015/0290908 A1 | 10/2015 | Haruta et al. | |
| 2016/0040023 A1 | 2/2016 | Ishii et al. | |
| 2017/0003774 A1 | 1/2017 | Iwata et al. | |
| 2017/0062094 A1 | 3/2017 | Fujino et al. | |
| 2017/0139514 A1 | 5/2017 | Kim et al. | |
| 2017/0205917 A1 | 7/2017 | Yamaoka et al. | |
| 2019/0302925 A1 | 10/2019 | Ogumi et al. | |

FOREIGN PATENT DOCUMENTS

| | | |
|---|---|---|
| CN | 1366681 | 8/2002 |
| CN | 104718580 | 6/2015 |
| CN | 104795132 | 7/2015 |
| CN | 105814646 | 7/2016 |
| JP | 2001-332132 | 11/2001 |
| JP | 2002-266007 | 9/2002 |
| JP | 2004-149871 | 5/2004 |
| JP | 2006-233252 | 9/2006 |

(Continued)

OTHER PUBLICATIONS

International Preliminary Report on Patentability, issued in the corresponding PCT Application No. PCT/JP2018/047666, dated Jun. 30, 2020, 20 pages.

(Continued)

*Primary Examiner* — Sheeba Ahmed
(74) *Attorney, Agent, or Firm* — HSML P.C.

(57) ABSTRACT

An aspect of the present invention provides an electroconductive film 10 including a first electroconductive part 11 and a second electroconductive part 14, wherein the surface 14A of the second electroconductive part 14 forms at least a part of the surface 10A of the electroconductive film 10, the surface 11A of the first electroconductive part 11 forms at least a part of the back face 10B of the electroconductive film 10, the first electroconductive part 11 and the second electroconductive part 14 each contain electroconductive fibers 15 and 17, and the surface resistance value of the second electroconductive part 14 is within ±30% of the surface resistance value of the first electroconductive part 11.

24 Claims, 13 Drawing Sheets

(56) References Cited

FOREIGN PATENT DOCUMENTS

| | | |
|---|---|---|
| JP | 2013-242692 | 12/2013 |
| JP | 2014-208469 | 11/2014 |
| JP | 2014-208471 | 11/2014 |
| JP | 2015-34279 | 2/2015 |
| JP | 2015-068674 | 4/2015 |
| JP | 2015-100979 | 6/2015 |
| JP | 2015-135741 | 7/2015 |
| JP | 2015-184994 | 10/2015 |
| JP | 2015-203073 | 11/2015 |
| JP | 2016-130922 | 7/2016 |
| JP | 2017-92036 | 5/2017 |
| JP | 2017-217885 | 12/2017 |
| JP | 2017-228353 | 12/2017 |
| JP | 2018-160448 | 10/2018 |
| TW | 201731678 | 9/2017 |
| WO | 2013/140971 | 9/2013 |
| WO | 2014/087847 | 6/2014 |
| WO | 2014/097818 | 6/2014 |
| WO | 2014/098013 | 6/2014 |
| WO | 2014/136701 | 9/2014 |
| WO | 2015/146097 | 10/2015 |

OTHER PUBLICATIONS

International Search Report, issued in the corresponding PCT Application No. PCT/JP2018/047666, dated Mar. 12, 2019, 9 pages.
First Chinese Office Action, issued in the corresponding Chinese patent application No. 201880089299.9, dated May 27, 2021, 19 pages.

* cited by examiner

CONDUCTIVE FILM, SENSOR, TOUCH PANEL, IMAGE DISPLAY DEVICE, AND CONDUCTIVE FILM WITH PROTECTION FILM

CROSS-REFERENCE TO RELATED APPLICATION

The present application enjoys the benefit of priority to the prior Japanese Patent Application Nos. 2017-247306 (filed on Dec. 25, 2017) and 2017-254135 (filed on Dec. 28, 2017), the entire disclosures of which are incorporated herein by reference.

TECHNICAL FIELD

The present invention relates to electroconductive films, sensors, touch panels, image display devices, and electroconductive films with a protective film.

BACKGROUND ART

Electroconductive films have conventionally been utilized widely for touch panels and the like. An electroconductive film includes a light-transmitting base material and an electroconductive part provided on one face of the light-transmitting base material, and indium tin oxide (ITO) is mainly used for the electroconductive part of the electroconductive film.

However, there is a problem in that ITO lacks flexibility, and an electroconductive part formed using ITO is thus prone to crack in cases where a flexible base material is used as the light-transmitting base material.

In view of this, metallic nanowire such as silver nanowire is currently studied as a substitute for ITO to form the electroconductive part (see, for example, Patent Literature 1).

Using an electroconductive film as an electrostatic capacitive touch panel requires an electrode line in the X direction and an electrode line in the Y direction, and thus results in using two superposed electroconductive films. However, using two superposed electroconductive films results in increasing the thickness of the touch panel. Because of this, using an electroconductive film having electroconductive parts on both faces thereof is under study in an attempt to thin the touch panel.

CITATION LIST

Patent Literature

Patent Literature 1: JP2015-68674A

SUMMARY OF THE INVENTION

However, in cases where electroconductive parts containing metallic nanowires are formed on both faces of an electroconductive film, the electrical resistance value of one electroconductive part is extremely larger than the electrical resistance value of the other electroconductive part, even if both electroconductive parts are formed in the same manner.

Additionally, electroconductive films including electroconductive parts containing metallic nanowires are heated in post-processes in some cases. For example, in order that electrical lead-out lines can be formed on the surface of an electroconductive part using a silver paste, the silver paste is applied to the surface of the electroconductive part, and then, the electroconductive film is heated to 130° C. to fire the silver paste, but heating the electroconductive film at such a temperature causes the light-transmitting base material to undergo thermal shrinkage, generating wiring failure, and for this reason, the electroconductive film is first heated to 150° C. to allow the light-transmitting base material to undergo thermal shrinkage preliminarily, followed by applying silver paste to the film and heating the film to 130° C. to fire the silver paste. In general, a protective film is peelably adhered to the surface of an electroconductive part so that the surface of the electroconductive part can be prevented from being scratched and/or that it can be made easy to wind up the electroconductive film, but heating the electroconductive film with the protective film adhered to the electroconductive film will unfavorably cause the electroconductive film to be curled. This is marked particularly in cases where the light-transmitting base material has a small thickness.

The present invention is made in order to solve the above-mentioned problems. In other words, an object of the present invention is to provide: an electroconductive film having a decreased difference between the electrical resistance value of a first electroconductive part and the electrical resistance value of a second electroconductive part; and a sensor, touch panel, and image display device that include the electroconductive film. Another object is to provide an electroconductive film with a protective film, wherein the electroconductive film can undergo decreased curl during heating.

The present invention includes the following inventions.

[1] An electroconductive film including a first electroconductive part and a second electroconductive part, wherein the surface of the second electroconductive part forms at least a part of the surface of the electroconductive film, the surface of the first electroconductive part forms at least a part of the back face of the electroconductive film, the first electroconductive part and the second electroconductive part each contain electroconductive fibers, and the surface resistance value of the second electroconductive part is within ±30% of the surface resistance value of the first electroconductive part.

[2] An electroconductive film including a first electroconductive part and a second electroconductive part, wherein the surface of the second electroconductive part forms at least a part of the surface of the electroconductive film, the surface of the first electroconductive part forms at least a part of the back face of the electroconductive film, the first electroconductive part and the second electroconductive part each contain electroconductive fibers, and the line resistance value of the second electroconductive part is within ±30% of the line resistance value of the first electroconductive part, wherein the line resistance value of each of the first electroconductive part and the second electroconductive part is measured on a piece having a size 5 mm wide and 100 mm long cut out of the electroconductive film.

[3] The electroconductive film according to [1] or [2], further including a resin layer and a light-transmitting base material in this order from the first electroconductive part toward the second electroconductive part between the first electroconductive part and the second electroconductive part.

[4] The electroconductive film according to [3], wherein the light-transmitting base material includes an underlayer on one face thereof, and the resin layer is adjacent to the underlayer.

[5] The electroconductive film according to [3], wherein the light-transmitting base material contains a cycloolefin polymer resin, and the light-transmitting base material has a thickness of 45 μm or less.

[6] The electroconductive film according to [3], wherein the light-transmitting base material contains a polyester resin, and the light-transmitting base material has a thickness of 45 μm or less.

[7] The electroconductive film according to [3], wherein the light-transmitting base material contains at least one of a polyimide resin, a polyamide resin, and a polyamideimide resin, and the light-transmitting base material has a thickness of 75 μm or less.

[8] The electroconductive film according to any one of [5] to [7], wherein the ratio of the electrical resistance value of the first electroconductive part after a successive foldability test to the electrical resistance value of the first electroconductive part before the successive foldability test is 3 or less, and the ratio of the electrical resistance value of the second electroconductive part after the successive foldability test to the electrical resistance value of the second electroconductive part before the successive foldability test is 3 or less, and the successive foldability test is carried out by repeating, one hundred thousand times, a process in which the electroconductive film with the first electroconductive part facing inward is folded by 180 degrees so as to leave a gap of 4 mm between the opposite edges of the electroconductive film and then unfolded.

[9] The electroconductive film according to any one of [1] to [8], wherein the electroconductive film has a haze value of 5% or less.

[10] The electroconductive film according to any one of [1] to [9], wherein the electroconductive film has a total light transmittance of 80% or more.

[11] A sensor including the electroconductive film according to any one of [1] to [10].

[12] A touch panel including the electroconductive film according to any one of [1] to [11].

[13] An image display device including the touch panel according to [12].

[14] An electroconductive film with a protective film, including an electroconductive film and a first protective film peelably provided on at least one face of the electroconductive film, wherein the electroconductive film includes a light-transmitting base material, a first electroconductive part provided on a first face of the light-transmitting base material and containing electroconductive fibers, and a second electroconductive part provided on a second face of the light-transmitting base material opposite from the first face and containing electroconductive fibers, and wherein the first protective film is a heat-resistant protective film, and the amount of a curl of the electroconductive film with the protective film is within ±14 mm when the electroconductive film with the protective film is heated at 150° C. for 60 minutes.

[15] The electroconductive film with the protective film according to [14], wherein, when the first protective film is peeled away from the electroconductive film with the protective film, and the electroconductive film and the first protective film are each heated at 150° C. for 60 minutes, the absolute value of a difference between the thermal shrinkage ratio of the first protective film in a first direction and the thermal shrinkage ratio of the light-transmitting base material in the first direction is 0.3% or less, and the absolute value of a difference between the thermal shrinkage ratio of the first protective film in a second direction and the thermal shrinkage ratio of the light-transmitting base material in the second direction is 0.3% or less, wherein the first direction is any direction within the surface of the electroconductive film with the protective film, and the second direction is a direction orthogonal to the first direction within the surface of the electroconductive film with the protective film.

[16] The electroconductive film with the protective film according to [14] or [15], wherein the thickness of the first protective film is 300% or less of the thickness of the light-transmitting base material.

[17] The electroconductive film with the protective film according to any one of [14] to [16], wherein the first protective film is provided on the surface of the first electroconductive part, and the electroconductive film with the protective film further comprises a second protective film that is a non-heat-resistant protective film provided on the surface of the second electroconductive part.

[18] The electroconductive film with the protective film according to any one of [14] to [17], wherein the surface resistance value of the second electroconductive part is within ±30% of the surface resistance value of the first electroconductive part.

[19] The electroconductive film with the protective film according to any one of [14] to [18], further including a resin layer provided between the light-transmitting base material and the first electroconductive part.

[20] The electroconductive film with the protective film according to any one of [14] to [19], wherein the light-transmitting base material contains a cycloolefin polymer resin, and the light-transmitting base material has a thickness of 45 μm or less.

[21] The electroconductive film with the protective film according to any one of [14] to [19], wherein the light-transmitting base material contains a polyester resin, and the light-transmitting base material has a thickness of 45 μm or less.

[22] The electroconductive film with the protective film according to [14] to [19], wherein the light-transmitting base material contains at least one of a polyimide resin, a polyamide resin, and a polyamideimide resin, and the light-transmitting base material has a thickness of 75 μm or less.

[23] The electroconductive film according to any one of [20] to [22], wherein the ratio of the electrical resistance value of the first electroconductive part after a successive foldability test to the electrical resistance value of the first electroconductive part before the successive foldability test is 3 or less, and the ratio of the electrical resistance value of the second electroconductive part after the successive foldability test to the electrical resistance value of the second electroconductive part before the successive foldability test is 3 or less, and wherein the successive foldability test is carried out by repeating, one hundred thousand times, a process in which the electroconductive film with the first electroconductive part facing inward is folded by 180 degrees so as to leave a gap of 4 mm between the opposite edges of the electroconductive film and then unfolded.

[24] A method of producing an electroconductive film, including the steps of: forming a resin layer on a first face of a light-transmitting base material; forming a second electroconductive part containing electroconductive fibers on a second face of the light-transmitting base material opposite from the first face after the resin layer is formed; and forming a first electroconductive part containing electroconductive fibers on the surface of the resin layer after the second electroconductive part is formed.

An aspect of the present invention can provide: an electroconductive film having a decreased difference between the electrical resistance value of a first electroconductive part and the electrical resistance value of a second electroconductive part; and a touch panel and an image display device that include such an electroconductive film.

Another aspect of the present invention can provide an electroconductive film with a protective film, wherein the electroconductive film can undergo decreased curl during heating.

DESCRIPTION OF EMBODIMENTS

First Embodiment

Figure 1:
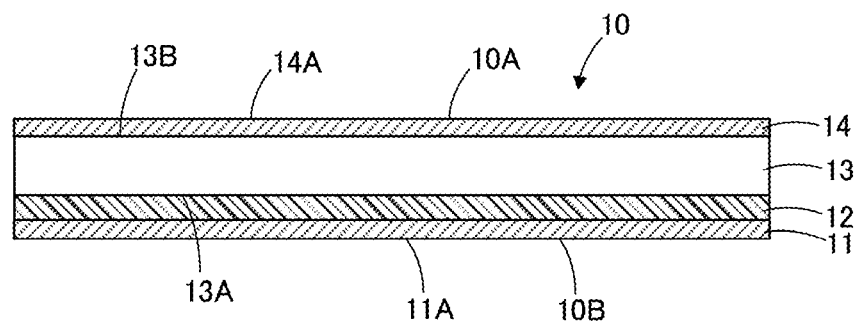
FIG. 1 depicts a schematic diagram of an electroconductive film according to a first embodiment.
Figure 2:
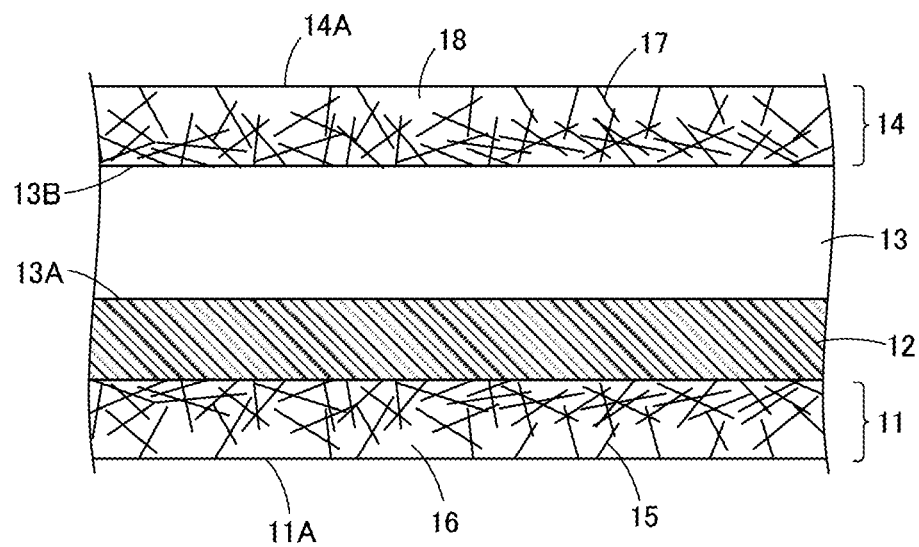
FIG. 2 depicts an enlarged view of a part of the electroconductive film shown in FIG. 1.
Figure 3A:
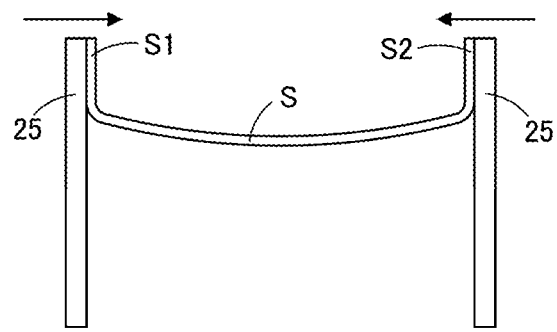
FIG. 3(A) to FIG. 3(C) schematically illustrate the steps of the successive foldability test.
Figure 4:
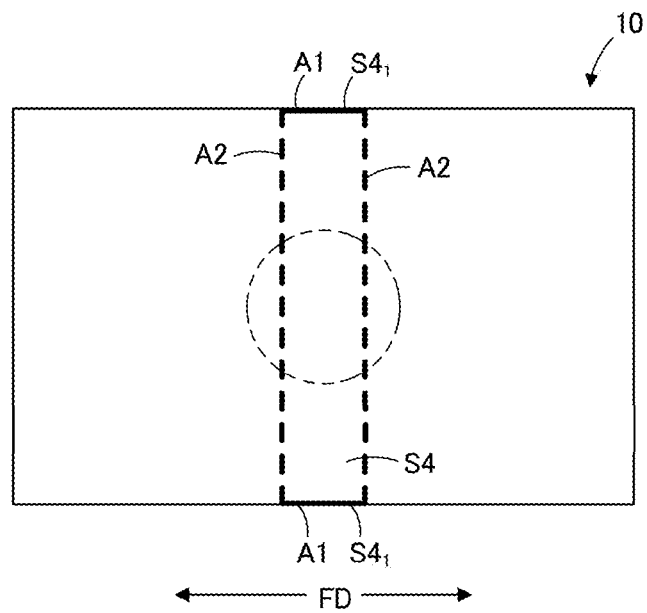
FIG. 4 is a plane view of the electroconductive film after the successive foldability test.
Figure 5:
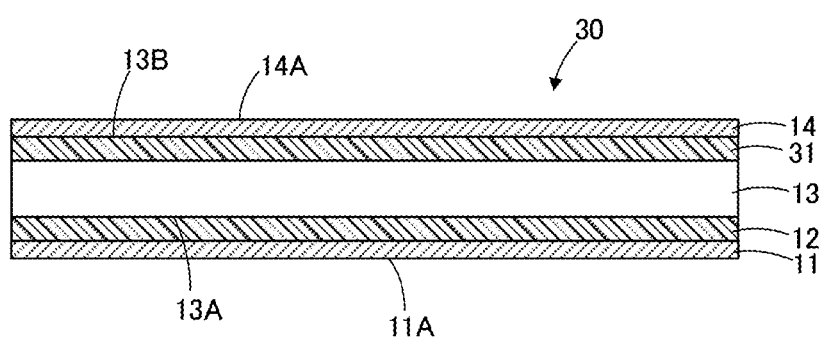
FIG. 5 depicts a schematic diagram of another electroconductive film according to the first embodiment.
Figure 6:
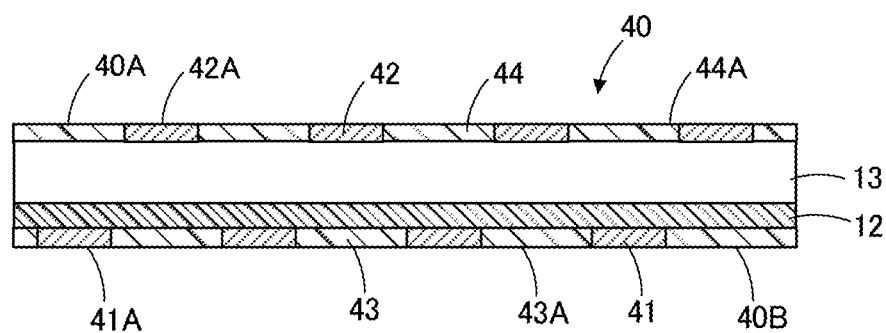
FIG. 6 depicts a schematic diagram of another electroconductive film according to the first embodiment.
Figure 7:
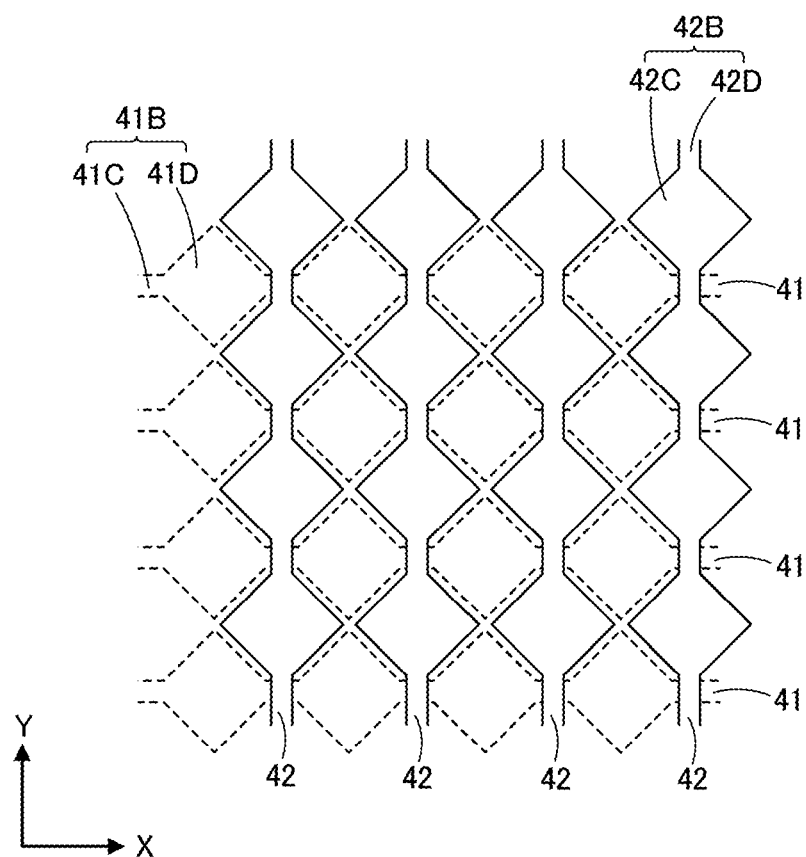
FIG. 7 depicts a schematic plane view of the electroconductive film shown in FIG. 6.
Figure 8:
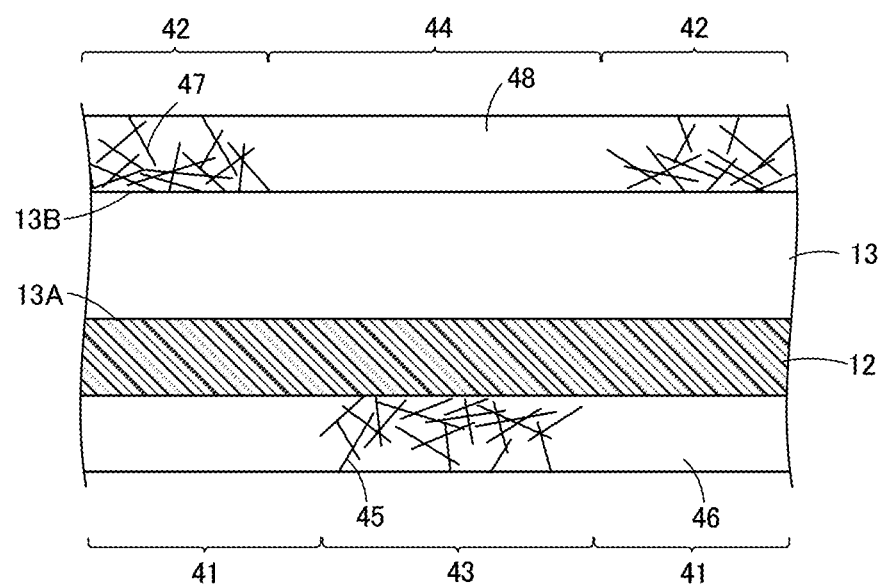
FIG. 8 depicts an enlarged view of a part of the electroconductive film shown in FIG. 6.

An electroconductive film, touch panel, and image display device according to a first embodiment of the present invention will be described below with reference to the drawings. FIG. 1 depicts a schematic diagram of an electroconductive film according to the present embodiment; FIG. 2 depicts an enlarged view of a part of the electroconductive film shown in FIG. 1; FIG. 3 schematically illustrates the steps of a successive foldability test; and FIG. 4 is a plane view of the electroconductive film after the successive foldability test. FIGS. 5 and 6 depict schematic diagrams of other electroconductive films according to the embodiment; FIG. 7 depicts a schematic plane view of the electroconductive film shown in FIG. 6; and FIG. 8 depicts an enlarged view of a part of the electroconductive film shown in FIG. 6. FIGS. 9 to 12 schematically illustrate the process for producing the electroconductive film according to the present embodiment.

<<<Electroconductive Film>>>

The electroconductive film 10 shown in FIG. 1 includes a first electroconductive part 11 (hereinafter, optionally referred to simply as the "electroconductive part 11"), a resin layer 12, a light-transmitting base material 13, and a second electroconductive part 14 (hereinafter, optionally referred to simply as the "electroconductive part 14") in this order. The term "light-transmitting" as used herein refers to a property that causes light to be transmitted. Additionally, the term "light-transmitting" does not necessarily refer to transparency and may refer to translucency. The first electroconductive part 11 and the second electroconductive part 14 are not yet patterned and are layered. As used herein, the "electroconductive part" means a portion being capable of conducting electricity from the surface, and the concept includes both layered and non-layered structures.

The surface 10A of the electroconductive film 10 is formed by the surface 14A of the second electroconductive part 14, and the back face 10B that is the opposite side of the electroconductive film 10 from the surface 10A is formed by the surface 11A of the first electroconductive part 11. Forming the surface 10A of the electroconductive film 10 by the second electroconductive part 14 and forming the back face 10B of the electroconductive film 10 by the first electroconductive part 11 in this manner allows the conductibility from the surface to be excellent and makes it possible to secure the contact resistance with the electrical lead-out lines. Peelable protective films may be provided on both faces of the electroconductive film, but in this case, the electroconductive film is used with the protective films peeled away, and thus, the protective films are not to form parts of the electroconductive film.

In the electroconductive film 10, the electroconductive part 11 is the internal side (the electroconductive part 14 is the external side) of the electroconductive film 10, and even in cases where a successive foldability test is carried out by repeating, one hundred thousand times, a process in which the electroconductive film is folded by 180 degrees so as to leave a gap φ of 4 mm between the opposite edges of the electroconductive film 10 and then unfolded, it is preferable that the below-mentioned ratio between the electrical resistance values of the electroconductive part 11 of the electroconductive film 10 measured before and after the successive foldability test is 3 or less, and the below-mentioned ratio between the electrical resistance values of the electroconductive part 14 of the electroconductive film measured between before and after the successive foldability test 10 is 3 or less. In cases where the ratio between the electrical resistance values of the first electroconductive part of the electroconductive film before and after the successive foldability test and the ratio between the electrical resistance values of the second electroconductive part of the electroconductive film before and after the successive foldability test are each more than 3 after carrying out the successive foldability test on the electroconductive film, the values of the ratios indicate the possibility that the resin layer or the like of the electroconductive film is broken or otherwise damaged, which in turn means that the electroconductive film has poor flexibility. In this respect, any breakage or other damage to the resin layer or the like of the electroconductive film by the successive foldability test reduces the electrical conductivity, and thus, the electrical resistance value of the first electroconductive part of the electroconductive film after the successive foldability test is larger than the electrical resistance value of the first electroconductive part of the electroconductive film before the successive foldability test, and/or the electrical resistance value of the second electroconductive part of the electroconductive film after the successive foldability test is larger than the electrical resistance value of the second electroconductive part of the electroconductive film before the successive foldability test. Because of this, the determination of whether or not the resin layer or the like of the electroconductive film is broken or otherwise damaged can be achieved by determining the ratio between the electrical resistance values of the first electroconductive part of the electroconductive film before and after the successive foldability test and the ratio between the electrical resistance values of the second electroconductive part of the electroconductive film before and after the successive foldability test.

Even in cases where the successive foldability test is carried out by repeating the folding and unfolding process two hundred thousand times, three hundred thousand times, five hundred thousand times, or one million times, it is more preferable that the ratio between the electrical resistance values of the electroconductive part 11 of the electroconductive film 10 before and after the successive foldability test is 3 or less, and that the ratio between the electrical resistance values of the electroconductive part 14 of the electroconductive film 10 before and after the successive foldability test is 3 or less. In this regard, the larger the number of times of repeating the above-mentioned folding and unfolding process is, the more difficult it is that the ratio between the electrical resistance values of the electroconductive part before and after the successive foldability test is made 3 or less, and thus, there is a technically marked difference between: that, in the successive foldability test carried out by repeating the folding and unfolding process two hundred thousand times, three hundred thousand times, five hundred thousand times, or one million times, the ratio between the electrical resistance values of the electroconductive part 11 and the ratio between the electrical resistance values of the electroconductive part 14, before and after the successive foldability test, are each 3 or less; and that, in the successive foldability test carried out by repeating the folding and unfolding process one hundred thousand times, the ratio between the electrical resistance values of the electroconductive part 11 and the ratio between the electrical resistance values of the electroconductive part 14, before and after the successive foldability test, are each 3 or less. Additionally, the number of times of repeating the folding and unfolding process in the successive foldability test is at least one hundred thousand in the evaluation for the following reason. For example, the frequency of folding and unfolding (frequency of opening and closing) is very large on the assumption that the electroconductive film is incorporated in a foldable smartphone. Because of this, an evaluation made by repeating the folding and unfolding process, for example, ten thousand times or fifty thousand times in the above-mentioned successive foldability test will fail to be an evaluation on a practical level. Specifically, in cases where a person who constantly uses a smartphone is taken for example, the person presumably opens and closes the person's smartphone five to ten times during the person's commuting time in the morning, and accordingly, such a smartphone is presumably opened and closed at least 30 times in only one day. Thus, assuming that a smartphone is opened and closed 30 times a day, which gives 30 times×365 days=10950 times, a successive foldability test carried out by repeating the folding and unfolding process ten thousand times is a test carried out on the assumption of one-year use. In other words, the result of the successive foldability test carried out by repeating the folding and unfolding process ten thousand times can be favorable, but in some cases, the electroconductive film will undesirably generate a crease or a crack after the one year passes. Thus, an evaluation based on a successive foldability test carried out by repeating the folding and unfolding process ten thousand times can only verify whether a product is on an unusable level, and a product that can be used but insufficiently will be regarded as favorable, failing to be duly evaluated. Thus, an evaluation of whether a product is on a practical level needs to be an evaluation based on the successive foldability test carried out by repeating the folding and unfolding process at least one hundred thousand times.

Even in cases where the successive foldability test is carried out by repeating the folding and unfolding process one hundred thousand times, two hundred thousand times, three hundred thousand times, five hundred thousand times, or one million times, it is more preferable that the ratio between the electrical resistance values of the electroconductive part 11 of the electroconductive film 10 and the ratio between the electrical resistance values of the electroconductive part 14, before and after the successive foldability test, are each 1.5 or less.

The above-mentioned successive foldability test is carried out so as to leave a gap φ of 4 mm between the opposite edges of the electroconductive film 10, and in terms of attempting to make image display devices thinner, it is more preferable that the ratio between the electrical resistance values of the electroconductive part 11 and the ratio between the electrical resistance values of the electroconductive part 14, before and after the successive foldability test, is 3 or less even in cases where the successive foldability test is carried out by repeating, one hundred thousand times, a process in which the electroconductive film 10 is folded by 180 degrees to leave a gap φ in a narrower range, specifically 3 mm, 2 mm, or 1 mm, between the opposite edges of the electroconductive film 10 and unfolded. Even in cases where the number of times of repeating the folding and unfolding process is the same, the smaller the gap φ is, the more difficult it is that the ratio between the electrical resistance values of the electroconductive part before and after the successive foldability test is made 3 or less, and thus, there is a technically marked difference between: that, in the successive foldability test carried out so as to leave the above-mentioned gap φ of 3 mm, 2 mm, or 1 mm, the ratio between the electrical resistance values of the electroconductive part 11 and the ratio between the electrical resistance values of the electroconductive part 14, before and after the successive foldability test, are each 3 or less; and that, in the successive foldability test carried out so as to leave the above-mentioned gap φ of 4 mm, the ratio between the electrical resistance values of the electroconductive part 11 and the ratio between the electrical resistance values of the electroconductive part 14, before and after the successive foldability test, are each 3 or less.

In the above-mentioned successive foldability test, the electroconductive film 10 is folded with the electroconductive part 11 facing inward (with the electroconductive part 14 facing outward), but the electroconductive film 10 may be folded with the electroconductive part 14 facing inward (with the electroconductive part 11 facing outward). Even in this case, it is preferable that the ratio between the electrical resistance values of the electroconductive part 11 of the electroconductive film 10 and the ratio between the electrical resistance values of the electroconductive part 14, before and after the successive foldability test, are each 3 or less.

The successive foldability test on the electroconductive film 10 can be carried out using a sample cut out of the electroconductive film 10 and having a predetermined size (for example, in the shape of a rectangular 125 mm long×50 mm wide). If such a sample having a size 125 mm long×50 mm wide cannot be cut out, a sample having a size, for example, 110 mm long×50 mm wide may be cut out of the electroconductive film. Specifically, a sample having a predetermined size is first cut out of the electroconductive film 10 that is not yet subjected to a successive foldability test. Then, a silver paste (product name "DW-520H-14"; manufactured by Toyobo Co., Ltd.) is applied on both ends (for example, each end having a size 10 mm long×50 mm wide) of the electroconductive part 11 and both ends (for example, each end having a size 10 mm long×50 mm wide) of the electroconductive part 14 in the longitudinal direction of the cut sample to prevent any change in distance between points for measuring the electrical resistance value, and heated at 130° C. for 30 minutes to provide a cured silver paste to each end of the first electroconductive part and second electroconductive part of the sample, and then, the electrical resistance values of the first electroconductive part 11 and second electroconductive part 14 of the sample are each measured using a tester (product name "Digital MO Hitester 3454-11"; manufactured by Hioki E.E. Corporation). When the electrical resistance value of the electroconductive part 11 is measured, probe terminals of the tester are individually contacted with either of the cured silver pastes provided on both ends of the electroconductive part 11. Similarly, when the electrical resistance value of the electroconductive part 14 is measured, probe terminals of the tester are individually contacted with either of the cured silver pastes provided on both ends of the electroconductive part 14. The measurement of electrical resistance value of the electroconductive part 11 is carried out in an environment at a temperature of 23±5° C. and a relative humidity of 30% or more and 70% or less. After the electrical resistance values of the electroconductive part 11 and the electroconductive part 14 are measured using the sample that is not yet subjected to the successive foldability test, the sample is subjected to the successive foldability test.

The successive foldability test is carried out as follows. As shown in FIG. 3(A), the successive foldability test starts with fixing the edge S1 and opposite edge S2 of the sample S to fixing members 25 of an endurance testing machine (product name "DLDMLH-FS"; manufactured by Yuasa System Co., Ltd.; in accordance with IEC62715-6-1) which are arranged in parallel to each other. Additionally, the fixing members 25 can slide in the horizontal direction, as shown in FIG. 3(A).

Figure 3B:
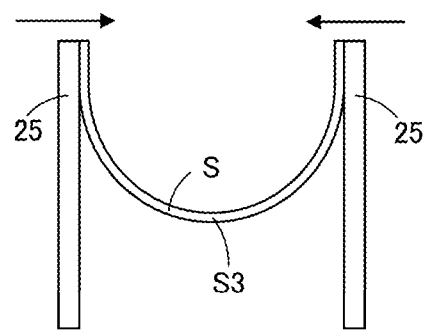
Figure 3C:
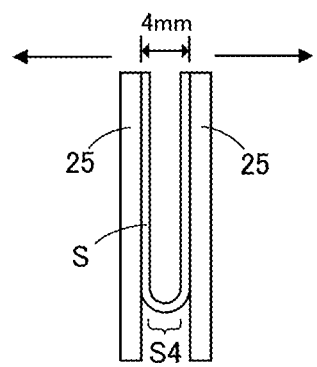

Next, the fixing members 25 are moved closer to each other to fold and deform the sample S along the center line S3 with the electroconductive part 11 facing inward (with the electroconductive part 14 facing outward), as shown in FIG. 3(B); the fixing members 25 are further moved until a gap φ of 4 mm is left between the two opposing edges S1 and S2 of the sample S fixed to the fixing members 25, as shown in FIG. 3(C), subsequently, the fixing members 25 are moved in opposite directions to resolve the deformation of the sample S.

As shown FIGS. 3(A) to 3(C), the fixing members 25 can be moved to fold back the sample S along the center line S3 with the electroconductive part 11 facing inward. Additionally, a gap φ of 4 mm can be maintained between the two opposing edges S1 and S2 of the sample S by carrying out the successive foldability test in a manner that prevents the bent part S4 of the sample S from being forced out beyond the lower edges of the fixing members 25 and controls the fixing members 25 to keep a gap of 4 mm when they approach closest each other. In this case, the outer width of the bent part S4 is considered as 4 mm. The thickness of the sample S is small enough as compared with the gap between the fixing members 25 (4 mm). Thus, it seems unlikely that a difference in the thickness of the sample S affects the result of the successive foldability test on the sample S.

After the successive foldability test is carried out, the sample after the successive foldability test is measured for electrical resistance on the electroconductive part 11 and the electroconductive part 14, similarly to the sample before the successive foldability test. Then, the ratio of the electrical resistance value of the electroconductive part 11 of the sample after the successive foldability test to that of the electroconductive part 11 of the same sample before the successive foldability test (the electrical resistance value of the electroconductive part 11 of the sample after the successive foldability test/the electrical resistance value of the electroconductive part 11 of the sample before the successive foldability test) is calculated. Similarly, the ratio of the electrical resistance value of the electroconductive part 14 of the sample after the successive foldability test to that of the electroconductive part 14 of the same sample before the successive foldability test (the electrical resistance value of the electroconductive part 14 of the sample after the successive foldability test/the electrical resistance value of the electroconductive part 14 of the sample before the successive foldability test) is calculated. The arithmetic mean of three measurements is determined as the electrical resistance value ratio.

Even if the ratio between the electrical resistance values of the electroconductive part of the electroconductive film before and after the successive foldability test is 3 or less, the electroconductive film after the successive foldability test generates a crease at the bent part and also generates microcracks, undesirably causing poor appearance, specifically white turbidity and delamination (poor adhesion) starting from the microcracks. Inhibition of creases and microcracks at the bent part is extremely important in use of the electroconductive film for image display devices. From these viewpoints, the electroconductive film 10 preferably has flexibility. As used herein, "flexibility" refers to not only having a ratio of 3 or less between the electrical resistance values of each of the first electroconductive part and the second electroconductive part before and after the successive foldability test, but also generating no observed crease or microcrack in the test. Accordingly, the "flexibility" as used herein is different from the flexibility the only requirement for which is that the ratio between the electrical resistance values of each of the first electroconductive part and the second electroconductive part before and after the successive foldability test is 3 or less.

The above-mentioned crease is to be observed visually, and in observing such a crease, the bent part is uniformly observed with transmitted light and reflected light under white illumination (at 800 luxes to 2000 luxes) in a bright room, and both the portion corresponding to the internal side and the portion corresponding to the external side at the bent part after folding are observed. The observation of the crease is carried out in an environment at a temperature of 23±5° C. and a relative humidity of 30% or more and 70% or less.

The above-mentioned microcracks are observed using a digital microscope (digital microscope). Examples of digital microscopes include VHX-5000 manufactured by Keyence Corporation. Such microcracks are observed in a dark field, with reflected light, and with ring illumination selected as the illumination of a digital microscope. Specifically, a sample after the successive foldability test is first spread slowly, and the sample is fixed with a tape to the stage of a microscope. If the crease is persistent in this case, the region to be observed is made as flat as possible. However, the region to be observed (the bent part) at and around the center of the sample is not touched with a hand and handled to a degree to which no force is applied. Then, both the portion corresponding to the internal side and the portion corresponding to the external side after folding are observed. The observation of the microcracks are carried out in an environment at a temperature of 23±5° C. and a relative humidity of 30% or more and 70% or less.

In order that the position to be observed can be easily known in observing the above-mentioned crease and microcracks, it is advisable to place a sample before the successive foldability test between the fixing members of an endurance testing machine, fold the sample once, and use a permanent marker or the like to put, on both ends $S4_1$, marks A1 indicating the bent part, as shown in FIG. 4, wherein both the ends $S4_1$ are positioned in the direction orthogonal to the folding direction FD in the bend part S4. In cases where no crease or the like is observed on the sample after the successive foldability test, the sample is removed from the endurance testing machine after the successive foldability test, and then, a permanent marker may be used to draw lines A2 (dotted lines in FIG. 4) connecting both the marks A1 for both the ends $S4_1$ of the bent part S4 so that the position to be observed can be prevented from being unclear. Then, in observing the crease, the whole bent part S4, which is a region formed by the marks A1 for both the ends $S4_1$ of the bent part S4 and the lines A2 connecting the marks A1, is observed visually. In observing the microcracks, the microscope is set in such a manner that the center of the field-of-view range (the range surrounded by the two-dot chain lines in FIG. 4) of the microscope is aligned with the center of the bent part S4.

Additionally, carrying out the successive foldability test on the electroconductive film will undesirably cause the adhesion between the light-transmitting base material and the resin layer to decrease. Because of this, it is preferable that no peeling or the like is observed at and around the interface between the resin layer 12 and the light-transmitting base material 13 when a digital microscope is used to observe the region at and around the interface between the resin layer 12 and the light-transmitting base material 13 at the bent part of the electroconductive film after the successive foldability test. Examples of digital microscopes include VHX-5000 manufactured by Keyence Corporation.

The electroconductive film 10 preferably has a haze value (total haze value) of 5% or less. The electroconductive film 10 having a haze value of 5% or less can obtain sufficient optical performance. The haze value can be measured using a haze meter (product name "HM-150"; manufactured by Murakami Color Research Laboratory Co., Ltd.) in accordance with JIS K7136: 2000 in an environment at a temperature of 23±5° C. and a relative humidity of 30% or more and 70% or less. The haze value is a value measured on the whole electroconductive film and is also determined as the arithmetic mean of three measurement values obtained from one electroconductive film, wherein a sample having a size 50 mm long×100 mm wide is cut out of the electroconductive film and the sample without curl or wrinkle and without any dirt such as fingerprints or dusts is then placed in the haze meter. The term "three measurements" as used herein does not mean three measurements at the same location but means measurements at three different locations. The surface 10A and back face 10B of the electroconductive film 10 are visually determined to be flat, and the laminated layers, such as the electroconductive part 11, likewise have a flat surface, and the deviation of film thickness is also within ±10% of the average film thickness. Thus, the measurement of haze values at three different locations on the cut electroconductive film is considered to provide a rough average of the haze values measured on the whole electroconductive film. Additionally, if a sample having the above-mentioned size cannot be cut out of the electroconductive film, a sample having a size 21 mm or more in diameter is required because, for example, the HM-150 haze meter has an entrance port aperture having a diameter of 20 mm for use in the measurement. Thus, a sample having a size of 22 mm×22 mm or larger may be cut out of the electroconductive film as appropriate. In cases where the electroconductive film is small in size, the electroconductive film is gradually shifted or turned to such an extent that the light source spot is within the electroconductive film, and three points of measurement are thereby obtained. The electroconductive film 10 more preferably has a haze value of 3% or less, 2% or less, 1.5% or less, 1.2% or less, or 1.1% or less. The deviation of the obtained haze value is within ±10% of the average haze value even though the measurement object has such a long size as a size of 1 m×3000 m or has almost the same size as that of a 5-inch smartphone; and in cases where the deviation is within the above-mentioned preferable range, a low haze value and a low resistance value are more easily obtained. Additionally, although the electroconductive part of the electroconductive film 10 is not patterned, the haze value is 5% or less, more preferably 3% or less, 2% or less, 1.5% or less, 1.2% or less, or 1.1% or less, even in an electroconductive film including a patterned electroconductive part. Additionally, also in a whole multi-layered laminate such as a touch panel sensor including an electroconductive film, the haze value is preferred to be the same as above-mentioned.

The electroconductive film 10 preferably has a total light transmittance of 80% or more. The electroconductive film 10 having a total light transmittance of 80% or more has sufficient optical properties. The total light transmittance can be measured using a haze meter (product name "HM-150"; manufactured by Murakami Color Research Laboratory Co., Ltd.) in accordance with JIS K7361-1: 1997 in an environment at a temperature of 23±5° C. and a relative humidity of 30% or more and 70% or less. The total light transmittance is a value measured on the whole electroconductive film and is also determined as the arithmetic mean of three measurement values obtained from one electroconductive film, wherein a sample having a size 50 mm long×100 mm wide is cut out of the electroconductive film and the sample without curl or wrinkle and without any dirt such as fingerprints or dusts is then placed in the haze meter. The surface 10A and back face 10B of the electroconductive film 10 are visually determined to be flat, and the laminated layers, such as the electroconductive part 11, likewise have a flat surface, and the deviation of film thickness is also within ±10% of the average film thickness. Thus, the measurement of total light transmittance at three different locations on the cut electroconductive film is considered to provide a rough average of the total light transmittance values measured on the whole electroconductive film. Additionally, if a sample having the above-mentioned size cannot be cut out of the electroconductive film, a sample having a size 21 mm or more in diameter is required because, for example, the HM-150 haze meter has an entrance port aperture having a diameter of 20 mm for use in the measurement. Thus, a sample having a size of 22 mm×22 mm or larger may be cut out of the electroconductive film as appropriate. In cases where the electroconductive film is small in size, the electroconductive film is gradually shifted or turned to such an extent that the light source spot is within the electroconductive film, and three points of measurement are thereby obtained. The electroconductive film 10 more preferably has a total light transmittance of 85% or more, 88% or more, or 90% or more. Additionally, although the electroconductive part of the electroconductive film 10 is not patterned, the total light transmittance is more preferably 80% or more, 85% or more, 88% or more, or 90% or more, even in an electroconductive film including a patterned electroconductive part. The deviation of the obtained total light transmittance is within ±10% of the average total light transmittance even though the measurement object has such a long size as a size of 1 m×3000 m or has almost the same size as that of a 5-inch smartphone; and in cases where the deviation is within the above-mentioned preferable range, a low haze value and a low resistance value are more easily obtained. Additionally, also in a whole multi-layered laminate such as a touch panel sensor including an electroconductive film, the total light transmittance is preferred to be the same as above-mentioned.

The back face 10B of the electroconductive film 10 preferably has a pencil hardness of H or harder in accordance with the pencil hardness test specified by JIS K5600-5-4: 1999. Allowing the back face 10B of the electroconductive film 10 to have a pencil hardness of H or harder enables the electroconductive film 10 to be hard and thus have higher durability. In the pencil hardness test, a piece having a size 50 mm long×100 mm wide is cut out of the electroconductive film 10 and fixed on a glass plate, with Cello-tape (registered trademark) manufactured by Nichiban Co., Ltd., so as to generate no fold or wrinkle with the first electroconductive part 11 facing upward, and a load of 750 g is applied to the pencil at a scratch speed of 1 mm/second in an environment at a temperature of 23±5° C. and a relative humidity of 30% or more and 70% or less. The grade of the hardest pencil that leaves no scratch on the surface 11A of the first electroconductive part 11 during the pencil hardness test is determined as the pencil hardness of the back face 10B of the electroconductive film 10. Different pencils with different hardnesses are used for the measurement of pencil hardness and the pencil hardness test is repeated five times on each pencil. In cases where no scratch is made on the surface 11A of the first electroconductive part 11 with a pencil with specific hardness in four or more out of the five replicates, the pencil with the hardness is judged as making no scratch on the surface 11A of the first electroconductive part 11. The above-mentioned scratch refers to a scratch which is visibly detectable when the surface of the electroconductive film 10 subjected to the pencil hardness test is observed under transmitting fluorescent light.

The electroconductive film 10 preferably has a yellow index (YI) of 15 or less. It is possible that a light-transmitting base material (particularly a light-transmitting base material containing a polyimide resin) having a strongly yellow tint is unusable in applications that need transparency, but the electroconductive film 10 having a YI of 15 or less allows the yellow tint of the electroconductive film 10 to be not noticeable, and thus, can be used in applications that need transparency. In this regard, even a light-transmitting base material containing a polyimide resin can be used in applications that need transparency, if the electroconductive film 10 has a YI of 15 or less. The maximum YI of the electroconductive film 10 is more preferably 10 or less, 5 or less, or 1.5 or less. The YI is obtained by measuring a cut piece of the optical film with a size of 50 mm×100 mm using a spectrophotometer (product name "UV-3100PC"; manufactured by Shimadzu Corporation; light source: tungsten lamp and deuterium lamp) in an environment at a temperature of 23±5° C. and a relative humidity of 30% or more and 70% or less, processing the obtained values according to the formula described in JIS Z8722: 2009 to calculate color tristimulus values X, Y, and Z, and processing the obtained tristimulus values X, Y, and Z according to a formula described in ASTM D1925: 1962 to calculate a yellow index. The above-mentioned YI is the arithmetic mean of three measurements obtained by measuring one cut piece of the electroconductive film.

In cases where an additional film is provided on the electroconductive film through an adhesive or adhesion layer, the additional film and the adhesive or adhesion layer are peeled away before the successive foldability test is carried out, and also before the haze value, total light transmittance, pencil hardness, and YI are measured. The additional film can be peeled away, for example, as follows. First of all, a laminate consisting of an electroconductive film attached to an additional film through an adhesive or adhesion layer is heated with a hair dryer and is slowly separated by inserting a cutter blade into a possible interface between the electroconductive film and the additional film. By repeating such a process of heating and separation, the adhesive or adhesion layer and the additional film can be peeled away. Even if such a peeling process is carried out, the successive foldability test and the measurement of the haze value and the like are not significantly affected.

In this regard, the electroconductive film 10 needs to be cut out into pieces having the above-mentioned sizes, as above-mentioned, when the electroconductive film 10 is subjected to the successive foldability test or used for measurement of the haze value, total light transmittance, pencil hardness, and YI, but in cases where the electroconductive film 10 is large (for example, longitudinal as with the shape of a roll), the electroconductive film 10 is cut out at any position into an A4 size (210 mm×297 mm) or an A5 size (148 mm×210 mm) followed by being cut out into pieces having a size for each measurement item. For example, in cases where the electroconductive film 10 is roll-shaped, the electroconductive film 10 in roll shape is unrolled by a predetermined length, and cut out not at the non-effective region extending along the longitudinal direction of the roll and including both ends but at the effective regions being at and around the central portion and having stable quality. In cases where the electroconductive film 10 is subjected to the successive foldability test and used for measurement of the haze value, total light transmittance, pencil hardness, and YI, the above-mentioned devices are used for the measurement, but without limitation to the devices, equivalent devices such as their successors may be used for measurement.

The application of the electroconductive film is not limited to a particular one, and may be used in various applications (for example, sensor applications), for example, in which a transparent electroconductive film is used. Additionally, the electroconductive film according to the present invention is suitable for use in vehicles (including all types of vehicles such as railroad cars and carriage building machines) as well as for use in image display devices (including smartphones, tablet terminals, wearable terminals, personal computers, televisions, digital signages, public information displays (PID), vehicle displays, and the like). Examples of sensors for which the electroconductive film is used in vehicle applications include a sensor arranged at a portion, such as a steering wheel or a seat, which is touched by a person. Additionally, the electroconductive film is also favorable for applications which require flexible forms, such as foldable or rollable forms. The electroconductive film may be used for electrical appliances and windows used for houses and cars (including all types of vehicles such as railroad cars and carriage building machines). In particular, the electroconductive film according to the present invention can suitably be used for parts in which transparency is critical. Additionally, the electroconductive film according to the present invention can suitably be used for electrical appliances which not only are seen from a technical viewpoint such as transparency but also require higher devisal quality and design quality. Specific examples of applications of the electroconductive film according to the present invention include: carrier films used in electromagnetic shields, defrosters, antennas, solar cells, audio systems, loudspeakers, electric fans, interactive whiteboards, and semiconductors: and the like. The shape of the electroconductive film as used is suitably designed in accordance with the application, without particular limitation, and, for example, may be a curved surface.

The electroconductive film may be cut into a piece having a desired size or be rolled. The electroconductive film that is rolled may be cut into a piece having a desired size in the stage, and alternatively, may be cut into a piece having a desired size after being treated, for example, by etching. In cases where the electroconductive film according to the present invention has been cut into a piece having a desired size, the size of the electroconductive film piece is not limited to a particular size, and the size is appropriately determined depending on the display size of an image display device. Specifically, the electroconductive film piece may be, for example, 5 inches or more and 500 inches or less in size. The term "inch" as used herein means the length of a diagonal when the electroconductive film is rectangular and to the length of a diameter when the electroconductive film is circular and to the average of the major and minor axes when the electroconductive film is elliptical. In this respect, when the electroconductive film is rectangular, the aspect ratio of the electroconductive film which is measured to have the above-mentioned inches is not limited to a particular aspect ratio as long as no problem is found with the electroconductive film to be used for the display screen of an image display device. Examples of the aspect ratio include height-to-width ratios of 1:1, 4:3, 16:10, 16:9, and 2:1. However, particularly in electroconductive films used for vehicle displays and digital signages which are rich in designs, the aspect ratio is not limited to the above-mentioned aspect ratios. For example, in cases where the electroconductive film 10 is roll-shaped, the electroconductive film 10 in roll shape is unrolled by a predetermined length, and cut into a piece having a desired size not at the non-effective region extending along the longitudinal direction of the roll and including both ends but at the effective region being at and around the central portion and having stable quality.

<<Light-Transmitting Base Material>>

The light-transmitting base material 13 is not limited to a particular light-transmitting base material as long as it is light-transmitting. Examples of constituent materials of the light-transmitting base material 13 include base materials composed of a light-transmitting resin. Such a resin is not limited to any particular one as long as it is light-transmitting, and examples of such resins include polyolefin resins, polycarbonate resins, polyacrylate resins, polyester resins, aromatic polyetherketone resins, polyethersulfone resins, acetyl cellulose resins, polyimide resins, polyamideimide resins, polyamide resins, and mixtures obtained by mixing two or more of these resins. Among these light-transmitting resins, polyester resins are preferred because a light-transmitting base material composed of a polyester resin is hardly damaged even upon contacting to a coating machine and is thus capable of inhibiting increase of haze value even if the light-transmitting base material is contacted to a coating machine for coating of a resin layer or the like and thus likely to be damaged, as well as a light-transmitting base material composed of a polyester resin has superior heat resistance, barrier property, and water resistance to those of base material bodies composed of any light-transmitting resin other than polyester resins.

In order that a foldable electroconductive film can be obtained as an electroconductive film, it is preferable to use, as a constituent resin of the light-transmitting base material, a polyimide resin, polyamideimide resin, polyamide resin, polyester resin, cycloolefin polymer resin, or a mixture thereof, because these resins have favorable foldability. Among these resins, polyimide resins, polyamide resins, and mixtures thereof are preferred because these resins not only have excellent foldability but also have excellent hardness and transparency, also have excellent heat resistance, and also can achieve further excellent hardness and transparency by firing. Furthermore, a displayed image on an image display device is sometimes observed through worn sunglasses, for example, in the outdoors, and in cases where the sunglasses are of a polarized type, the displayed image observed through the polarized sunglasses will undesirably decrease in visibility. Accordingly, the capability to inhibit a decrease in visibility is currently demanded even for cases where a displayed image is observed through polarized sunglasses. With respect to this, cycloolefin polymer resins impart a phase difference to image light and thus, can inhibit the decrease in visibility, and cyclopolyolefin polymer resins are preferable in terms of inhibiting the decrease in visibility.

The present inventors infer that a base material containing a polyimide resin is favorable as a light-transmitting base material in cases where flexibility is considered to be important for the electroconductive film. Use of a polyimide resin is certainly more unlikely to generate microcracks or fractures than conventionally and widely used transparent base materials (for example, base materials containing a polymethyl methacrylate resin, triacetyl cellulose resin, or polyethylene terephthalate resin). In some cases, however, use of a polyimide resin will generate wrinkles and creases which are found in the resin layer when observed. In particular, use of the electroconductive film in applications for smartphones, which have a small screen, will undesirably make it impossible to read letters when such creases come into view. In view of this, the present inventors have found out that using, as a light-transmitting base material, a base material containing a cycloolefin polymer resin affords excellent foldability compared with using a polyimide resin. For example, in cases where the light-transmitting base material contains a cycloolefin polymer resin having a film thickness of 5 μm or more and 35 μm or less (even 5 μm or more and 18 μm or less), which is an extremely thin film, has excellent optical performance, for example, a very small phase difference value in the plane and in the film thickness direction. For example, even in cases where a light-transmitting base material containing a polyimide resin, polyamideimide resin, or polyamide resin has an in-plane phase difference of less than 100 nm in terms of the film structure, the base material can have a phase difference of 1000 or more in the thickness direction, and will adversely affect the visibility when used for image display devices. In contrast, a light-transmitting base material containing a cycloolefin polymer resin can be easily controlled to have a phase difference of less than 100 nm, less than 50 nm, or the like both in the in-plane and in the thickness direction, having excellent three-dimensional optical isotropy, and thus, can be used for polarized sunglasses, being very preferable in optical applications. Because of this, a light-transmitting base material containing a cycloolefin polymer resin is most preferable in flexibility applications and optical applications. In this regard, a light-transmitting base material containing a triacetyl cellulose resin or a polycarbonate resin also has optical isotropy, but is more likely to generate a defect such as wrinkles or breaks when folded, and thus, a light-transmitting base material containing a cycloolefin polymer resin and having the same optical isotropy conceivably has higher foldability in terms of molecular structure.

Examples of polyolefin resins include resins composed of at least one of, for example, polyethylene, polypropylene, and cycloolefin polymer resins.

Examples of cycloolefin polymer resins include norbornene resins, monocyclic cycloolefin resins, cyclic conjugated diene resins, vinyl alicyclic hydrocarbon resins, hydrides thereof, and the like. Among these, norbornene resins have favorable transparency and moldability, and thus, can be suitably used.

Examples of norbornene resins include: ring-opened polymers of monomers having a norbornene structure, ring-opened copolymers between a monomer having a norbornene structure and another monomer, and hydrides thereof; addition polymers of a monomer having a norbornene structure, addition copolymers between a monomer having a norbornene structure and another monomer, and hydrides thereof; and the like.

Examples of commercially available products of cycloolefin polymer resins include: tradename "ZEONEX (registered trademark)" and "ZEONOR (registered trademark)" (norbornene resins) manufactured by Zeon Corporation; tradename "SUMILITE (registered trademark) FS-1700" manufactured by Sumitomo Bakelite Co., Ltd.; tradename "ARTON (registered trademark)" (a modified norbornene resin) manufactured by JSR Corporation; tradename "APEL (registered trademark)" (a cyclic olefin copolymer) manufactured by Mitsui Chemicals, Inc.; tradename "Topas (registered trademark)" (a cyclic olefin copolymer) manufactured by Ticona Inc.; tradename "OPTOREZ OZ-1000 Series" (an alicyclic acrylic resin) manufactured by Hitachi Chemical Company, Ltd.; and the like. A light-transmitting base material can be obtained by forming such a cycloolefin resin into a film. The method of forming a film is not limited to any particular one, and a known method of forming a film, such as a solvent casting method or a melt-extrusion method, can be used. Additionally, cycloolefin polymer films are also commercially available, and can be used as light-transmitting base materials. Examples of cycloolefin polymer films include: tradename "S-SI NA (registered trademark)" and "SCA40" manufactured by Sekisui Chemical Co., Ltd.; tradename "ZEONOR Film (registered trademark)" manufactured by Zeon Corporation; tradename "ARTON (registered trademark) Film" manufactured by JSR Corporation; and the like.

Examples of polycarbonate resins include aromatic polycarbonates containing a bisphenol (such as bisphenol A) as a base material, and aliphatic polycarbonates such as diethylene glycol bis(allyl carbonate).

Examples of polyacrylate resins include methyl poly (meth)acrylate, ethyl poly(meth)acrylate, and methyl (meth) acrylate-butyl (meth)acrylate copolymers.

Examples of polyester resins include at least one of polyethylene terephthalate (PET), polypropylene terephthalate, polybutylene terephthalate, and polyethylene naphthalate (PEN).

Examples of the aromatic polyetherketone resin include polyether ether ketone (PEEK).

Examples of acetyl cellulose resins include triacetyl cellulose (TAC) and diacetyl cellulose. Triacetyl cellulose is a resin that can afford an average light transmittance of 50% or more in the visible light range of from 380 to 780 nm. Triacetyl cellulose preferably has an average light transmittance of 70% or more, more preferably 85% or more.

In this regard, a triacetyl cellulose resin may be not only pure triacetyl cellulose but also a resin in which a component other than acetic acid is combined as a fatty acid for forming an ester with cellulose, examples of such resins including cellulose acetate propionate or cellulose acetate butyrate. To such a triacetyl cellulose resin, any kind of additive may be added, if necessary, examples of such additives including: another cellulose-lower fatty acid ester such as diacetyl cellulose; and a plasticizer, ultraviolet absorber, and lubricant.

The polyimide resin may be an aliphatic polyimide resin, and is preferably an aromatic polyimide resin containing aromatic rings. The aromatic polyimide resin is composed of a tetracarboxylic component and a diamine component, at least one of which is an aromatic ring-containing component.

The polyimide resin may partially contain a polyamide structure. Examples of the polyamide structure that may be contained include a polyamideimide structure containing a tricarboxylic acid residue such as trimellitic anhydride, and a polyamide structure containing a dicarboxylic acid residue such as terephthalic acid. The concept of polyamide resin includes aromatic polyamides (aramids) as well as aliphatic polyamides. Specific examples of the polyimide resin include compounds having a structure represented by the below-mentioned chemical formula (1) or (2). In the below-mentioned chemical formula, n represents the number of repeating units, which is an integer of 2 or more. In this regard, a compound represented by the chemical formula (1) is preferable among the compounds represented by the below-mentioned chemical formulae (1) and (2) because the former has a low phase difference and high transparency.

[Chem. 1]

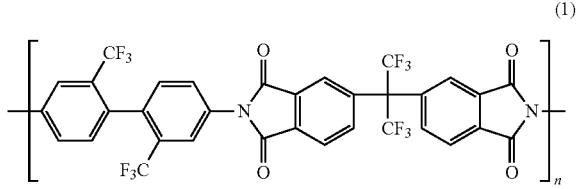

(1)

[Chem. 2]

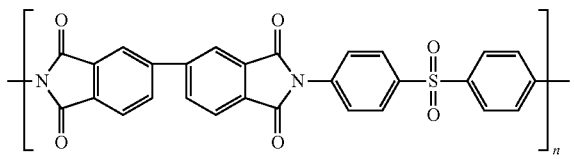

(2)

The thickness of the light-transmitting base material 13 can be, but is not particularly limited to, 500 µm or less, and the minimum thickness of the light-transmitting base material 13 is more preferably 3 µm or more, 5 µm or more, 10 µm or more, or 20 µm or more, in terms of handling properties and the like. The maximum thickness of the light-transmitting base material 13 is preferably 250 µm or less, 80 µm or less, 50 µm or less, 35 µm or less, or 18 µm or less, in terms of thinning the electroconductive film. The thickness of the light-transmitting base material is determined as the average of the thickness values measured at randomly selected 10 locations in a cross-sectional image of the light-transmitting base material acquired using a scanning transmission electron microscope (STEM) or a scanning electron microscope (SEM). Measuring the thickness of the light-transmitting base material using a scanning transmission electron microscope (STEM) can be carried out in the same manner as measuring the film thickness of the electroconductive part. However, a cross-sectional image of the light-transmitting base material is acquired at a magnification of 100 to 20,000 times.

Electroconductive fibers such as silver nanowires are themselves suitable in terms of, for example, flexibility (for example, foldability), but if a light-transmitting base material on which an electroconductive part containing electroconductive fibers is to be laminated has a large thickness or if a functional layer (except an electroconductive part) has a large thickness, the light-transmitting base material and the functional layer at the bent part generate breaks when folded, the breaks will undesirably cause the electroconductive fibers to be broken, and the light-transmitting base material and the functional layer at the bent part generate creases and microcracks in some cases. The above-mentioned breakage makes it impossible to obtain an intended resistance value and, in addition, will undesirably cause poor appearance, specifically white turbidity and poor adhesion due to cracks. Accordingly, in using the electroconductive film for flexibility applications, control of the thicknesses of the light-transmitting base material and the functional layer and adhesion between layers (adhesion by chemical binding depending on the material, or physical adhesion that does not generate cracks) are important. In particular, in cases where the light-transmitting base material 13 contains a cycloolefin polymer resin, polyester resin, or polyimide resin, the likelihood of breakage depends on the thickness, and thus, it is important to control the thickness of the light-transmitting base material.

In a specific example, the light-transmitting base material 13 preferably has a thickness of 45 µm or less in cases where the light-transmitting base material 13 contains a cycloolefin polymer resin. In cases where the light-transmitting base material 13 has a thickness of 45 µm or less, the light-transmitting base material 13 can be inhibited from being broken at the bent part when folded and makes it possible to inhibit white turbidity at the bent part. In this case, the maximum thickness of the light-transmitting base material 13 is preferably 35 µm or less or 18 µm or less. In this case, the minimum thickness of the light-transmitting base material 13 is preferably 5 µm or more in terms of handling properties.

For example, the light-transmitting base material 13 preferably has a thickness of 45 µm or less in cases where the light-transmitting base material 13 contains a polyester resin. In cases where the light-transmitting base material 13 has a thickness of 45 µm or less, the light-transmitting base material 13 can be inhibited from being broken at the bent part when folded and makes it possible to inhibit white turbidity at the bent part. In this case, the maximum thickness of the light-transmitting base material 13 is preferably 35 µm or less or 18 µm or less. In this case, the minimum thickness of the light-transmitting base material 13 is preferably 5 µm or more in terms of handling properties.

For example, in cases where the light-transmitting base material 13 contains a polyimide resin, polyamide resin, polyamideimide resin, or a mixture thereof, the thickness of the light-transmitting base material 13 is preferably smaller in terms of inhibiting the light-transmitting base material 13 from being broken when folded, and in terms of optical characteristics and mechanical characteristics, and specifically, the thickness is preferably 75 µm or less. In this case, the maximum thickness of the light-transmitting base material 13 is preferably 70 µm or less, 50 µm or less, 35 µm or less, or 18 µm or less. In this case, the minimum thickness of the light-transmitting base material 13 is preferably 5 µm or more in terms of handling properties.

The above-mentioned light-transmitting base materials each having a thickness of 35 µm or less have better processing suitability when they have a protective film attached thereto during production, and thus, are preferable.

The light-transmitting base material 13 may have a surface treated by a physical treatment such as corona discharge treatment or oxidation treatment to improve the adhesion. Additionally, the light-transmitting base material 13 may have an underlayer on at least one face thereof for the purpose of improving adhesion to other layers, preventing the electroconductive film from sticking to itself when the electroconductive film is rolled, and/or inhibiting crater formation on the surface of a coating liquid applied for forming another layer. However, in cases where an electroconductive part is formed using an electroconductive fiber-containing composition containing electroconductive fibers and a dispersion medium on the surface of an underlayer, permeation of the dispersion medium into the underlayer, the extent of which varies depending on the type of the dispersion system, may involve transfer of the electroconductive fibers into the underlayer and will consequently increase the electrical resistance value undesirably, and thus, it is preferable that the second electroconductive part side of the light-transmitting base material is not provided with an underlayer and that the second electroconductive part is directly provided on the light-transmitting base material. Herein, the underlayer is regarded as forming part of the light-transmitting base material.

The underlayer is a layer having a function that enhances adhesion to other layers, a function that prevents the electroconductive film from sticking to itself when the electroconductive film is rolled, and/or a function that inhibits crater formation on the surface of a coating liquid applied for forming another layer. Whether or not the light-transmitting base material has an underlayer is can be determined by observing a cross-section at and near the interface between the light-transmitting base material and the resin layer and at and near the interface between the light-transmitting base material and the second electroconductive part using a scanning electron microscope (SEM), a scanning transmission electron microscope (STEM), or a transmission electron microscope (TEM) at a magnification of 1,000 to 500,000 times (preferably 25,000 to 50,000 times). The underlayer may contain particles as, for example, lubricant additives for the purpose of preventing an electroconductive film from sticking to itself when the electroconductive film is rolled; accordingly, the interface between the light-transmitting base material and the resin layer can be identified as an underlayer by the presence of the particles in the layer.

The underlayer preferably has a film thickness of 10 nm or more and 1 μm or less. The underlayer having a film thickness of 10 nm or more allows the underlayer to achieve its functions sufficiently, and the underlayer having a film thickness of 1 μm or less will not undesirably have any optical impact. The film thickness of the underlayer is determined as the arithmetic mean of the thickness values measured at randomly selected 10 locations, wherein the thickness values are determined at the 10 locations in cross-sectional images of the underlayer acquired using a scanning electron microscope (SEM), a scanning transmission electron microscope (STEM), or a transmission electron microscope (TEM) at a magnification of 1,000 to 500,000 times (preferably a magnification of 25,000 to 50,000 times). The underlayer more preferably has a minimum film thickness of 30 nm or more and a maximum film thickness of 150 nm or less. The film thickness of the underlayer can also be measured in the same manner as the film thickness of the electroconductive part 11.

The underlayer contains, for example, an anchoring agent and/or a priming agent. As the anchoring agent and the priming agent, at least any of, for example, polyurethane resins, polyester resins, polyvinyl chloride resins, polyvinyl acetate resins, vinyl chloride-vinyl acetate copolymers, acrylic resins, polyvinyl alcohol resins, polyvinyl acetal resins, copolymers of ethylene and vinyl acetate or acrylic acid, copolymers of ethylene and styrene and/or butadiene, thermoplastic resins such as olefin resins and/or modified resins thereof, polymers of ionizing radiation-polymerizable compounds, polymers of thermopolymerizable compounds, and the like can be used.

The underlayer may contain particles of a lubricant or the like for the purpose of preventing the electroconductive film from sticking to itself when the electroconductive film is rolled, as above-mentioned. Examples of the particles include silica particles.

<<Resin Layer>>

The resin layer 12 is placed between the first electroconductive part 11 and the light-transmitting base material 13. Allowing the resin layer 12 to be placed between the first electroconductive part 11 and the light-transmitting base material 13 makes it possible to enhance the abrasion resistance of the first electroconductive part 11. The resin layer 12 shown in FIG. 1 is adjacent to the first electroconductive part 11 and the light-transmitting base material 13, but is optionally not adjacent to the part or base material. In cases where the light-transmitting base material 13 has an underlayer, the resin layer 12 is preferably adjacent to the underlayer. Allowing the resin layer 12 to be adjacent to the underlayer allows the adhesion between the resin layer 12 and the light-transmitting base material 13 to be high. As used herein, the "resin layer" refers to a layer including a resin, and may contain particles, additives, or the like besides the resin.

A resin layer which is too soft will undesirably cause scratches easily in production processes of the electroconductive film and become short of resistance to chemicals such as an etching liquid, and thus, the resin layer 12 is preferably, for example, a hard coat layer. Allowing the resin layer 12 to be a hard coat layer makes it possible to prevent generation of scratches in production processes of the electroconductive film 10 and enhance the chemical resistance. As used herein, the "hard coat layer" refers to a layer that is light-transmitting and harder than a light-transmitting base material. Specifically, the indentation hardness of the hard coat layer is higher than the indentation hardness of the light-transmitting base material. Specifically, the hard coat layer preferably has an indentation hardness of 100 MPa or more. The minimum indentation hardness of the hard coat layer may be 200 MPa or more or 300 MPa or more, and the maximum may be 800 MPa or less in terms of preventing generation of microcracks and maintain adhesion at each interface between the light-transmitting base material, the resin layer, and the electroconductive part. Having the minimum and maximum such as these makes it possible to maintain the flexibility that the electroconductive part itself has by virtue of the electroconductive fibers. Additionally, the structure having the first electroconductive part and the second electroconductive part need to have almost the same resistance value, physical characteristics, and optical characteristics between before and after an endurance test in order to be practically used. Additionally, the hard coat layer is effective as a layer that plays a reinforcing role as an underlayer against scratches during processing and to breakage of the electroconductive fibers. For these reasons, the above-mentioned value range is preferable in order to make use of the flexibility of the electroconductive fibers such as silver nanowires and at the same time, obtain such practical properties as above-mentioned. In this regard, although depending on the application, a structure in which hard coat layers are provided on both faces of the light-transmitting base material is more preferable than a structure in which a hard coat layer is provided only on one face of the light-transmitting base material.

As used herein, the "indentation hardness" refers to a value determined from a load-displacement curve drawn from the loading to unloading of an indenter. Measurement of the indentation hardness ($H_{IT}$) is carried out on a measurement sample using a "T1950 TriboIndenter" manufactured by Hysitron, Inc. in an environment at a temperature of 23±5° C. and a relative humidity of 30% or more and 70% or less. Specifically, a cut piece of electroconductive film having a size of 10 mm×10 mm is first placed in an embedding plate made of silicone, into which an epoxy resin is later poured to embed the whole electroconductive film in the resin. Then, the embedding resin is left to stand at 65° C. for 12 hours or more and cured. Subsequently, ultra-thin sections are produced using an ultramicrotome (product name "Ultramicrotome EM UC7"; manufactured by Leica Microsystems GmbH) at a feeding rate of 100 nm. The block remaining after cutting out the ultra-thin sections is used as a measurement sample. Then, the measurement sample is fixed to a commercially available slide glass (product name "Slide Glass (Strainer) 1-9645-11" manufactured by As One Corporation) via an adhesive resin (product name "ARON ALPHA (registered trademark) for general use" manufactured by Toagosei Co., Ltd.) in such a manner that the cross-section obtained by cutting out the above-mentioned section in the measurement sample is substantially perpendicular to the surface of the slide glass. Specifically, a drop of the above-mentioned adhesive resin is placed at the center of the slide glass. In this step, the adhesive resin is not spread over the slide glass, and one drop of the adhesive resin is applied in such a manner that the adhesive resin does not extend beyond the measurement sample. The measurement sample is brought into contact with the slide glass in such a manner that the cross-section obtained by cutting out the above-mentioned section in the measurement sample is substantially perpendicular to the surface of the slide glass, and then, the adhesive resin is pressed and spread between the slide glass and the measurement sample which are thus adhered to each other tentatively. The resulting piece is left to stand as it is at room temperature for 12 hours to fix the measurement sample to the slide glass by adhesion. In this regard, any fixing method can be used as long as the measurement sample is made unmovable. Then, a flat position is found in the cross-section of the measurement sample, and in measurement of a displacement criterion, a Berkovich (Berkovich) indenter is pressed on the resin layer 12 at this flat position with a load applied to the indenter at a speed of 10 nm/second from a displacement of 0 nm to a displacement of 100 nm in 10 seconds in such a manner that the maximum indentation displacement is 100 nm, and then, the indenter is retained at a displacement of 100 nm for 5 seconds followed by unloading from a displacement of 100 nm to a displacement of 0 nm in 10 seconds. Then, an indentation depth h (nm) corresponding to an indentation load F(N) thus obtained is continuously measured to prepare a load-displacement curve. From the prepared load-displacement curve, an indentation hardness ($H_{IT}$) is determined in accordance with the below-mentioned equation (1) using a value obtained by dividing the maximum indentation load $F_{max}$(N) by a contact projection area $A_p$ (mm$^2$) over which the indenter is in contact with the first resin layer 22. The arithmetic mean of the measurements at 10 different locations is determined as the indentation hardness ($H_{IT}$) $A_p$ is a contact projection area, for which the tip curvature of the indenter is corrected using fused quartz as a standard sample in accordance with the Oliver-Pharr method.

$$H_{IT}=F_{max}/A_p \quad (1)$$

Measurement of the elastic modulus and the like of the resin layer itself is conceivable to control the physical characteristics of an electroconductive film having a resin layer, but the resin layer having a three-dimensional cross-linked structure is a thin film and brittle, and thus is difficult to form into a monolayer film, making it difficult to measure the elastic modulus and the like of the resin layer in monolayer form. Because of this, the above-mentioned evaluation is carried out by hardness measurement in accordance with a nanoindentation method. This method makes it possible to measure the properties of a film itself without being affected by the light-transmitting base material even if the film is composed of a thin film polymer material, and additionally, the hardness of an elastic/plastic deformed substance can be analyzed from a load-displacement curve in accordance with the equation (1) as above-mentioned.

The film thickness of the resin layer 12 is preferably smaller than the thickness of the light-transmitting base material 13 in terms of removing the positive charge of not only the surface but also the inside of the resin layer 12. Specifically, the resin layer 12 preferably has a film thickness of 0.2 µm or more and 15 µm or less. The resin layer 12 having a film thickness of 0.2 µm or more makes it possible to obtain a desired hardness, and the resin layer 12 having a film thickness of 15 µm or less makes it possible to attempt to make the electroconductive film 10 thinner. The film thickness of the resin layer 12 can be measured by the same measurement method as the film thickness of the light-transmitting base material 13. The maximum film thickness of the resin layer 12 is more preferably 12 µm or less in terms of inhibiting the resin layer 12 from being broken when folded. Additionally, the minimum film thickness of the resin layer 12 is more preferably 0.3 µm or more, 0.5 µm or more, or 0.7 µm or more, in terms of having the properties of a hard coat. Additionally, the maximum film thickness of the resin layer 12 is more preferably 10 µm or less, 5 µm or less, or 2 µm or less, in terms of attempting to make the resin layer 12 thinner. However, the film thickness of the resin layer 12 is preferably smaller than above-mentioned in cases where the resin layers are laminated on both faces of the light-transmitting base material. In this case, the film thickness of each resin layer may be 3 µm or less, 1.5 µm or less, 1 µm or less, or 0.7 µm or less, in attempting to form a thin film and obtain favorable flexibility.

The light-transmitting base material 13 having a small thickness is difficult to handle in processes, for example, difficult to put through a line, apt to elude the line, and susceptible to scratches, and thus, the electroconductive film 10 preferably has the resin layer 12 provided on at least one face of the light-transmitting base material 13. In cases where the electroconductive film 10 is used in flexibility applications, it is important that the resin layer 12 is adhered to the light-transmitting base material 13 and caused to conform to the light-transmitting base material 13 when folded. To form such a resin layer 12 that is adhered to the light-transmitting base material 13 and can conform to the light-transmitting base material 13 when folded, it is important to balance the film thickness of the resin layer 12 with the thickness of the light-transmitting base material 13.

The resin layer 12 is a layer containing at least a resin, and the resin layer 12 may contain inorganic particles, organic particles, and a leveling agent in addition to a resin.

<Resin>

Examples of a resin included in the resin layer 12 include resins containing a polymer (a cured or cross-linked product) of a polymerizable compound. The resin may contain a resin which cures by solvent evaporation, in addition to a polymer of a polymerizable compound. Examples of polymerizable compounds include ionizing radiation-polymerizable compounds and/or thermopolymerizable compounds. Among these, ionizing radiation-polymerizable compounds are preferable as such polymerizable compounds in terms of a higher speed of curing and easiness of designing.

The ionizing radiation-polymerizable compound refers to a compound having at least one ionizing radiation-polymerizable functional group in one molecule. The term "ionizing radiation-polymerizable functional group" as used herein refers to a functional group which can undergo ionizing radiation-induced polymerization. Examples of ionizing radiation-polymerizable functional groups include ethylenic unsaturated groups such as (meth)acryloyl group, vinyl group, and allyl group. Both "acryloyl group" and "methacryloyl group" are meant by the word "(meth)acryloyl group." Additionally, the types of ionizing radiation applied to induce polymerization of an ionizing radiation-polymerizable compound include visible light, ultraviolet light, X ray, electron beam, α ray, β ray, and γ ray.

Examples of ionizing radiation-polymerizable compounds include ionizing radiation-polymerizable monomers, ionizing radiation-polymerizable oligomers, and ionizing radiation-polymerizable prepolymers, and these compounds can be used as appropriate. A combination of an ionizing radiation-polymerizable monomer and an ionizing radiation-polymerizable oligomer or prepolymer is preferred as the ionizing radiation-polymerizable compound.

Examples of ionizing radiation-polymerizable monomers include: monofunctional monomers containing a hydroxyl group(s), such as 2-hydroxyethyl (meth)acrylate, 2-hydroxypropyl (meth)acrylate, and 2-ethylhexyl (meth)acrylate; and bifunctional or polyfunctional monomers, for example, (meth)acrylate esters, such as ethylene glycol di(meth)acrylate, diethylene glycol di(meth)acrylate, triethylene glycol di(meth)acrylate, tetraethylene glycol di(meth) acrylate, tetramethylene glycol di(meth)acrylate, trimethylolpropane tri(meth)acrylate, trimethylolethane tri(meth) acrylate, pentaerythritol di(meth)acrylate, pentaerythritol tri (meth)acrylate, pentaerythritol tetra(meth)acrylate, dipentaerythritol tetra(meth)acrylate, dipentaerythritol hexa (meth)acrylate, and glycerol (meth)acrylate.

A polyfunctional oligomer having two or more functional groups, for example a polyfunctional oligomer having three or more ionizing radiation-polymerizable functional group (i.e., trifunctional or higher), is preferred as the ionizing radiation-polymerizable oligomer. Examples of the above-mentioned polyfunctional oligomer include polyester (meth) acrylate, urethane (meth)acrylate, polyester-urethane (meth) acrylate, polyether (meth)acrylate, polyol (meth)acrylate, melamine (meth)acrylate, isocyanurate (meth)acrylate, and epoxy (meth)acrylate.

The ionizing radiation-polymerizable prepolymer may have a weight average molecular weight of, for example, 10,000. The ionizing radiation-polymerizable prepolymer preferably has a weight average molecular weight of 10,000 or more and 80,000 or less, more preferably 10,000 or more and 40,000 or less. In cases where the weight average molecular weight is more than 80,000, the ionizing radiation-polymerizable prepolymer has a high viscosity and thus reduces the suitability as a coating material, which may deteriorate the appearance of the resulting hard coat layer. Examples of polyfunctional prepolymers include urethane (meth)acrylate, isocyanurate (meth)acrylate, polyester-urethane (meth)acrylate, and epoxy (meth)acrylate.

The thermopolymerizable compound refers to a compound having at least one thermopolymerizable functional group in one molecule. The term "thermopolymerizable functional group" as used herein refers to a functional group which can undergo heat-induced polymerization with the same type of functional group or with other types of functional groups. Examples of thermopolymerizable functional groups include a hydroxyl group, carboxyl group, isocyanate group, amino group, cyclic ether group, and mercapto group.

The thermopolymerizable compound is not limited to a particular thermopolymerizable compound, and examples of the thermopolymerizable compound include epoxy compounds, polyol compounds, isocyanate compounds, melamine compounds, urea compounds, and phenol compounds.

The resin which cures by solvent evaporation refers to a resin, such as a thermoplastic resin, which forms a coat film when a solvent added to the resin for adjusting the content of solids for coating process is evaporated. In forming the resin layer 12, addition of a resin which cures by solvent evaporation can effectively prevent failure in coating on a surface where a coating liquid is applied. The resin which cures by solvent evaporation is not limited to a particular resin, and a thermoplastic resin can generally be used as the resin which cures by solvent evaporation.

Examples of thermoplastic resins can include styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, and rubber or elastomer materials.

The thermoplastic resin is preferably amorphous and soluble in an organic solvent (particularly, a solvent which can generally dissolve a plurality of polymers or curable compounds). In particular, for example, styrene resins, (meth)acrylic resins, alicyclic olefin resins, polyester resins, and cellulose derivatives (such as cellulose esters) are preferred in terms of transparency and/or weather resistance.

<Inorganic Particles>

The inorganic particles are a component intended to increase the mechanical strength and pencil strength of the resin layer 12, and examples of the inorganic particles include inorganic oxide particles, such as silica ($SiO_2$) particles, alumina particles, titania particles, tin oxide particles, antimony-doped tin oxide (abbreviation: ATO) particles, and zinc oxide particles. Among those particles, silica particles are preferred in terms of further increasing the hardness. Examples of silica particles include spherical silica particles and deformed silica particles; among those silica particles, deformed silica particles are preferred. As used herein, the "spherical particles" refer to, for example, spherical or ellipsoidal particles, and "deformed particles" refer to amorphous colloid particles or particles having a randomly rough surface such as observed on potato tubers. The surface area of the above-mentioned deformed particle is larger than that of a spherical particle, and the presence of such deformed particles thus increases the contact area with, for example, the above-mentioned polymerizable compound and successfully improves the pencil hardness of the resin layer 12 to a higher level. Observation of a cross-section of the resin layer 12 with a transmission electron microscope (TEM) or a scanning transmission electron microscope (STEM) can verify whether the silica particles contained in the resin layer 12 are deformed silica particles or not. In cases where spherical silica particles are used, spherical silica particles having a smaller particle diameter lead to higher hardness in the resin layer. In contrast, deformed silica particles can achieve a hardness equivalent to that of commercially available spherical silica particles with the smallest particle diameter even if those deformed silica particles are not as small as those spherical silica particles.

The average primary particle diameter of the deformed silica particles is preferably 1 nm or more and 100 nm or less. Even if deformed silica particles have an average primary particle diameter within the above-mentioned range, the deformed silica particles can achieve a hardness equivalent to that of spherical silica particles with an average primary particle diameter of 1 nm or more and 45 nm or less. The average primary particle diameter of deformed silica particles is determined as the arithmetic mean of the particle diameters of 20 particles, wherein each particle diameter is obtained as the average between the maximum (major axis) and the minimum (minor axis) values of the distance between two points on the circumference of each particle measured on a cross-sectional image of a hard coat layer acquired using a transmission electron microscope (TEM) or a scanning transmission electron microscope (STEM). Additionally, the average particle diameter of spherical silica particles is determined as the arithmetic mean of the particle diameters of 20 particles, wherein the particle diameters of 20 particles are measured on cross-sectional images of particles acquired using a transmission electron microscope (TEM) or a scanning transmission electron microscope (STEM). When cross-sections are imaged using a scanning transmission electron microscope (STEM) (product name "S-4800 (Type 2)"; manufactured by Hitachi High-Technologies Corporation), the cross-sections are observed by setting the detector switch (signal selection) to "TE," the accelerating voltage to "30 kV," and the emission current to "10 μA." As other imaging conditions for acquiring images of cross-sections by STEM, the below-described conditions can be referenced. Additionally, the average primary particle diameter can be determined by binarizing and calculating the image data.

The content of inorganic particles in the resin layer 12 is preferably 20% by mass or more and 70% by mass or less. In cases where the content of inorganic particles is 20% by mass or more, a sufficient hardness can be obtained; additionally, in cases where the content of inorganic particles is 70% by mass or less, the filling ratio is not increased excessively, affording favorable adhesion between the inorganic particles and the resin component, and thus, the hardness of the resin layer is not decreased.

As the inorganic particles, inorganic particles having ionizing radiation-polymerizable functional groups on the surface (reactive inorganic particles) are preferably used. Such inorganic particles having ionizing radiation-polymerizable functional groups on the surface can be produced by surface treatment of inorganic particles with, for example, a silane coupling agent. Examples of the method of treating the surface of inorganic particles with a silane coupling agent include a dry method in which the silane coupling agent is sprayed over the inorganic particles, and a wet method in which the inorganic particles are dispersed in a solvent and the silane coupling agent is then added to the solvent and allowed to react with the inorganic particles.

<Organic Particles>

The organic particles are also a component intended to increase the mechanical strength and pencil strength of the resin layer 12, and examples of the organic particles include plastic beads. Specific examples of the plastic beads include polystyrene beads, melamine resin beads, acrylic beads, acrylic-styrene beads, silicone beads, benzoguanamine beads, benzoguanamine-formaldehyde condensation beads, polycarbonate beads, and polyethylene beads.

The resin layer 12 can be formed using a resin layer composition containing a polymerizable compound or the like. Such a resin layer composition contains the above-mentioned polymerizable compound and the like, and may additionally contain a solvent and a polymerization initiator, if necessary. Furthermore, the resin layer composition may be supplemented with, for example, a conventionally known dispersing agent, surfactant, silane coupling agent, thickener, coloring inhibitor, coloring agent (pigment and dye), antifoam agent, flame retardant, ultraviolet absorber, adhesion promoter, polymerization inhibitor, antioxidant, surface modifier, and/or lubricant in accordance with various purposes of, for example, increasing hardness, reducing cure shrinkage, and/or controlling refractive index in the resin layer.

<Solvent>

Examples of the solvent include alcohols (such as methanol, ethanol, propanol, isopropanol, n-butanol, s-butanol, t-butanol, benzyl alcohol, PGME, and ethylene glycol), ketones (such as acetone, methyl ethyl ketone (MEK), cyclohexanone, methyl isobutyl ketone, diacetone alcohol, cycloheptanone, and diethyl ketone), ethers (such as 1,4-dioxane, dioxolane, diisopropyl ether dioxane, and tetrahydrofuran), aliphatic hydrocarbons (such as hexane), alicyclic hydrocarbons (such as cyclohexane), aromatic hydrocarbons (such as toluene and xylene), halocarbons (such as dichloromethane and dichloroethane), esters (such as methyl formate, methyl acetate, ethyl acetate, propyl acetate, butyl acetate, and ethyl lactate), cellosolves (such as methyl cellosolve, ethyl cellosolve, and butyl cellosolve), cellosolve acetates, sulfoxides (such as dimethyl sulfoxide), amides (such as dimethylformamide and dimethylacetamide), and combinations thereof.

<Polymerization Initiator>

The polymerization initiator is a component that generates radicals or ionic species upon degradation induced by exposure to light or heat and initiates or promotes the polymerization (cross-linking) of a polymerizable compound. Examples of a polymerization initiator used in the resin layer composition include photopolymerization initiators (for example, photo-radical polymerization initiators, photo-cationic polymerization initiators, photo-anionic polymerization initiators), thermal polymerization initiators (for example, thermal radical polymerization initiators, thermal cationic polymerization initiators, thermal anionic polymerization initiators), and combinations thereof.

As above-mentioned, in cases where the electroconductive film 10 is used in flexibility applications, it is important that the resin layer 12 is adhered to the light-transmitting base material 13 and caused to conform to the light-transmitting base material 13 when folded. To form such a resin layer 12 that is adhered to the light-transmitting base material 13 and can conform to the light-transmitting base material 13 when folded, it is preferable to use an oxime ester compound as a polymerization initiator. Examples of commercially available products of oxime ester compounds include IRGACURE OXE01, IRGACURE OXE02, and IRGACURE OXE03 (which are all manufactured by BASF Japan Ltd.). These initiators are preferable particularly for a light-transmitting base material containing a cycloolefin polymer resin.

The content of a polymerization initiator in the resin layer composition is preferably 0.5 parts by mass or more and 10.0 parts by mass or less with respect to 100 parts by mass of the polymerizable compound. By limiting the content of the polymerization initiator to a value within the above range, hard coat properties can be well maintained and cure inhibition can be inhibited.

<<First Electroconductive Part>>

As shown in FIG. 2, the electroconductive part 11 contains electroconductive fibers 15. The electroconductive part 11 contains a light-transmitting resin 16 in addition to the electroconductive fibers 15. However, the first electroconductive part optionally contains no light-transmitting resin in cases where the first electroconductive part contains electroconductive fibers. The term "electroconductive part" as used herein refers to a layer containing electroconductive fibers, which are found by observing a cross-section of the electroconductive film with a scanning transmission electron microscope (STEM) or a transmission electron microscope (TEM). If the boundary surface of the electroconductive part is hard to be observed, the surface of the electroconductive part should undergo any pretreatment process commonly used for electron microscopy, such as formation of a metal layer of Pt—Pd, Au, or the like by sputtering. Additionally, the whole electroconductive film may be embedded in a resin and then stained with osmium tetraoxide, ruthenium tetraoxide, phosphotungstic acid, or the like because such staining enables easier observation of the interface between organic layers.

The electroconductive fibers 15 are placed in the light-transmitting resin 16. The term "electroconductive fiber" as used herein refers to a fiber having electrical conductivity and a length much longer than the thickness (for example, the diameter); for example, the electroconductive fiber will include a fiber having electrical conductivity and a length that is approximately equal to or more than five times as long as the thickness.

The electroconductive part 11 preferably has a surface resistance value of 3Ω/□ or more and 1000Ω/□ or less. In cases where the electroconductive part has a surface resistance value of less than 3Ω/□, the optical characteristics will undesirably be insufficient, and in cases where the electroconductive part has a surface resistance value of more than 1000Ω/□, a defective such as a slower response speed will undesirably occur particularly in touch panel applications. The surface resistance value of the electroconductive part 11 is a surface resistance value measured on the surface 11A. The surface resistance value can be measured in an environment at a temperature of 23±5° C. and a relative humidity of 30% or more and 70% or less using either a contact-type resistivity meter (product name "Loresta-AX MCP-T370"; manufactured by Mitsubishi Chemical Analytech Co., Ltd., Type of sensor: ASP-probe) according to JIS K7194: 1994 (Testing method for resistivity of conductive plastics with a four-point probe array) or a non-destructive (based on the eddy current method) resistivity meter (product name "EC-80P"; manufactured by Napson Corporation; https://www.napson.co.jp/wp/wp-content/uploads/2016/08/Napson_EC80P_Jeaflet_160614.pdf), and preferably measured using a non-destructive resistivity meter, which can accurately measure the surface resistance value independently of the film thickness of an electroconductive part. The non-destructive resistivity meter can start measurement at an arbitrary position on a sample by simple contact of a probe with the sample and without damaging the sample. From this point, it may be referred to as non-contact-type resistivity meter. The surface resistance value of an electroconductive part is measured with a non-destructive resistivity meter by placing a cut piece of the electroconductive film having a size of 80 mm×50 mm on a flat glass plate and bringing a probe into contact with the electroconductive part facing upward. For the measurement of surface resistance value with the EC-80P, the type SW2 is selected for the measurement in the mode M-H sheet resistance (Ω/□) measurement. Additionally, a probe can be easily switched with another type of probe depending on the range of measurement, and probes for the measurement ranges from 10 to 1000Ω/□ and from 0.5 to 10Ω/□ are used in the present embodiment. A resistivity meter EC-80P-PN (manufactured by Napson Corporation) can be used instead of a resistivity meter EC-80P to perform the measurement in the same manner, and P-type conduction may be selected from P-type and N-type conductions for the measurement using this instrument. Additionally, the surface resistance value of an electroconductive part is measured with a contact-type resistivity meter by placing a cut piece of the electroconductive film having a size of 80 mm×50 mm on a flat glass plate and then placing an ASP-probe on the center of the electroconductive part facing upward and evenly pressing all the electrode pins on the electroconductive part. For the measurement of surface resistance value with the contact-type resistivity meter, the mode "Ω/□" as a sheet resistance measurement mode is selected. Once the start button is pushed and the instrument is held, the result of the measurement will be displayed. The measurement of a surface resistance value is carried out in an environment at a temperature of 23±5° C. and a relative humidity of 30% or more and 70% or less independently of the type of a resistivity meter. Additionally, although an electroconductive film to be measured for surface resistance value is placed on a horizontal benchtop, independently of the type of a resistivity meter, to perform the measurement on a flat and even surface, a curled electroconductive film that is unable to keep the surface evenly flat is fixed with tape or the like on a glass plate to perform the measurement. Three measurement locations are in the central part of the electroconductive film and the arithmetic mean of the surface resistance values at the three locations is determined as the surface resistance value. In this respect, the number of measurement locations is 1, 5, or 9 totally according to JIS K7194: 1994. However, once the electroconductive film is actually cut into a size of 80 mm×50 mm and measured as shown in FIG. 5 in JIS K7194: 1994, the electroconductive film may give variable measurement values. Thus, the measurement is carried out on three locations in the central part of the electroconductive part, differing from JIS K7194: 1994. For example, the surface resistance value is measured at the position 1, at a position located between the positions 1 and 7 (preferably, a position close to the position 1), and at a position located between the positions 1 and 9 (preferably, a position close to the position 1) shown in FIG. 5 in JIS K7194: 1994. The preference of a position near the center of a sample for the measurement of surface resistance is also reported in Daichi Isaka and a coworker, "Resistivity measurements for conducting thin films by four-point probe method electroconductive," The Tokyo branch Students' Conference, the Institute of Electronics, Information, and Communication Engineers, 2009 (https://www.ieice.org/tokyo/gakusei/kenkyuu/14/pdf/120.pdf). The minimum surface resistance value of the electroconductive part 11 is more preferably 5Ω/□ or more or 10Ω/□ or more, and the maximum surface resistance value of the electroconductive part 11 is more preferably 100Ω/□ or less, 70Ω/□ or less, 60Ω/□ or less, or 50Ω/□ or less.

The surface resistance value can also be converted from the below-mentioned line resistance value in accordance with the below-mentioned equation (2). In the below-mentioned equation (2), $R_S$ is a surface resistance value (Ω/□), $R_L$ is a line resistance value (Ω), $W_L$ is a line width in measurement of a line resistance value, and $L_L$ is a length in measurement of a line resistance value. A surface resistance value obtained by actual measurement and a surface resistance value converted from a line resistance value in accordance with the following equation are substantially the same.

$$R_S = R_L \times W_L / L_L \quad (2)$$

The electroconductive part 11 preferably has a line resistance value of 60Ω or more and 20000Ω or less. In cases where the electroconductive part has a line resistance value of less than 60Ω, the optical characteristics will undesirably be insufficient, and in cases where the electroconductive part has a line resistance value of more than 20000Ω, a defective such as a slower response speed will undesirably occur particularly in touch panel applications. The line resistance value of the electroconductive part 11 can be measured by bringing the probe terminals of a tester (product name "Digital MΩ Hitester 3454-11" manufactured by Hioki E.E. Corporation) into contact with both ends of a sample in the longitudinal direction, wherein the sample is cut out from the electroconductive film to have a rectangular shape 5 mm wide×100 mm long. Specifically, the Digital MΩ Hitester 3454-11 includes two probe terminals (a red probe terminal and a black probe terminal, which are both pin-type terminals); the red probe terminal is brought into contact with one end of the electroconductive part; the black probe terminal is brought into contact with the other end of the electroconductive part; and thus, the line resistance value of the electroconductive part is measured. The electroconductive part 11 more preferably has a minimum line resistance value of 200Ω or more and a maximum line resistance value of 2000Ω or less. The measurement of the line resistance value is carried out in an environment at a temperature of 23±5° C. and a relative humidity of 30% or more and 70% or less.

The electroconductive part 11 preferably has a film thickness of less than 300 nm. In cases where the electroconductive part has a film thickness of 300 nm or more, the film thickness of the light-transmitting resin is accordingly too thick and all the electroconductive fibers are covered with the light-transmitting resin, so that it is likely that none of the electroconductive fibers are exposed on the surface of the electroconductive part and no electricity is conducted from the surface of the electroconductive part. The thicker the film thickness of the electroconductive part is, the more frequently the electroconductive fibers overlap with each other and a low surface resistance value of 1Ω/□ or more and 10Ω/□ or less can be achieved. However, excessive overlap of the electroconductive fibers may result in difficulty in maintenance of a low haze value. Thus, the film thickness is preferably less than 300 nm. The electroconductive part is preferably a thin film in terms of optical properties and from the viewpoint of thinning the electroconductive film, as long as it can maintain a low surface resistance value. The maximum film thickness of the electroconductive part 11 is more preferably 200 nm or less, 145 nm, 140 nm or less, 120 nm or less, 110 nm or less, 80 nm or less, or 50 nm or less, in terms of attempting to thin the film and obtaining favorable optical characteristics such as a low haze value. Additionally, the minimum film thickness of the electroconductive part 11 is preferably 10 nm or more. In cases where the electroconductive part has a film thickness of less than 10 nm, the film thickness of the light-transmitting resin 16 is accordingly too thin, so that it is likely that some electroconductive fibers are removed from the electroconductive part, or the durability of the electroconductive part is reduced, or the abrasion resistance is reduced. Additionally, each electroconductive fiber preferably has a relatively large fiber diameter to control the instabilities, such as higher tendency for breakage. The fiber diameter that allows each electroconductive fiber to keep stably its form is considered to be 10 nm or more or 15 nm or more. On the other hand, the minimum film thickness of the electroconductive part 11 is more preferably 20 nm or more or 30 nm or more because two or more electroconductive fibers are desired to overlap with and contact with each other to obtain stable electrical conductivity. In this regard, the electroconductive part 11 having a film thickness of less than 300 nm affords a stable resistance value in terms of obtaining flexibility in cases where the above-mentioned gap φ is rather large and where the number of times of repeating the folding and unfolding process is about one hundred thousand. In cases where the above-mentioned gap φ is small and where the number of times of repeating the folding and unfolding process is larger than one hundred thousand, the electroconductive part 11 preferably has a smaller film thickness, for example, preferably 200 nm or less, 145 nm or less, or even 120 nm or less.

The film thickness of the electroconductive part 11 is determined as the arithmetic mean of the film thickness values measured at randomly selected 10 locations, wherein the thickness values are determined at the 10 locations in cross-sectional images of the electroconductive part acquired using a scanning transmission electron microscope (STEM) or a transmission electron microscope (TEM). A specific method of acquiring cross-sectional images will be described below. First, samples for observing a cross-section are produced from an electroconductive film by the same method as above-mentioned. If these samples conduct no electricity, images observed by STEM will appear blurry. Thus, the samples are preferably sputtered with Pt—Pd for about 20 seconds. The sputtering time can be appropriately adjusted but needs careful attention; a period of 10 seconds is too short, and a period of 100 seconds is so long that the metal used for sputtering is observed as particulate foreign bodies. Then, a cross-sectional image of an STEM sample is acquired using a scanning transmission electron microscope (STEM) (product name "S-4800 (Type 2)"; manufactured by Hitachi High-Technologies Corporation). The cross-section is observed and imaged under STEM by setting the detector switch (signal selection) to "TE," the accelerating voltage to "30 kV," and the emission current to "10 µA." The focus, contrast, and brightness are appropriately adjusted at a magnification of 5,000 to 200,000 times so that each layer can be identified. The magnification is preferably in the range from 10,000 to 100,000 times, more preferably in the range from 10,000 to 50,000 times, and most preferably in the range from 25,000 to 50,000 times. The cross-section may be imaged by additionally setting the beam monitor aperture to 3 and the objective lens aperture to 3, and also setting the WD to 8 mm. For the measurement of the film thickness of the electroconductive part, it is important that the contrast at the interface between the electroconductive part and another layer (such as the resin layer or the embedding resin) can be observed as clearly as possible upon observation of a cross-section. If the interface is hard to be observed due to a lack of contrast, the surface of the electroconductive part may undergo any pretreatment process commonly used for electron microscopy, such as formation of a metal layer of Pt—Pd, Pt, Au, or the like by sputtering. Additionally, the sample may be stained with osmium tetraoxide, ruthenium tetraoxide, phosphotungstic acid, or the like because such staining enables easier observation of the interface between organic layers. Additionally, the contrast of the interface may be hard to be observed at a higher magnification. In that case, the sample is also observed at a lower magnification at the same time. For example, a pair of magnifications consisting of a higher magnification and a lower magnification, such as 25,000 and 50,000 times or 50,000 and 100,000 times, is used for observation to obtain the above-mentioned arithmetic means at both the magnifications, and the further averaged value is determined as the film thickness of the electroconductive part.

<Electroconductive Fibers>

The electroconductive fibers 15 are preferably present in plural numbers in the electroconductive part 11. The electroconductive fibers 15 contact with each other in the film thickness direction of the electroconductive part 11, as indicated by the ability of the electroconductive part 11 to conduct electricity from the surface 11A.

In the electroconductive part 11, the electroconductive fibers 15 preferably contact with each other to form a network structure (meshwork) in the surface direction (two-dimensional direction) of the electroconductive part 11. Formation of the electroconductive fibers 15 into a network structure enables a conductive path to be formed.

Some of the electroconductive fibers 15 are preferably exposed on the surface 11A of the electroconductive part 11. In this regard, the electroconductive fibers 15 only need to be partially exposed to the extent that the electroconductive fibers 15 are fixed to the electroconductive part 11, and any protrusion of the electroconductive fibers 15 from the surface 11A of the electroconductive part 11 is encompassed by the exposure of the electroconductive fibers 15 on the surface 11A of the electroconductive part 11. In cases where some electroconductive fibers are not exposed on the surface of the electroconductive part, the electroconductive part may conduct no electricity from the surface. Once electrical conduction from the surface 11A of the electroconductive part 11 is identified, some of the electroconductive fibers 15 can thus be determined to be exposed on the surface 11A of the electroconductive part 11. In the same manner as above-mentioned, measurement of the surface resistance value of an electroconductive part can determine whether or not the electroconductive fibers can conduct electricity from the surface of the electroconductive part. Specifically, in cases where the arithmetic mean of the surface resistance values of an electroconductive part is less than $1 \times 10^6 \Omega/\square$, the electroconductive part can be determined to conduct electricity from the surface.

The electroconductive fibers 15 preferably have a fiber diameter of 100 nm or less. The electroconductive fibers 15 having a fiber diameter of 100 nm or less makes it possible to inhibit the electroconductive film 10 from having a higher haze value and a poor light transmittance. The minimum fiber diameter of the electroconductive fibers 15 is preferably 3 nm or more or 5 nm or more because such a diameter enables the electroconductive fibers to be stably kept in shape as above-mentioned and secure the electroconductivity of the electroconductive part 11. The maximum fiber diameter of the electroconductive fibers 15 is more preferably 50 nm or less or 30 nm or less in terms of transparency. The electroconductive fibers 15 more preferably have a fiber diameter in the range of 7 nm or more and 25 nm or less.

The fiber diameter of the electroconductive fibers 15 will be obtained as the arithmetic mean of the fiber diameters of 100 electroconductive fibers in 50 images acquired at a magnification of 100,000 to 200,000 times, for example, using a transmission electron microscope (TEM) (product name "H-7650"; manufactured by Hitachi High-Technologies Corporation), which are measured on the acquired images by a software program accessory to the TEM. The fiber diameters are measured using the above-mentioned H-7650 by setting the accelerating voltage to "100 kV," the emission current to "10 μA," the condenser lens aperture to "1," the objective lens aperture to "0," the observation mode to "HC," and the Spot to "2." Additionally, the fiber diameters of the electroconductive fibers can also be measured by a scanning transmission electron microscope (STEM) (product name "S-4800 (Type 2)"; manufactured by Hitachi High-Technologies Corporation). In that case, the fiber diameter of the electroconductive fibers will be obtained as the arithmetic mean of the fiber diameters of 100 electroconductive fibers in 50 images acquired at a magnification of 100,000 to 200,000 times using the STEM, which are measured on the acquired images by a software program accessory to the STEM. The fiber diameters are measured using the above-mentioned S-4800 (Type 2) by setting the signal selection to "TE," the accelerating voltage to "30 kV," the emission current to "10 μA," the probe current to "Norm," the focus mode to "UHR," the condenser lens 1 to "5.0," the WD to "8 mm," and the Tilt to "0°."

When the fiber diameter of the electroconductive fibers 15 is determined, a measurement sample produced by the following method is used. In this respect, TEM measurement is carried out at high magnifications and it is consequently critical to reduce the concentration of the electroconductive fiber-containing composition as much as possible for the purpose of preventing overlap of the electroconductive fibers as much as possible. Specifically, the electroconductive fiber-containing composition is preferably diluted with water or alcohol depending on the dispersion medium used in the composition to reduce the concentration of electroconductive fibers to 0.05% by mass or less or to reduce the content of solids to 0.2% by mass or less. Furthermore, a drop of the diluted electroconductive fiber-containing composition is applied on a carbon-coated grid mesh for TEM or STEM observation, dried at room temperature, and then observed under the above-mentioned conditions, and the resulting observation image data is used to calculate the arithmetic mean. As the carbon-coated grid mesh, a Cu grid with the model "#10-1012, Elastic Carbon Film ELS-C10 in the STEM Cu100P grid specification" is preferred, and any grid having better resistance against electron beam exposure and a higher electron beam transmittance than a plastic substrate, and thus being suitable for observation at a high magnification, and having better resistance against organic solvents is also preferred. Additionally, a drop of the diluted electroconductive fiber-containing composition could be applied on a grid mesh placed on a slide glass because the grid mesh is so small that it is difficult to apply the drop of the diluted electroconductive fiber-containing composition on a plain grid mesh.

The above-mentioned fiber diameter can be obtained by image-based measurement or may be calculated from the binarized image data. In the case of actual measurement, images may be printed or enlarged as appropriate. In that case, each electroconductive fiber is visualized in darker black than other components. A starting point and an end point are selected on the outer counter of each fiber and the distance between the starting point and the ending point is measured. The concentration of electroconductive fibers will be obtained based on the ratio of the mass of the electroconductive fibers to the total mass of the electroconductive fiber-containing composition, while the content of solids will be obtained based on the ratio of the mass of all components except for the dispersion medium (including the electroconductive fibers, the resin component, and other additives) to the total mass of the electroconductive fiber-containing composition. The fiber diameter determined using an electroconductive fiber-containing composition and the fiber diameter determined by actual measurement using a photograph are substantially the same values.

The electroconductive fibers 15 preferably have a fiber length of 1 μm or more. In cases where the electroconductive fibers 15 have a fiber length of 1 μm or more, an electroconductive part 11 having sufficient electroconductive performance can be formed, and aggregation can be inhibited, which will not undesirably result in a higher haze value or a lower light transmittance. The maximum fiber length of the electroconductive fibers 15 may be 100 μm or less, 30 μm or less, or 20 μm or less, and the minimum fiber length of the electroconductive fibers 15 may be 3 μm or more or 10 μm or more.

The fiber length of the electroconductive fibers 15 will be obtained as the arithmetic mean of the fiber lengths of 100 electroconductive fibers in 10 images acquired at a magnification of 500 to 20,000,000 times, for example, using a scanning electron microscope (SEM) (product name "S-4800 (Type 2)"; manufactured by Hitachi High-Technologies Corporation) on the SEM mode, which are measured on the acquired images by an accessory software program. The fiber lengths are measured using the above-mentioned S-4800 (Type 2) together with a 45° pre-tilted sample stub by setting the signal selection to "SE," the accelerating voltage to "3 kV," the emission current to "10 µA to 20 µA," the SE detector to "Mixed," the probe current to "Norm," the focus mode to "UHR," the condenser lens 1 to "5.0," the WD to "8 mm," and the Tilt to "30°." Because no TE detector is used for SEM observation, it is essential to remove the TE detector before SEM observation. Although either the STEM mode or the SEM mode can be selected as an operation mode of the above-mentioned S-4800, the SEM mode will be used for the measurement of the above-mentioned fiber length.

When the fiber length of the electroconductive fibers 15 is determined, a measurement sample produced by the following method is used. First, the electroconductive fiber-containing composition is applied on an untreated surface of a polyethylene terephthalate (PET) film in B5 size having a thickness of 50 µm at an application dose of 10 mg/m², and dried to evaporate the dispersion medium and to place electroconductive fibers on the surface of the PET film, and an electroconductive film is thereby produced. A piece having a size of 10 mm×10 mm is cut out of the central part of the electroconductive film. Then, the cut electroconductive film is attached flat against the tilted surface of a 45° pre-tilted SEM sample stub (model number "728-45"; manufactured by Nissin EM Co., Ltd.; 45° pre-tilted sample stub; 15 mm diameter×10 mm height; made of M4 aluminum) using a silver paste. Furthermore, the cut electroconductive film is sputtered with Pt—Pd for 20 to 30 seconds to obtain electrical conductivity. Because an image of the sample without a suitable sputtered film may not be clearly visible, the sputtering process is appropriately modified in that case.

The above-mentioned fiber length can be obtained by image-based measurement or may be calculated from the binarized image data. In the case of image-based measurement, the measurement will be carried out by the same method as above-mentioned. The fiber length determined using an electroconductive fiber-containing composition and the fiber length determined by actual measurement using a photograph are substantially the same values.

The electroconductive fibers 15 are preferably at least one type of fibers selected from the group consisting of electroconductive carbon fibers, metallic fibers, metal-coated organic fibers, metal-coated inorganic fibers, and carbon nanotubes.

Examples of the above-mentioned electroconductive carbon fiber include vapor grown carbon fiber (VGCF), carbon nanotube, wire cup, and wire wall. These electroconductive carbon fibers may be used individually or in combination of two or more.

Preferable examples of the above-mentioned metallic fibers include stainless steel, Ag, Cu, Au, Al, Rh, Ir, Co, Zn, Ni, In, Fe, Pd, Pt, Sn, Ti, and metallic nanowires composed of these alloys, and among the metallic nanowires, silver nanowires are preferable in terms of being capable to achieve a low resistance value, more unlikely to be oxidized, and suitable for wet type coating. As the above-mentioned metallic fibers, fibers produced by, for example, a wire drawing process or coil shaving process that forms a thin and long wire of the above-mentioned metal can be used. Such metallic fibers may be used individually or in combination of two or more.

In cases where silver nanowires are used as metallic fibers, such silver nanowires can be synthesized by liquid phase reduction of a silver salt (for example, silver nitrate) in the presence of a polyol (for example, ethylene glycol) and poly(vinylpyrrolidone). High-volume production of silver nanowires having a uniform size can be achieved, for example, by a method described in Xia, Y. et al., Chem. Mater. (2002), 14, 4736-4745 and Xia, Y. et al., Nanoletters (2003) 3(7), 955-960.

A means of producing metallic nanowires is not limited to any particular one, and a known means, for example, a liquid phase method or a gas phase method, can be used. Additionally, a specific production method is not limited to any particular one, and a known production method can be used. For example, for a method of producing silver nanowires, Adv. Mater., 2002, 14, 833 to 837; Chem. Mater., 2002, 14, 4736 to 4745 and the like can be consulted; for a method of producing gold nanowires, JP2006-233252A and the like can be consulted; for a method of producing Cu nanowires, JP2002-266007A and the like can be consulted; and for a method of producing cobalt nanowires, JP2004-149871A and the like can be consulted.

Examples of the above-mentioned metal-coated organic fibers include acrylic fibers coated with a metal such as gold, silver, aluminium, nickel, or titanium. Such metal-coated synthetic fibers may be used individually or in combination of two or more.

<Light-Transmitting Resin>

The light-transmitting resin 16 covers electroconductive fibers 15 to prevent removal of the electroconductive fibers 15 from the electroconductive part 11 and to improve the durability or abrasion resistance value of the electroconductive part 11, and covers electroconductive fibers 15 to such an extent that the electroconductive part 11 can conduct electricity from the surface 11A. Specifically, the light-transmitting resin 16 preferably covers electroconductive fibers 15 in a manner that will leave some of the electroconductive fibers 15 exposed on the surface 11A of the first electroconductive part 11, because it is likely that the electroconductive part can conduct no electricity from the surface when some electroconductive fibers are not exposed on the surface of the first electroconductive part. For example, the film thickness of the light-transmitting resin 16 is adjusted to cover electroconductive fibers 15 with the light-transmitting resin 16 in a manner that will leave some of the electroconductive fibers 15 exposed on the surface 11A of the electroconductive part 11. In other words, in cases where the film thickness of the light-transmitting resin is too thick, all the electroconductive fibers are covered with the light-transmitting resin, and thus, it is likely that none of the electroconductive fibers are exposed on the surface of the first electroconductive part and that no electricity is conducted from the surface of the first electroconductive part. In cases where the thickness of the light-transmitting resin is too thin, it is likely that some electroconductive fibers are removed from the first electroconductive part, or the durability of the first electroconductive part is reduced, or the abrasion resistance is reduced. Because of this, the thickness of the light-transmitting resin needs to be adjusted to a suitable one.

From the above-mentioned viewpoints, the light-transmitting resin 16 preferably has a thickness of less than 300 nm. The thickness of the light-transmitting resin 16 can be measured by the same measurement method as the film thickness of the electroconductive part 11. The maximum film thickness of the light-transmitting resin 16 is more preferably 200 nm or less, 145 nm or less, 140 nm or less, 120 nm or less, 110 nm or less, 80 nm or less, or 50 nm or less. Additionally, the minimum film thickness of the light-transmitting resin 16 is preferably 10 nm or more.

The light-transmitting resin 16 is not limited to a particular light-transmitting resin as long as it is a light-transmitting resin, and examples of the light-transmitting resin include polymers of polymerizable compounds and thermoplastic resins. Polymerizable compounds similar to those described for the resin layer 12 are included as examples of the polymerizable compound, and further description is thus omitted here.

<<Second Electroconductive Part>>

The electroconductive part 14 is provided directly on the second surface 13B that is the opposite side of the light-transmitting base material 13 from the first surface 13A on the resin layer 12 side. The light-transmitting base material 13 preferably includes no underlayer on the electroconductive part 14 side. With such a structure, even an electroconductive part formed using an electroconductive fiber-containing composition containing electroconductive fibers and a dispersion medium does not cause the electroconductive fibers to come into the light-transmitting base material, thus making it possible to inhibit the electrical resistance value from increasing.

As shown in FIG. 2, the electroconductive part 14 contains electroconductive fibers 17 in the same manner as the electroconductive part 11. The electroconductive part 14 contains a light-transmitting resin 18 in addition to the electroconductive fibers 17. The electroconductive fibers 17 are placed in the light-transmitting resin 18. The electroconductive fibers 17 and the light-transmitting resin 18 are the same as the electroconductive fibers 15 and the light-transmitting resin 16 respectively, and further description is thus omitted here.

The surface resistance value of the electroconductive part 14 is within ±30% of the surface resistance value of the electroconductive part 11. The surface resistance value of the electroconductive part 14 is a surface resistance value measured on the surface 14A. The surface resistance value of the electroconductive part 14 is measured by the same method as the surface resistance value of the electroconductive part 11. The surface resistance value of the electroconductive part 14 is more preferably within ±20%, within ±15%, within ±10%, or within ±5% of the surface resistance value of the electroconductive part 11. The difference ratio (%) of the surface resistance value of the electroconductive part 14 to the surface resistance value of the electroconductive part 11 is determined in accordance with the following equation (3).

$$A=(C-B)/B \times 100 \tag{3}$$

In the equation (3), A is a difference ratio (%) of the surface resistance value of the second electroconductive part to the surface resistance value of the first electroconductive part; B is the surface resistance value of the first electroconductive part; and C is the surface resistance value of the second electroconductive part.

The surface resistance value of the electroconductive part 14 is preferably 3Ω/☐ or more and 1000Ω/☐ or less for the same reason as described for the electroconductive part 11. The minimum surface resistance value of the electroconductive part 14 is more preferably 5Ω/☐ or more or 10Ω/☐ or more, and the maximum surface resistance value of the electroconductive part 14 is more preferably 100Ω/☐ or less, 70Ω/☐ or less, 60Ω/☐ or less, or 50Ω/☐ or less.

The line resistance value of the electroconductive part 14 is within ±30% of the line resistance value of the electroconductive part 11. The line resistance value of the electroconductive part 14 is measured by the same method as the line resistance value of the electroconductive part 11. The line resistance value of the electroconductive part 14 is more preferably within ±20%, within ±15%, within ±10%, or within ±5% of the line resistance value of the electroconductive part 11. In this regard, it is possible that an electrical resistance value in any first direction is low and that, at the same time, an electrical resistance value in the second direction orthogonal to the first direction in the plane of the electroconductive part is higher than the electrical resistance value in the first direction, but even taking this into consideration, the line resistance value of the electroconductive part 14 is within ±30% of the line resistance value of the electroconductive part 11. The difference ratio (%) of the line resistance value of the electroconductive part 14 to the line resistance value of the electroconductive part 11 is determined in accordance with the following equation (4).

$$D=(F-E)/E \times 100 \tag{4}$$

In the equation (4), D is a difference ratio (%) of the line resistance value of the second electroconductive part to the line resistance value of the first electroconductive part; E is the line resistance value of the first electroconductive part; and F is the line resistance value of the second electroconductive part.

The line resistance value of the electroconductive part 14 is preferably 60Ω or more and 20000Ω or less for the same reason as described for the electroconductive part 11. The electroconductive part 14 more preferably has a minimum line resistance value of 200Ω or more and a maximum line resistance value of 2000Ω or less.

The film thickness of the electroconductive part 14 is preferably less than 300 nm for the same reason as described for the electroconductive part 11. The maximum film thickness of the electroconductive part 14 is more preferably 200 nm or less, 145 nm, 140 nm or less, 120 nm or less, 110 nm or less, 80 nm or less, or 50 nm or less, in terms of attempting to thin the film and obtaining favorable optical characteristics such as a low haze value. Additionally, the minimum film thickness of the electroconductive part 14 is more preferably 10 nm or more, 20 nm or more, or 30 nm or more, for the same reason as described for the electroconductive part 11. The film thickness of the electroconductive part 14 can be measured by the same method as for the film thickness of the electroconductive part 11.

The indentation hardness of the electroconductive part 14 is the same as the indentation hardness of the electroconductive part 11 for the same reason as described for the electroconductive part 11, and further description is thus omitted here.

As above-mentioned, an evaluation made by repeating the folding and unfolding process, for example, ten thousand times or fifty thousand times in the above-mentioned successive foldability test can fail to be an evaluation on a practical level. Thus, an evaluation on whether a product is on a practical level needs to be an evaluation based on the successive foldability test carried out by repeating the folding and unfolding process at least one hundred thousand times. Additionally, the required gap φ and number of times of repeating the folding and unfolding process vary depending on the application. In this regard, it is conventionally considered that using a base material having higher foldability such as electroconductive fibers or a polyimide resin affords favorable flexibility even if the gap φ is made narrower and if the number of times of repeating the folding and unfolding process is increased. In some cases, however, a base material composed of a polyimide resin unexpectedly fails to maintenance favorable flexibility depending on the conditions of a foldability test. The present inventors have vigorously studied on this point, and have discovered that a balance between the film thicknesses of the layers is important to obtain favorable flexibility for an electroconductive film containing electroconductive fibers.

Specifically, the film thickness is preferably in the below-mentioned range in cases where the above-mentioned gap φ and the number of times of repeating the folding and unfolding process are 4 mm or more and one hundred thousand or less respectively in the above-mentioned foldability test. In cases where the light-transmitting base material 13 contains a polyethylene terephthalate resin, it is preferable that the thickness of the light-transmitting base material 13 containing a polyethylene terephthalate resin is 3 μm or more and 45 μm or less, that the film thickness of the resin layer 12 is 0.2 μm or more and 3 μm or less, and that the film thicknesses of the electroconductive parts 11 and 14 are each 10 nm or more and less than 300 nm. In cases where the light-transmitting base material 13 contains a cycloolefin polymer resin, it is preferable that the thickness of the light-transmitting base material 13 containing a cycloolefin polymer resin is 3 μm or more and 45 μm or less, that the film thickness of the resin layer 12 is 0.2 μm or more and 3 μm or less, and that the film thicknesses of the electroconductive parts 11 and 14 are each 10 nm or more and less than 300 nm. In cases where the light-transmitting base material 13 contains a polyimide resin, it is preferable that the thickness of the light-transmitting base material 13 containing a polyimide resin is 3 μm or more and 75 μm or less, that the film thickness of the resin layer 12 is 0.2 μm or more and 3 μm or less, and that the film thicknesses of the electroconductive parts 11 and 14 are each 10 nm or more and less than 300 nm. Furthermore in these cases, the thickness (total thickness) of the electroconductive film 10 is preferably 5 μm or more and 45 μm or less.

The film thickness is preferably in the below-mentioned range in cases where the above-mentioned gap φ and the number of times of repeating the folding and unfolding process are 4 mm or more and two hundred thousand or less respectively in the above-mentioned foldability test. In cases where the light-transmitting base material 13 contains a cycloolefin polymer resin, it is preferable that the thickness of the light-transmitting base material 13 containing a cycloolefin polymer resin is 3 μm or more and 45 μm or less, that the film thickness of the resin layer 12 is 0.2 μm or more and 1.5 μm or less, and that the film thicknesses of the electroconductive parts 11 and 14 are each 10 nm or more and 200 nm or less. In cases where the light-transmitting base material 13 contains a polyimide resin, it is preferable that the thickness of the light-transmitting base material 13 containing a polyimide resin is 3 μm or more and 75 μm or less, that the film thickness of the resin layer 12 is 0.2 μm or more and 1.5 μm or less, and that the film thicknesses of the electroconductive parts 11 and 14 are each 10 nm or more and 200 nm or less. In cases where the above-mentioned gap φ and the number of times of repeating the folding and unfolding process are 4 mm or more and two hundred thousand or less respectively in the above-mentioned foldability test, the light-transmitting base material containing a polyethylene terephthalate resin can be made usable by making the light-transmitting base material itself thinner if the thickness of the light-transmitting base material 13 containing a polyethylene terephthalate resin is 5 μm or more and 25 μm or less, if the film thickness of the resin layer 12 is 0.2 μm or more and 1.5 μm or less, and if the film thicknesses of the electroconductive parts 11 and 14 are each 10 nm or more and 200 nm or less, but in some of such cases, a protective film is needed during processing. Furthermore in these cases, the thickness (total thickness) of the electroconductive film 10 is preferably 5 μm or more and 35 μm or less.

The film thickness is preferably in the below-mentioned range in cases where the above-mentioned gap φ and the number of times of repeating the folding and unfolding process are 2 mm or more and three hundred thousand or less respectively in the above-mentioned foldability test. In cases where the light-transmitting base material 13 contains a cycloolefin polymer resin, it is preferable that the thickness of the light-transmitting base material 13 containing a cycloolefin polymer resin is 3 μm or more and 45 μm or less, that the film thickness of the resin layer 12 is 0.2 μm or more and 1.5 μm or less, and that the film thicknesses of the electroconductive parts 11 and 14 are each 10 nm or more and 200 nm or less. In this case, the maximum thickness of the light-transmitting base material 13 is more preferably 30 μm or less, and the maximum thickness of the resin layer 12 is more preferably 1 μm or less or 0.7 μm or less. In cases where the above-mentioned gap φ and the number of times of repeating the folding and unfolding process are 2 mm or more and three hundred thousand or less respectively in the above-mentioned foldability test, the light-transmitting base material containing a polyethylene terephthalate resin or a polyimide resin can be made usable by making the light-transmitting base material itself thinner if the thickness of the light-transmitting base material 13 containing a polyethylene terephthalate resin is 5 μm or more and 15 μm or less, if the film thickness of the resin layer 12 is 0.2 μm or more and 1.5 μm or less, and if the film thicknesses of the electroconductive parts 11 and 14 are each 10 nm or more and 200 nm or less, or if the thickness of the light-transmitting base material 13 containing a polyimide resin is 5 μm or more and 25 μm or less, if the film thickness of the resin layer 12 is 0.2 μm or more and 1.5 μm or less, and if the film thicknesses of the electroconductive parts 11 and 14 are each 10 nm or more and 200 nm or less, but in some of such cases, a protective film is needed during processing. Furthermore in these cases, the thickness (total thickness) of the electroconductive film 10 is preferably 5 μm or more and 35 μm or less, more preferably 30 μm or less.

The film thickness is preferably in the below-mentioned range in cases where the above-mentioned gap φ and the number of times of repeating the folding and unfolding process are 2 mm or more and five hundred thousand or less respectively in the above-mentioned foldability test. In cases where the light-transmitting base material 13 contains a cycloolefin polymer resin, it is preferable that the thickness of the light-transmitting base material 13 containing a cycloolefin polymer resin is 3 μm or more and 30 μm or less, that the film thickness of the resin layer 12 is 0.2 μm or more and 1 μm or less, and that the film thicknesses of the electroconductive parts 11 and 14 are each 10 nm or more and 145 nm or less. In this case, the maximum thickness of the light-transmitting base material 13 is more preferably 20 μm or less, and the maximum thickness of the resin layer 12 is more preferably 0.7 μm or less. Furthermore in these cases, the thickness (total thickness) of the electroconductive film 10 is preferably 5 μm or more and 25 μm or less, more preferably 20 μm or less.

<<<Other Electroconductive Films>>>

The electroconductive film 10 shown in FIG. 1 includes a resin layer only on one face of the light-transmitting base material, but may include resin layers on both faces of the light-transmitting base material as in shown in FIG. 5. Specifically, the electroconductive film 30 shown in FIG. 5 further has a resin layer 31 between the light-transmitting base material 13 and the electroconductive part 14. Having the resin layers 12 and 31 on both faces of the light-transmitting base material 13 makes it possible to inhibit curl from being caused by shrinkage of the resin layers and block components precipitated from the light-transmitting base material 13, thus making it possible to enhance the durability of the electroconductive film 30 and inhibit damage to the light-transmitting base material 13 during patterning. In FIG. 2 and the subsequent drawings, the elements indicated by the same reference numbers as in FIG. 1 are the same as those indicated in FIG. 1, and further description is thus omitted.

<<Resin Layer>>

The resin layer 31 shown in FIG. 5 is adjacent to the light-transmitting base material 13 and the electroconductive part 14, but is optionally not adjacent to the base material or the part. The resin layer 31 is similar to the resin layer 12, and further description is thus omitted. In this regard, the components and film thickness of the resin layer 31 may be the same as or different from those of the resin layer 12.

The balance between the thickness of the light-transmitting base material 13 and the film thicknesses of the resin layers 12 and 31 and the electroconductive parts 11 and 14 are preferably in the same range as above-mentioned in cases where the above-mentioned gap φ and the number of times of repeating the folding and unfolding process in the above-mentioned foldability test are 4 mm or more and one hundred thousand or less respectively, in cases where the above-mentioned gap φ and the number of times of repeating the folding and unfolding process in the above-mentioned foldability test are 4 mm or more and two hundred thousand or less respectively, in cases where the above-mentioned gap φ and the number of times of repeating the folding and unfolding process in the above-mentioned foldability test are 2 mm or more and three hundred thousand or less respectively, and in cases where the above-mentioned gap φ and the number of times of repeating the folding and unfolding process in the above-mentioned foldability test are 2 mm or more and five hundred thousand or less respectively. In this regard, the film thickness of the resin layer 31 in these cases is the same as the film thickness of the resin layer 12.

Additionally, the electroconductive parts 11 and 14 of the electroconductive film 10 shown in FIG. 1 are layered and not patterned, but as shown in FIG. 6, the first electroconductive part and second electroconductive part of the electroconductive film may be patterned. The electroconductive film 40 shown in FIG. 6 includes a first electroconductive part 41 (hereinafter, optionally referred to simply as the "electroconductive part 41"), a resin layer 12, a light-transmitting base material 13, and a second electroconductive part 42 (hereinafter, optionally referred to simply as the "electroconductive part 42") in this order. The electroconductive parts 41 and 42 are patterned in predetermined shape and present in plural numbers. Additionally, the electroconductive film 40 shown in FIG. 6 includes, in addition to the electroconductive parts 41 and 42, a first nonconductive part 43 (hereinafter, optionally referred to simply as the "nonconductive part 43") between the electroconductive parts 41 and a second nonconductive part 44 (hereinafter, optionally referred to simply as the "nonconductive part 44") between the electroconductive parts 42.

The surface 40A of the electroconductive film 40 is formed by the surface 42A of the second electroconductive part 42 and the surface 44A of the nonconductive part 44, and the back face 40B that is the opposite side of the electroconductive film 40 from the surface 40A is formed by the surface 41A of the first electroconductive part 41 and the surface 43A of the nonconductive part 43.

<<First Electroconductive Part>>

As shown in FIG. 8, the electroconductive part 41 contains electroconductive fibers 45. The electroconductive part 41 contains a light-transmitting resin 46 in addition to the electroconductive fibers 45. However, the first electroconductive part optionally contains no light-transmitting resin in cases where the first electroconductive part contains electroconductive fibers. The electroconductive fibers 45 are placed in the light-transmitting resin 46. The electroconductive fibers 45 and the light-transmitting resin 46 are the same as the electroconductive fibers 15 and the light-transmitting resin 16 respectively, and further description is thus omitted here.

The surface resistance value, line resistance value, and film thickness of the electroconductive part 41 are the same as the surface resistance value, line resistance value, and film thickness of the electroconductive part 11 for the same reason as described for the electroconductive part 11, and further description is thus omitted here.

The electroconductive parts 41 function as electrode lines in the X direction in a projected capacitive touch panel. As shown in FIG. 7, the electroconductive parts 41 include a plurality of sensing electrodes 41B extending in the X direction and connectors (not shown) each linked with each sensing electrode 41B.

Each sensing electrode 41B is located at a rectangular active area for sensing a touch position, and each connector is located at a non-active area adjacent to and surrounding the active area.

Each sensing electrode 41B includes a straight extending linear portion 41C and an expanded portion 41D extending from the linear portion 41C. In FIG. 7, linear portions 41C extend straight along a direction intersecting with the arrangement direction of sensing electrodes 41B. The expanded portion 41D is an outwardly expanded portion extending from a linear portion 41C on the surface of the light-transmitting base material 13. Thus, the width of each sensing electrode 41B is broadened at an area where an expanded portion 41D is provided. In the present embodiment, each expanded portion 41D has an outer contour in a substantially square shape. The shape of each expanded portion 41D is not limited to a substantially square shape and it may take a diamond shape or a stripe shape.

<<Second Electroconductive Part>>

The electroconductive part 42 is provided directly on the opposite face of the light-transmitting base material 13 from the face on the resin layer 12 side. The electroconductive part 42 shown in FIG. 6 is also adjacent to the light-transmitting base material 13.

As shown in FIG. 8, the second electroconductive part 42 contains electroconductive fibers 47 in the same manner as the first electroconductive part 41. The second electroconductive part 42 contains a light-transmitting resin 48 in addition to the electroconductive fibers 47. The electroconductive fibers 47 are placed in the light-transmitting resin 48. The electroconductive fibers 47 and the light-transmitting resin 48 are the same as the electroconductive fibers 15 and the light-transmitting resin 16 respectively, and further description is thus omitted here.

The surface resistance value of the electroconductive part 42 is within ±30% of the surface resistance value of the electroconductive part 41. The surface resistance value of the electroconductive part 42 is a surface resistance value measured on the surface 42A. The surface resistance value of the electroconductive part 42 is measured by the same method as the surface resistance value of the electroconductive part 11, and the difference ratio is calculated by the same method as for the electroconductive film 10. The surface resistance value of the electroconductive part 42 is more preferably within ±20%, within ±15%, within ±10%, or within ±5% of the surface resistance value of the electroconductive part 11.

The surface resistance value, line resistance value, and film thickness of the electroconductive part 41 are the same as the surface resistance value, line resistance value, and film thickness of the electroconductive part 11 for the same reason as described for the electroconductive part 11, and further description is thus omitted here.

The electroconductive parts 42 function as electrode lines in the Y direction in a projected capacitive touch panel. As shown FIG. 7, the electroconductive parts 42 include a plurality of sensing electrodes 42B extending in the Y direction and connectors (not shown) each linked with each sensing electrode 42B.

Each sensing electrode 42B is located at a rectangular active area for sensing a touch position, and each connector is located at a non-active area adjacent to and surrounding the active area.

Each sensing electrode 42B includes a straight extending linear portion 42C and an expanded portion 42D extending from the linear portion 42C. In FIG. 6, linear portions 42C extend straight along a direction intersecting with the arrangement direction of sensing electrodes 42B. The expanded portion 42D is an outwardly expanded portion extending from a linear portion 42C on the surface of the light-transmitting base material 13. Thus, the width of each sensing electrode 42B is broadened at an area where an expanded portion 42D is provided. In the present embodiment, each expanded portion 42D has an outer contour in a substantially square shape. The shape of each expanded portion 42D is not limited to a substantially square shape and it may take a diamond shape or a stripe shape.

<<First Nonconductive Part and Second Nonconductive Part>>

The nonconductive parts 43 are parts each sandwiched between the electroconductive parts 41 and having no electrical conductivity, and the nonconductive parts 44 are parts each sandwiched between the electroconductive parts 42 and having no electrical conductivity. Herein, the nonconductive part is regarded as having no electrical conductivity in cases where the resistance on the surface of the nonconductive part (surface resistance value) is 1500Ω/□ or more. As shown in FIG. 8, the nonconductive part 43 contains a light-transmitting resin 46, and contains substantially no electroconductive fibers 45. Additionally, the nonconductive parts 44 contain a light-transmitting resin 48, and contains substantially no electroconductive fibers 47. As used herein, the word "substantially" means that such a nonconductive part may contain a small amount of electroconductive fibers as long as the nonconductive part has no electrical conductivity. For example, the nonconductive part may contain a small amount of electroconductive fibers under a condition where the nonconductive part has no electrical conductivity even if metal ions from the electroconductive parts migrate to and permeated into the nonconductive part. The nonconductive part 43 preferably contain none of the electroconductive fibers 45, and the nonconductive part 44 preferably contain none of the electroconductive fibers 47. When electroconductive fibers 45 and 47 are removed from the nonconductive parts 43 and 44 by sublimating the electroconductive fibers 45 and 47 through exposure to laser light as described below, a certain amount of an electroconductive material as a component of the electroconductive fibers 45 and 47 may be left as a residue. However, the residual electroconductive materials are not considered as electroconductive fibers because those residual materials are not in fiber form.

The nonconductive part 43 is integrally formed with the electroconductive part 41, thus preferably having a thickness of less than 300 nm, and the nonconductive part 44 is integrally formed with the electroconductive part 42, thus preferably having a thickness of less than 300 nm. The maximum film thickness of each of the nonconductive parts 43 and 44 is more preferably 200 nm or less, 145 nm or less, 140 nm or less, 120 nm or less, 110 nm or less, 80 nm or less, or 50 nm or less, in terms of attempting to thin the film and obtaining favorable optical characteristics such as a low haze value. Additionally, the minimum film thickness of each of the nonconductive parts 43 and 44 is more preferably 10 nm or more, 20 nm or more, or 30 nm or more. The film thickness of each of the nonconductive parts 43 and 44 is measured by the same method as the film thickness of the electroconductive part 11.

<<Production Methods of Electroconductive Films>>

Figure 9A:
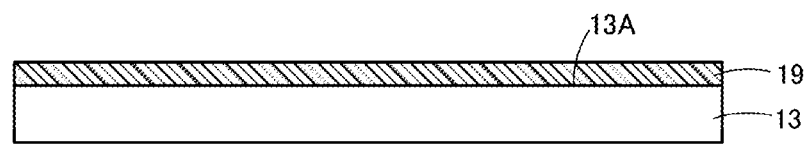
FIGS. 9(A) and 9(B) schematically illustrate the process for producing the electroconductive film according to the first embodiment.

The electroconductive film 10 can be produced, for example, as follows. First, a resin layer composition is applied on the first surface 13A of the light-transmitting base material 13 and dried to form a coating film 19 of the resin layer composition, as shown in FIG. 9(A). Here, in cases where the light-transmitting base material 13 has an underlayer on one face thereof, the first surface 13A is preferably the surface of the underlayer.

The method of applying the resin layer composition include known coating methods, such as spin coating, dipping, spraying, slide coating, bar coating, roll coating, gravure coating, and die coating methods.

Figure 9B:
Figure 9B:

Next, the coating film 19 is exposed to ionizing radiation such as ultraviolet light or heated, as shown in FIG. 9(B), to polymerize (cross-link) the polymerizable compound and to cure the coating film 19, whereby a resin layer 12 is formed.

In cases where ultraviolet light is used as the ionizing radiation to cure the coating film 19, the ultraviolet light or the like emitted from, for example, a super high pressure mercury lamp, high pressure mercury lamp, low pressure mercury lamp, carbon arc lamp, xenon arc lamp, or metal halide lamp can be used. Additionally, the wavelength range from 190 to 380 nm can be used as the wavelength of ultraviolet light. Specific examples of the source of electron beam include various types of electron beam accelerators, such as Cockcroft-Walton type, Van de Graft type, resonant transformer type, insulating core transformer type, linear type, Dynamitron type, and high frequency type accelerators.

After the resin layer 12 is formed, the resin layer 12 is subjected to static elimination. The static elimination can be carried out using, for example, a voltage application type static eliminator (product name "SJ-H156A", manufactured by Keyence Corporation). In this regard, the static eliminator may be placed, for example, 50 mm apart from the resin layer 12.

Figure 10A:
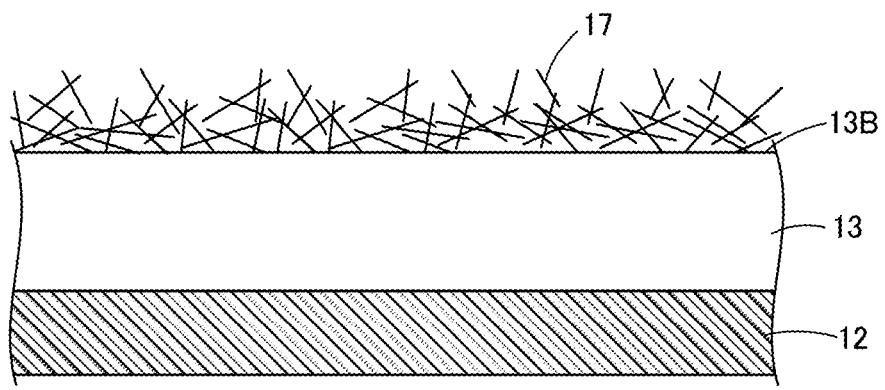
FIGS. 10(A) and 10(B) schematically illustrate the process for producing the electroconductive film according to the first embodiment.

After the resin layer 12 is subjected to static elimination, an electroconductive fiber-containing composition containing electroconductive fibers 17 and a dispersion medium is applied on the second surface 13B of the light-transmitting base material 13, and dried, followed by arranging a plurality of electroconductive fibers 17 on the second surface 13B of the light-transmitting base material 13, as shown in FIG. 10(A). The electroconductive fiber-containing composition may contain a resin material consisting of a thermoplastic resin or a polymerizable compound, in addition to the electroconductive fibers 17 and the dispersion medium. The term "resin material" as used herein inclusively refers to a component such as a polymerizable compound that can be polymerized to a resin, in addition to a resin (however, excluding a resin (for example, polyvinylpyrrolidone) as a component of an organic protective layer that is formed surrounding electroconductive fibers in the synthesis of the electroconductive fibers, for the purpose of, for example, preventing the electroconductive fibers from weld anchoring to each other or from reacting with substances in the atmosphere). In this regard, the resin material in the electroconductive fiber-containing composition becomes an integral part of the light-transmitting resin after the second electroconductive part is formed.

The dispersion medium may be either an organic dispersion medium or a water-based dispersion medium. However, in cases where the content of the resin material in the electroconductive fiber-containing composition is excessively high, the resin material permeates into the space between the electroconductive fibers, and the electrical conductivity of the electroconductive part is consequently deteriorated. In particular, in cases where the electroconductive part has a small film thickness, the electrical conductivity of the electroconductive part is more likely to be deteriorated. Additionally, use of an organic dispersion medium allows the electroconductive fiber-containing composition to have a lower resin content than use of a water-based dispersion medium. Because of this, an organic dispersion medium is preferably used in forming the electroconductive part 14 having a small film thickness, for example, a film thickness of 300 nm. The organic dispersion medium may contain water in a content of 10% by mass.

The organic dispersion medium is not limited to a particular organic dispersion medium, and is preferably a hydrophilic organic dispersion medium. Examples of the organic dispersion medium include saturated hydrocarbons, such as hexane; aromatic hydrocarbons, such as toluene and xylene; alcohols, such as methanol, ethanol, propanol, and butanol; ketones, such as acetone, methyl ethyl ketone (MEK), methyl isobutyl ketone, and diisobutyl ketone; esters, such as ethyl acetate and butyl acetate; ethers such as tetrahydrofuran, dioxane, and diethyl ether; amides, such as N,N-dimethylformamide, N-methylpyrrolidone (NMP), and N,N-dimethylacetamide, and halogenated hydrocarbons, such as ethylene chloride and chlorobenzene. Among those organic dispersion media, alcohols are preferred in terms of the stability of the electroconductive fiber-containing composition. Examples of water-based dispersion media include water.

Examples of a thermoplastic resin that may be contained in the electroconductive fiber-containing composition include acrylic resins; polyester resins, such as polyethylene terephthalate; aromatic resins, such as polystyrene, polyvinyl toluene, polyvinyl xylene, polyimide, polyamide, and polyamideimide; polyurethane resins; epoxy resins; polyolefin resins; acrylonitrile-butadiene-styrene copolymer (ABS); cellulose-based resins; polyvinyl chloride resins; polyacetate resins; polynorbornene resins; synthetic rubber; and fluorine-based resins.

Examples of a polymerizable compound that may be contained in the electroconductive fiber-containing composition include polymerizable compounds similar to that described for the resin layer 12, and further description is thus omitted here.

Figure 10B:
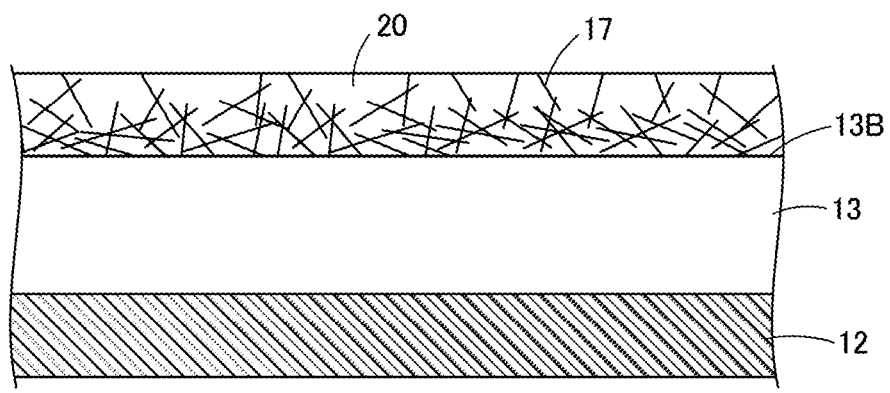

After a plurality of the electroconductive fibers 17 are placed on the second surface 21B of the light-transmitting base material 13, a light-transmitting resin composition containing a polymerizable compound and a solvent is applied on it and dried to form a coating film 20 of the light-transmitting resin composition, as shown in FIG. 10(B). The light-transmitting resin composition containing the polymerizable compound and the solvent may additionally contain a polymerization initiator and a reaction inhibitor as necessary.

Figure 11A:
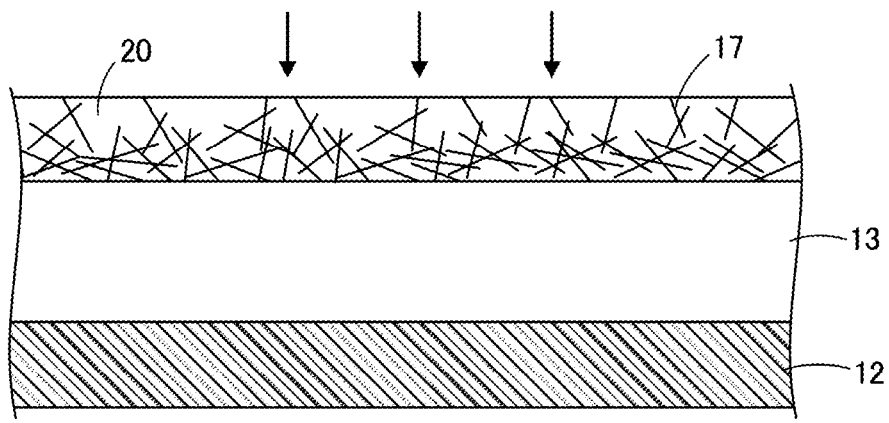
FIGS. 11(A) and 11(B) schematically illustrate the process for producing the electroconductive film according to the first embodiment.

Next, the coating film 20 is exposed to ionizing radiation such as ultraviolet light, as shown in FIG. 11(A), to polymerize (cross-link) the polymerizable compound and to cure the coating film 20, whereby the light-transmitting resin 18 is formed to form the electroconductive part 14.

Figure 11B:
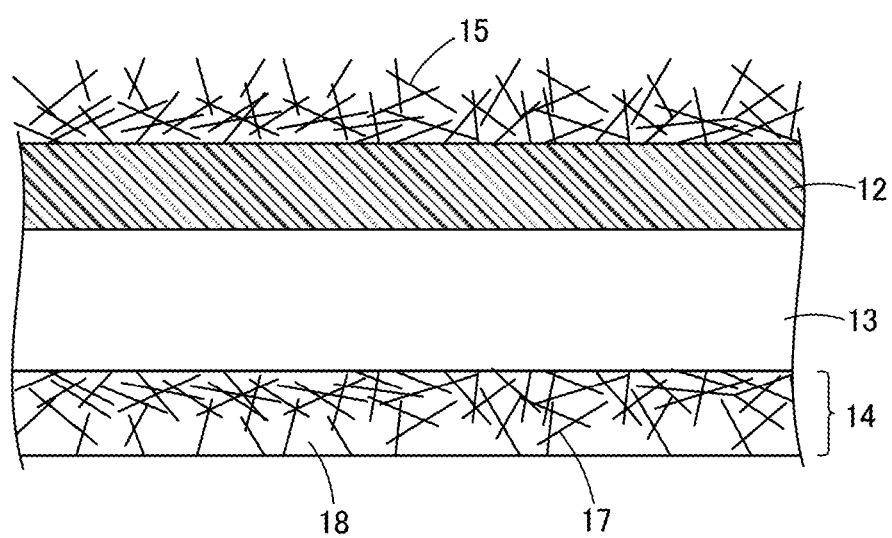

After the electroconductive part 14 is formed, an electroconductive fiber-containing composition containing electroconductive fibers 15 and a dispersion medium is applied on the opposite face of the resin layer 12 from the surface of the light-transmitting base material 13, and dried to place a plurality of the electroconductive fibers 15 on the resin layer 12, as shown in FIG. 11(B). The electroconductive fiber-containing composition is the same as that used in forming the electroconductive part 14, and further description is thus omitted here.

Figure 12A:
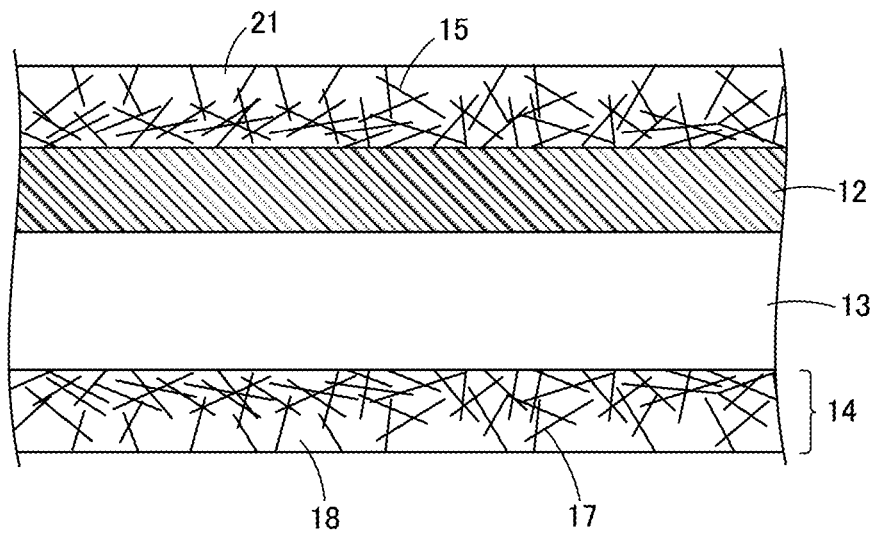
FIGS. 12(A) and 12(B) schematically illustrate the process for producing the electroconductive film according to the first embodiment.

After the electroconductive fibers 15 are placed on the resin layer 12, a light-transmitting resin composition containing a polymerizable compound and a solvent is applied on it and dried to form a coating film 21 of the light-transmitting resin composition, as shown in FIG. 12(A). The light-transmitting resin composition is the same as that used in forming the electroconductive part 14, and further description is thus omitted here.

Figure 12B:
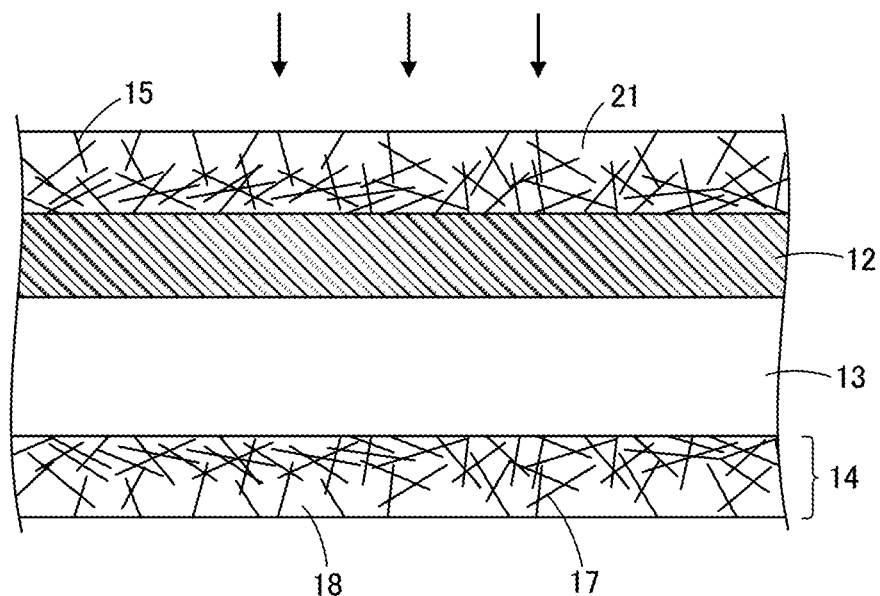

Next, the coating film 21 is exposed to ionizing radiation such as ultraviolet light, as shown in FIG. 12(B), to polymerize (cross-link) the polymerizable compound and to cure the coating film 21, whereby the light-transmitting resin 16 is formed to form the electroconductive part 11. In this manner, the electroconductive film 10 shown in FIG. 1 is formed.

In order that the electroconductive film 30 shown in FIG. 5 can be obtained, the resin layer 31 is formed in the same manner as the resin layer 12, and the resin layer 31 is subjected to static elimination in the same manner as the resin layer 12.

In order that the electroconductive film 40 shown in FIG. 6 can be obtained, the electroconductive film 10 is formed, and then, predetermined regions of each of the electroconductive parts 11 and 14 are exposed to laser light (for example, infrared laser) to pattern each of the electroconductive parts 11 and 14. Upon exposure of the predetermined regions to laser light, the electroconductive fibers 15 and 17 included in the regions are sublimated by the heat of the laser light. The sublimated electroconductive fibers 15 and 17 burst out through the light-transmitting resins 16 and 18 and are discharged out of the light-transmitting resins 16 and 18. Thus, an electroconductive film 40 including the electroconductive parts 41 and 42 shown in FIG. 6 and further including the nonconductive parts 43 and 44 can be obtained.

In cases where the first electroconductive part is provided at one face of the electroconductive film and where the second electroconductive part is provided at the other face, the first electroconductive part and the second electroconductive part have a large difference in the electrical resistance value therebetween, conceivably for the below-mentioned reason. In forming the resin layer or the like, the light-transmitting base material in roll shape is first unreeled, and at this time, the light-transmitting base material is positively charged. Here, when positive charge of the light-transmitting base material is statically eliminated using a static elimination device, the positive charge present on the surface of the light-transmitting base material is statically eliminated, but the positive charge present inside is not statically eliminated. Because of this, forming the second electroconductive part before forming the resin layer allows the positive charge remaining inside the light-transmitting base material to migrate to the second electroconductive part side, causing the second electroconductive part to be affected by the positive charge. The first electroconductive part has a resin layer next thereto, and thus, is unlikely to be affected by the positive charge, and consequently, the first electroconductive part and the second electroconductive part conceivably have a large difference in the electrical resistance value therebetween. In this embodiment, however, the resin layer 12 is formed on the light-transmitting base material 13 before the second electroconductive part 14 is formed, and thus, the positive charge remaining inside the light-transmitting base material 13 migrates to the resin layer 12 side. In particular, in cases where the resin layer 12 contains, as a resin, a polymeric product of an ionizing radiation-polymerizable compound, the positive charge remaining inside the light-transmitting base material 13 is more likely to migrate to the resin layer 12 side, although the reason for this is unknown. Thus, the second electroconductive part 14 formed is more unlikely to be affected by the positive charge. Additionally, the film thickness of the resin layer 12 is smaller than the thickness of the light-transmitting base material 13, and thus, the positive charge present not only on the surface of the resin layer 12 but also inside can be statically eliminated using a static elimination device in forming the first electroconductive part 11. Thus, the first electroconductive part 11 is also more unlikely to be affected by the positive charge. This makes it possible that the surface resistance value of the second electroconductive part 14 is within ±30% of the surface resistance value of the first electroconductive part 11 and that the line resistance value of the second electroconductive part 14 is within ±30% of the line resistance value of the first electroconductive part 11, and thus, the first electroconductive part 11 and the second electroconductive part 14 can have a decreased difference in the electrical resistance value therebetween. For the same reason, the first electroconductive part 11 and the second electroconductive part 14 can have a decreased difference in the electrical resistance value therebetween also in the electroconductive film 30 having the resin layers 12 and 31 on both faces of the light-transmitting base material 13. In this regard, the film thickness of the electroconductive part is smaller than the thickness of the light-transmitting base material, and thus, the formation of the electroconductive part followed by the static elimination of the electroconductive part is conceivably more unlikely to be affected by the positive charge, but the formation of the electroconductive part followed by the static elimination of the electroconductive part does not cause the effect of the static elimination very much, and will undesirably not make it possible to decrease a difference in the surface resistance value or the line resistance value. Because of this, the static elimination needs to be carried out before formation of the electroconductive part.

In cases where two electroconductive films each including a resin layer, a light-transmitting base material, and an electroconductive part in this order and having the electroconductive part only on one face are superposed to form a touch panel, two light-transmitting base materials and two resin layers are used, and the electroconductive films are adhered to each other via an adhesive layer. In the present embodiment, however, use of the electroconductive film 10 having the electroconductive parts 11 and 14 makes it possible to omit one light-transmitting base material, one resin layer, and one adhesive layer compared with use of two superposed electroconductive films each having an electroconductive part only on one face. This makes it possible to attempt to thin touch panels and image display devices.

Minute irregularities are present on the surface of the light-transmitting base material, and thus, can increase the external haze, but according to the present embodiment, the resin layer 12 is provided on the first face 13A of the light-transmitting base material 13, and thus, the resin layer 12 can fill up the minute irregularities present on first face 13A of the light-transmitting base material 13. This makes it possible to decrease the external haze value. In some cases, heating the light-transmitting base material allows an oligomer component to be precipitated from the light-transmitting base material, increases the external haze value, and causes the transparency to be reduced. In the present embodiment, however, forming the resin layer 12 on the first face 13A of the light-transmitting base material 13 makes it possible to inhibit an oligomer component from being precipitated from the light-transmitting base material 13. This makes it possible to inhibit an increase in the haze value of the electroconductive film 10 and secure the transparency even in cases where the electroconductive film 10 is heated.

According to the present embodiment, the use of electroconductive fibers 15 and 17, differing from ITO, enables providing an electroconductive film 10 which is hardly broken when folded. Thus, the electroconductive film 10 can be incorporated into a foldable image display device and then used.

Figure 13:
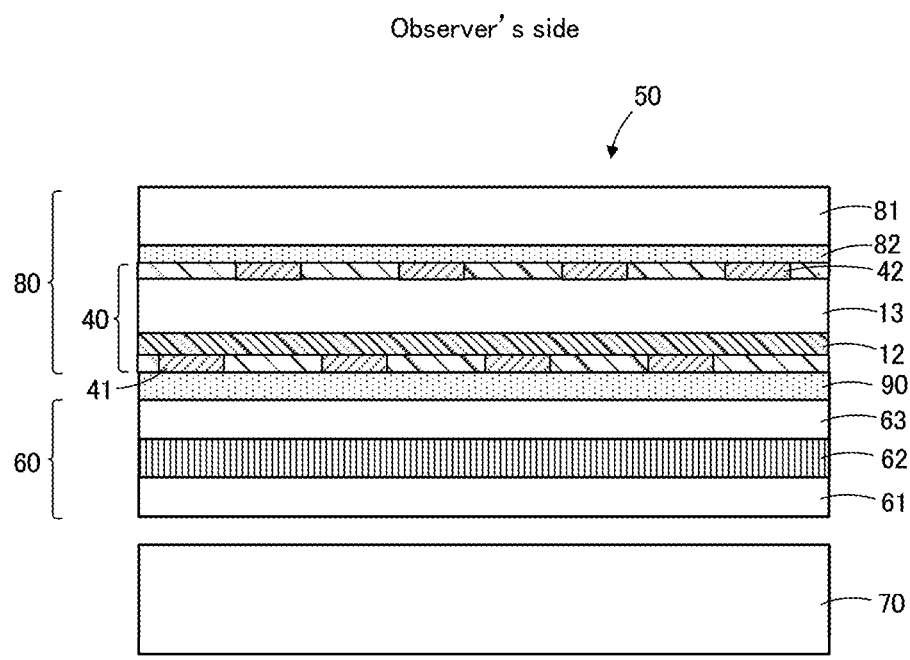
FIG. 13 depicts a schematic diagram of an image display device according to the first embodiment.

The application of an electroconductive film according to the present embodiment is not limited to a particular application, and the electroconductive films 10, 30, and 40 according to the present embodiment can be incorporated into, for example, a sensor, touch panel, and image display device, and be used. FIG. 13 depicts a schematic diagram of an image display device according to the present embodiment. The image display device 50 shown in FIG. 13 includes an electroconductive film 40 incorporated therein. In FIG. 13, the elements indicated by the same reference numbers as in FIG. 6 are the same as those indicated in FIG. 6, and further description is thus omitted.

<<<Image Display Device>>>

As shown in FIG. 13, an image display device 50 mainly includes a display panel 60 for displaying images, a backlight unit 70 placed on the back surface of the display panel 60, a touch panel 80 placed on the observer's side of the display panel 60, and a light-transmitting adhesion layer 90 intervening between the display panel 60 and the touch panel 80. In the present embodiment, the display panel 60 is a liquid-crystal display panel and the image display device 50 thus includes the backlight unit 70 but may not include the backlight unit 70 depending on the type of the display panel (display element). Additionally, the image display device may further include a film, for example, for inhibition of a decrease caused by polarized sunglasses in visibility.

<<Display Panel>>

As shown in FIG. 13, the display panel 60 has a laminate structure composed of a polarizing plate 61, a display element 62, and a polarizing plate 63 in this order from the backlight unit 70 to the observer's side. The display panel 60 only needs to include the display element 62, and optionally does not include the polarizing plates 61 or 63 or the like.

The display element 62 is a liquid-crystal display element. However, the display element 62 is not limited to a liquid-crystal display element, and may be a display element using, for example, an organic light-emitting diode (OLED), an inorganic light-emitting diode, and/or a quantum dot light-emitting diode (QLED). In obtaining a foldable image display device, an OLED is preferably used. The liquid-crystal display element includes, for example, a liquid-crystal layer, an alignment film, an electrode layer, and a color filter sandwiched between two glass base materials.

<<Backlight Unit>>

The backlight unit 70 illuminates the display panel 60 from the back surface of the display panel 60. Any known backlight unit can be used as the backlight unit 70, and, moreover, the backlight unit 70 may be either an edge light-type or a direct light-type backlight unit.

<<Touch Panel>>

The touch panel 80 includes: an electroconductive film 40; a light-transmitting cover member 81, such as a cover glass, placed on the observer's side of the electroconductive film 40; and a light-transmitting adhesive layer 82 intervening between the electroconductive film 40 and the light-transmitting cover member 81. In the electroconductive film 40, the electroconductive part 42 is placed on the observer's side of the electroconductive part 41.

<Light-Transmitting Adhesive Layer>

Examples of the light-transmitting adhesive layer 82 include adhesive sheets, such as OCA (optical clear adhesive) sheets. A light-transmitting adhesion layer may be used instead of the light-transmitting adhesive layer 82. In cases where the electroconductive film 40 is incorporated in the touch panel 80 as shown in FIG. 13, measurement of the surface resistance value and line resistance value of the second electroconductive part 42 of the electroconductive film 40 necessitates detachment of the light-transmitting adhesive layer 82, but the detachment of the light-transmitting adhesive layer 82 causes part of the light-transmitting adhesive layer 82 to remain on the surface 42A of the second electroconductive part 42 and will undesirably affect the surface resistance value and the line resistance value, and thus the residue is preferably removed by washing the surface 42A with a solvent before the surface resistance value and line resistance value of the second electroconductive part 42 are measured.

<<Light-Transmitting Adhesion Layer>>

The light-transmitting adhesion layer 90 includes a cured product of, for example, a liquid curable adhesion layer composition including a polymerizable compound such as an OCR (optically clear resin).

Second Embodiment

Figure 14:
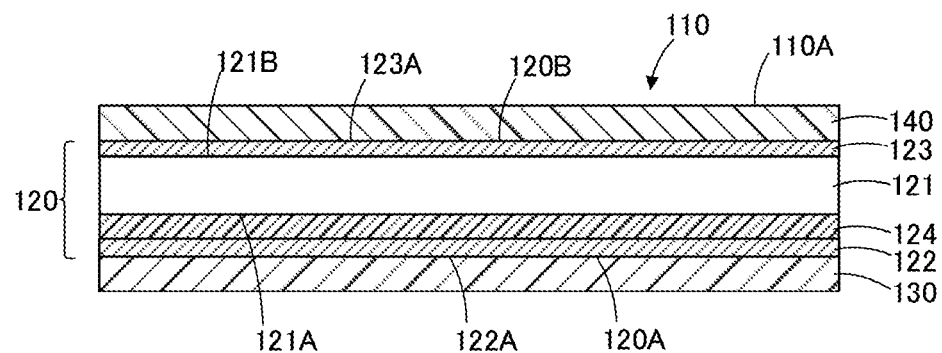
FIG. 14 depicts a schematic diagram of an electroconductive film with a protective film according to a second embodiment.
Figure 15:
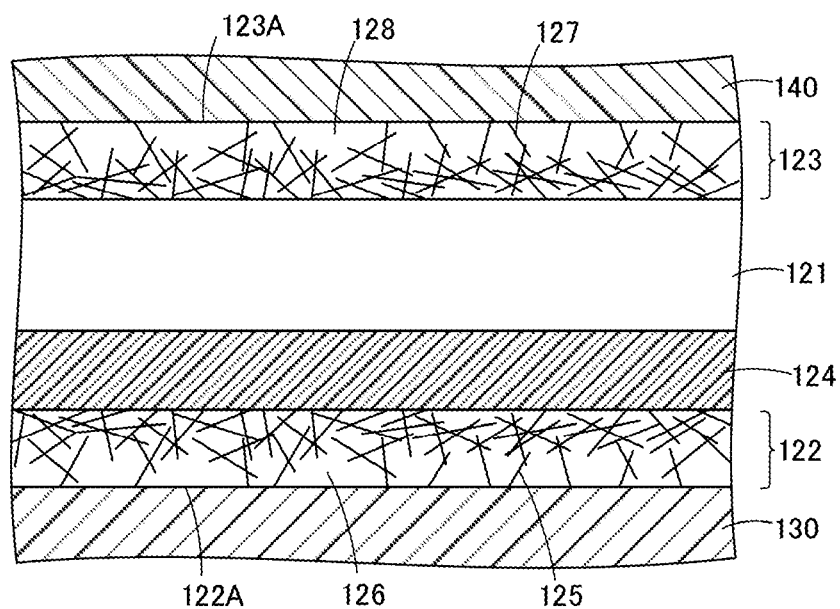
FIG. 15 depicts an enlarged view of a part of the electroconductive film with a protective film shown in FIG. 14.
Figure 16:
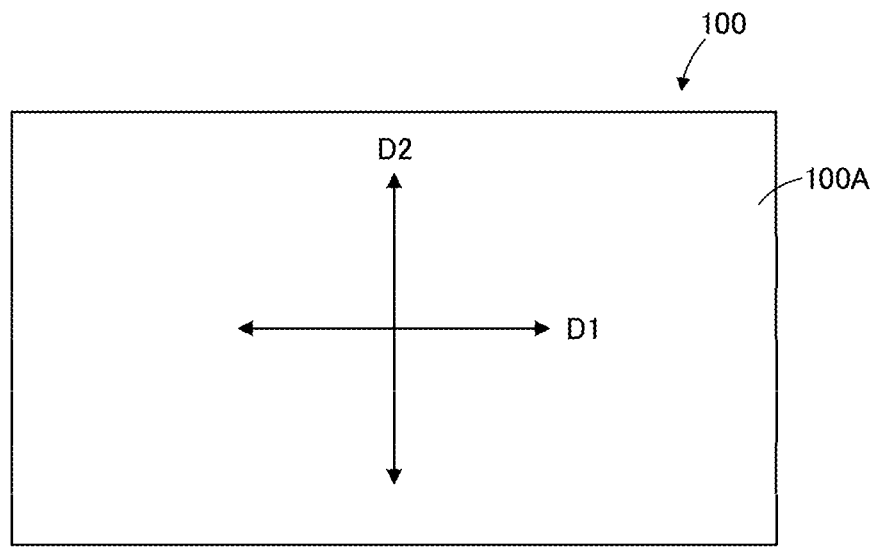
FIG. 16 depicts a plane view of the protective film in FIG. 14.
Figure 17:
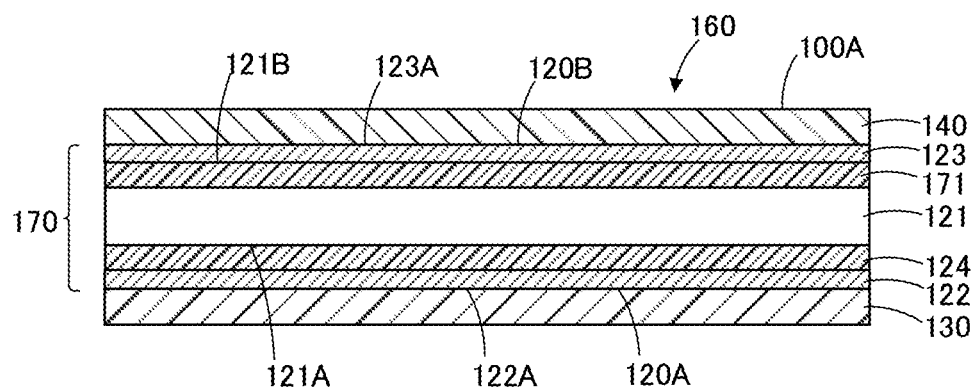
FIG. 17 depicts a schematic diagram of another electroconductive film with a protective film according to the second embodiment.
Figure 18:
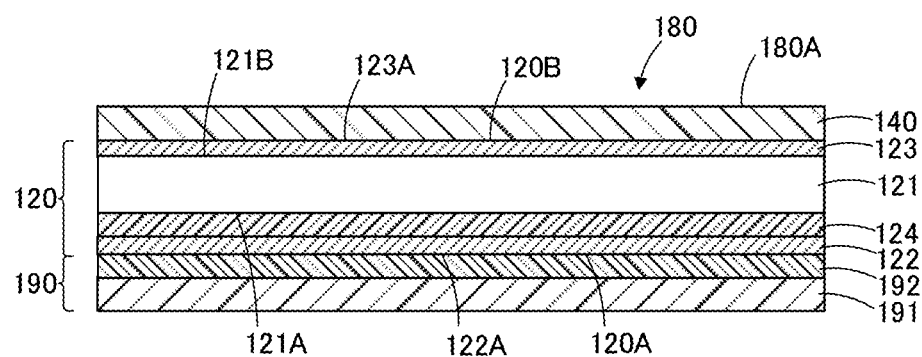
FIG. 18 depicts a schematic diagram of another electroconductive film with a protective film according to the second embodiment.
Figure 19:
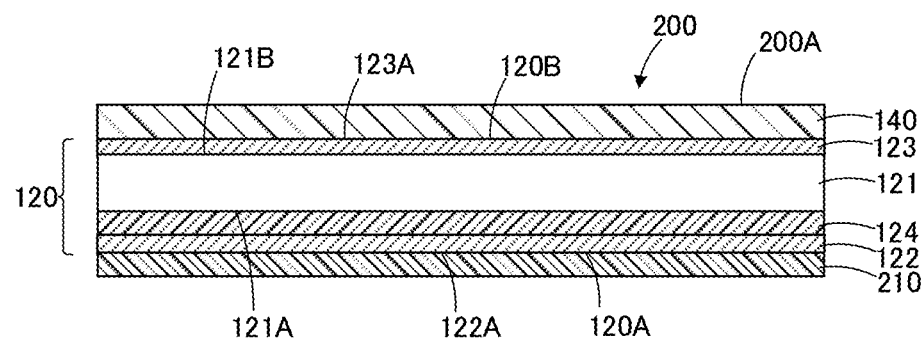
FIG. 19 depicts a schematic diagram of another electroconductive film with a protective film according to the second embodiment.

An electroconductive film with a protective film according to the second embodiment of the present invention will be described below with reference to the drawings. FIG. 14 depicts a schematic diagram of an electroconductive film with a protective film according to the present embodiment; FIG. 15 depicts an enlarged view of a part of the electroconductive film with the protective film shown in FIG. 14; FIG. 16 depicts a plane view of the protective film shown in FIG. 14; and FIGS. 17 to 19 depict schematic diagrams of another electroconductive film with a protective film according to the present embodiment.

<<<Electroconductive Film with Protective Film>>>

The electroconductive film 110 with protective films shown in FIG. 14 includes: an electroconductive film 120; a first protective film 130 peelably provided on the first face 120A of the electroconductive film 120; and a second protective film 140 peelably provided on the second face 120B that is the opposite side of the electroconductive film 120 from the first face 120A. The electroconductive film 110 with the protective films shown in FIG. 14 has the first protective film 130 only on one face (the first face 120A) of the electroconductive film 120, but may have first protective films peelably provided on both faces of the electroconductive film. Additionally, the first protective film may be provide on the surface of the electroconductive film with no first protective film on the back face of the electroconductive film.

When the electroconductive film 110 with the protective films is heated at 150° C. for 60 minutes in a heating test, the electroconductive film 10 with the protective films after the heating test has a curl in an amount within ±14 mm. However, in cases where the second protective film is provided in addition to the first protective film as in the electroconductive film 110 with the protective films, the heating test is carried out with the second protective film peeled away, because the second protective film is not heat-resistant. The heating test is carried out using a piece having a size 340 mm long×340 mm wide cut out of the electroconductive film 10 with the protective film. The heating test can be carried out using a heating device (product name "HISPEC Horizontal Type, 200° C. Series", manufactured by Kusumoto Chemicals, Ltd.). In this case, the electroconductive film 110 with the protective films is placed with the first protective film 130 facing downward in the heating device. Then, the electroconductive film 10 with the protective films is taken out of the heating device, and the amount of curl is measured in an environment at 25° C. and a relative humidity of 50% 10 minutes after completion of the heating so that a stable amount of curl can be measured. The amount of curl of the electroconductive film with the protective films is: the average value of the heights up to which the four corners of the electroconductive film with the protective films are curled, in cases where the four corners are curled upward from a flat table; or the height of the position in the central portion of the electroconductive film with the protective films, the position being the most apart from the table, in cases where the central portion of the electroconductive film with the protective films is curled upward from the table; wherein the electroconductive film with the protective films after the heating test is placed on the table with the first protective film facing downward. When the electroconductive film with the protective films is placed on a table with the first protective film facing downward, the state where the upper face of the electroconductive film with the protective films is curled in recessed form is defined as positive (+), and the state where the upper face of the electroconductive film with the protective films is curled in protruding form is defined as negative (−). The amount of curl is more preferably within ±12 mm, within ±10, within ±8 mm, within ±6 mm, or within ±4 mm.

The electroconductive film 110 with the protective films may be cut into a piece having a desired size or be rolled. In cases where the electroconductive film with the protective films has been cut into a piece having a desired size, the size of the piece of the electroconductive film with the protective films is not limited to a particular size, and the size is appropriately determined depending on the display size of an image display device. Specifically, the size of the electroconductive film with the protective films may be, for example, the same as the size of the electroconductive film 10 described for the first embodiment.

<<Electroconductive Film>>

The electroconductive film 120 includes a light-transmitting base material 121, a first electroconductive part 122 (hereinafter optionally referred to simply as the "electroconductive part 122") provided on the first face 121A of the light-transmitting base material 121, and a second electroconductive part 123 (hereinafter optionally referred to simply as "electroconductive part 123") provided on the second face 121B of the light-transmitting base material 121 opposite from the first face 121A. The electroconductive film 120 further includes a resin layer 124 provided between the light-transmitting base material 121 and the electroconductive part 122. The first electroconductive part 122 and the second electroconductive part 123 are not yet patterned and are layered.

The first surface 120A of the electroconductive film 120 is formed by the surface 122A of the first electroconductive part 122, and the second face 120B of the electroconductive film 120 is formed by the surface 123A of the second electroconductive part 123. Below, the characteristics, property values, and the like of the electroconductive film 120 will be described, and those characteristics, property values, and the like of the electroconductive film 120 are the characteristics and property values of the electroconductive film 120 alone from which the first protective film 130 and the second protective film 140 have been peeled away.

Carrying out the successive foldability test on the electroconductive film 120 preferably affords the same results as on the electroconductive film 10. The successive foldability test is the same as the successive foldability test described in the first embodiment, and further description is thus omitted here. Additionally, it is preferable that the electroconductive film 120 maintains adhesion between the light-transmitting base material and the resin layer and exhibits no verified white turbidity even after the above-mentioned successive foldability test as well as before the successive foldability test. Additionally, the electroconductive film 120 is preferably flexible.

The haze value (total haze value), total light transmittance, pencil hardness, yellow index, and the like of the electroconductive film 20 are the same as those of the electroconductive film 10, and further description is thus omitted here.

Furthermore, the thickness (total thickness) of the electroconductive film 120 is preferably 127 μm or less. The electroconductive film 120 having a thickness of 127 μm or less makes it possible to attempt to thin the film. The thickness of the electroconductive film is determined as the average of the thickness values measured at randomly selected 10 locations free from defects, dirt, and peeling in a cross-sectional image of the electroconductive film acquired using a scanning electron microscope (SEM). The minimum thickness of the electroconductive film 120 is preferably 25 μm or more in terms of inhibiting folds and scratches during conveyance, and the maximum thickness of the electroconductive film 20 is more preferably 52 μm or less. In wearability and flexibility applications that need flexibility, the electroconductive film that is further smaller and has a thickness (total thickness) of 7 μm or more and 45 μm or less is preferable, furthermore the electroconductive film having a thickness of 35 μm or less is more preferable, and the electroconductive film having a thickness of 25 μm or less is most preferable.

The applications of the electroconductive film 120 are also the same as those of the electroconductive film 10, and further description is thus omitted here.

<<Light-Transmitting Base Material and the Like>>

The light-transmitting base material 121 is the same as the light-transmitting base material 13, the first electroconductive part 122 is the same as the first electroconductive part 11, the second electroconductive part 123 is the same as the second electroconductive part 14, the resin layer 124 is the same as the resin layer 12, the electroconductive fibers 125 and 127 are the same as the electroconductive fibers 15 and 17, and the light-transmitting resins 126 and 127 are the same as the light-transmitting resins 16 and 18, and further description is thus omitted here.

<<First Protective Film>>

The first protective film 130 is a heat-resistant protective film. As used herein, a "heat-resistant protective film" means a film that is not melted by heating at 150° C. for 60 minutes. Whether the protective film is a film that is not melted by heating at 150° C. for 60 minutes may be visually verified by actual heating at 150° C. for 60 minutes or can be verified by analysis using a thermomechanical analyzer (TMA). The first protective film 130 preferably has a softening point exhibited at 150° C. or more. Whether the softening point of the first protective film is exhibited at 150° C. or more can be verified by analysis using a thermomechanical analyzer (TMA).

When the electroconductive film 120 and the first protective film 130 are each heated at 150° C. for 60 minutes with the first protective film 130 and the second protective film 140 peeled away from the electroconductive film 110 with the protective films, it is preferable that the absolute value of a difference (thermal shrinkage ratio difference) between the thermal shrinkage ratio of the first protective film 130 in a first direction D1 and the thermal shrinkage ratio of the light-transmitting base material 121 in the first direction D1 is 0.3% or less, and that the absolute value of a difference (thermal shrinkage ratio difference) between the thermal shrinkage ratio of the first protective film 130 in a second direction D2 and the thermal shrinkage ratio of the light-transmitting base material 121 in the second direction D2 is 0.3% or less, wherein the first direction D1 (see FIG. 16) is any direction within the surface 110A of the electroconductive film 110 with the protective films, and the second direction D2 (see FIG. 16) is a direction orthogonal to the first direction D1 within the surface 110A of the electroconductive film 110 with the protective films. In cases where the thermal shrinkage ratio difference between the first protective film 130 and the light-transmitting base material 121 is in such a relationship, the first protective film 130 shrinks in the same manner as the light-transmitting base material 121 even if the light-transmitting base material 121 shrinks when heated. Thus, the curl can be inhibited. The first direction and the second direction are not limited to any particular direction except for being within the surface of the electroconductive film with the protective films. In this regard, the first direction of the electroconductive film or the first protective film is identical with the first direction of the electroconductive film with the protective films, and the second direction of the electroconductive film or the first protective film is identical with the second direction of the electroconductive film with the protective films. The thermal shrinkage ratio of the light-transmitting base material 121 and the thermal shrinkage ratio of the first protective film 130 can be determined as follows: a square piece 100 mm long×100 mm wide is cut out of the electroconductive film with the protective films; the first protective film 130 is peeled away from the electroconductive film; the electroconductive film 120 and the first protective film 130 are each heated at 150° C. for 60 minutes; before and after the heating, the length in each of the first direction and the second direction are measured in an environment at 25° C. and a relative humidity of 50%. Specifically, the thermal shrinkage ratio of the first protective film in each of the first direction and the second direction is determined in accordance with the below-mentioned equations (5) and (6). In determining the thermal shrinkage ratio of the first protective film, one piece of the first protective film is measured three times for the length in the first direction, and the arithmetic mean of the values obtained from the three measurements is defined as "the length of the first protective film in the first direction"; and one piece of the first protective film is measured three times for the length in the second direction, and the arithmetic mean of the values obtained from the three measurements is defined as "the length of the second protective film in the second direction". The thermal shrinkage ratio of the light-transmitting base material 121 in each of the first direction and the second direction is determined in the same manner as the thermal shrinkage ratio of the first protective film 130. The heating can be carried out using a heating device (product name "HISPEC Horizontal Type, 200° C. Series", manufactured by Kusumoto Chemicals, Ltd.). Here, the electroconductive film 10 with the protective films is taken out of the heating device, and the length is measured in an environment at 25° C. and a relative humidity of 50% 10 minutes after completion of the heating.

$$\text{Thermal shrinkage ratio in the first direction}(\%) = (L_{fd0} - L_{fd1})/L_{fd0} \times 100 \quad (5)$$

$$\text{Thermal shrinkage ratio in the second direction}(\%) = (L_{sd0} - L_{sd2})/L_{sd0} \times 100 \quad (6)$$

In the equation (5), $L_{fd0}$ is the length in the first direction before heating, and $L_{fd1}$ is the length in the first direction after heating; and in the equation (6), $L_{sd0}$ is the length in the second direction before heating, and $L_{sd2}$ is the length in the second direction after heating. The absolute value of the thermal shrinkage ratio difference between the first protective film 130 and the light-transmitting base material 121 in the first direction D1 is more preferably 0.25% or less, 0.2% or less, or 0.18% or less. The absolute value of the thermal shrinkage ratio difference between the first protective film 130 and the light-transmitting base material 121 in the second direction D2 is more preferably 0.25% or less, 0.2% or less, or 0.18% or less.

Depending on the thermal shrinkage ratio of the light-transmitting base material 121, the thermal shrinkage ratio of the first protective film 130 in each of the first direction and the second direction is preferably within ±0.7%, more preferably within ±0.6%, in terms of obtaining 0.3% or less as the absolute value of the thermal shrinkage ratio difference between the first protective film 130 and the light-transmitting base material 121 in each of the first direction D1 and the second direction D2.

It is particularly preferable that the first protective film 130 has a positive thermal shrinkage ratio in each of the first direction D1 and the second direction D2, that the light-transmitting base material 121 has a negative thermal shrinkage ratio in at least one of the first direction D1 and the second direction D2, and that the absolute value of the thermal shrinkage ratio difference between the first protective film 130 and the light-transmitting base material 121 in each of the first direction D1 and the second direction D2 is 0.05% or more and 0.3% or less. This enables curl caused in a heating step to be further decreased efficiently. Additionally, achieving 0.05% or more as the absolute value of the thermal shrinkage ratio difference in each of the first direction D1 and the second direction D2 enables the amount of curl to be further decreased. However, having more than 0.3% as the absolute value of the thermal shrinkage ratio difference in each of the first direction D1 and the second direction D2 will undesirably cause a curl in the opposite direction or cause the central portion of the electroconductive film with the protective films to be curled upward. In this case, the absolute value of the thermal shrinkage ratio difference in each of the first direction D1 and the second direction D2 is more preferably 0.07% or more and 0.3% or less.

The thickness of the first protective film 130 is preferably 300% or less of the thickness of the light-transmitting base material 121. Allowing the thickness of the first protective film 130 to be 300% or less of the thickness of the light-transmitting base material 121 makes it possible to carry out conveyance without scratches, folds, or the like during post-processes. A smaller first protective film has more favorable flexibility, but too thin a first protective film will undesirably result in more than 0.3% as the absolute value of the thermal shrinkage ratio difference between the first protective film and the light-transmitting base material in the first direction and the second direction. Because of this, the minimum thickness of the first protective film 130 is preferably 10% or more of the thickness of the light-transmitting base material 121. Furthermore, the thickness of the first protective film 130 is preferably 20% or more and 250% or less, more preferably 30% or more and 250% or less, of the thickness of the light-transmitting base material 121. Allowing the thickness of the first protective film 130 to be 20% or more and 250% or less of the thickness of the light-transmitting base material 121 makes it more likely that the thermal shrinkage ratio of the first protective film 130 in each of the first direction D1 and the second direction D2 is within ±0.7%, and that the absolute value of the thermal shrinkage ratio difference in each of the first direction D1 and the second direction D2 is 0.3% or less, and thus, it is made possible to inhibit a curl.

Specifically, the thickness of the first protective film 130 is preferably 25 μm or more and 150 μm or less. The first protective film 130 having a thickness of 25 μm or more makes it possible to sufficiently achieve the function that protects the electroconductive film 120, and the first protective film 130 having a thickness of 150 μm or less makes it possible to inhibit expansion of the roll diameter and peeling of the first protective film 130 during conveyance. The thickness of the first protective film 130 can be measured by the same method as the film thickness of the light-transmitting base material 121. The minimum thickness of the first protective film 130 is preferably 50 μm or more in terms of the capability to inhibit folding during conveyance of the film, and the maximum thickness is preferably 125 μm or less. The thickness of the first protective film 130 can be measured by the same measurement method as the film thickness of the light-transmitting base material 13.

The first protective film 130 can be formed from a resin base material and an adhesive layer provided on one face of the resin base material. Examples of resins for forming the resin base material of the first protective film 130 include, but are not particularly limited to: polyester resins such as polyethylene terephthalate resins; polycarbonate resins; polyamide resins; and the like. For example, in cases where the light-transmitting base material 121 is a base material composed of a polyester resin, the resin base material is preferably formed from a polyester resin in terms of inhibiting a curl. In this regard, an autohesion type resin film may be used as the first protective film.

<<Second Protective Film>>

The second protective film 140 is a non-heat-resistant protective film. As used herein, a "non-heat-resistant protective film" means a film that is melted by heating at 150° C. for 60 minutes. Whether the protective film is a film that is melted by heating at 150° C. for 60 minutes may be verified by actual heating at 150° C. for 60 minutes or can be verified by analysis using a thermomechanical analyzer (TMA). The second protective film 140 has a function that prevents the electroconductive film 20 from receiving a scratch and achieves more favorable wind-up.

The second protective film 140 preferably has a thickness of 20 µm or more and 100 µm or less. The second protective film 140 having a thickness of 20 µm or more makes it possible to sufficiently achieve the function that protects the electroconductive film, and the second protective film 140 having a thickness of 100 µm or less makes it possible to inhibit expansion of the roll diameter and peeling of the second protective film 140 during conveyance. The thickness of the second protective film 140 can be measured by the same method as the film thickness of the light-transmitting base material 121. The minimum thickness of the second protective film 140 is more preferably 30 µm or more in terms of the capability to adhere to the electroconductive film without being wrinkled, and the maximum thickness is more preferably 60 µm or less. The thickness of the second protective film 140 can be measured by the same measurement method as the film thickness of the light-transmitting base material 13.

The second protective film 140 can be formed from an autohesion type resin film. Examples of resins for forming a resin film of the second protective film 140 include polyolefin resins such as polyethylene and polypropylene. As the second protective film, a protective film including a resin base material and an adhesive layer provided on one face of the resin base material may be used.

<<<Other Electroconductive Films with Protective Film>>>

The electroconductive film 110 with the protective films shown in FIG. 14 includes a resin layer 124 only on one face of the light-transmitting base material 121, but may include resin layers on both faces of the light-transmitting base material as in shown in FIG. 17. Specifically, the electroconductive film 170 in the electroconductive film 160 with the protective films shown in FIG. 17 further has a resin layer 171 between the light-transmitting base material 121 and the electroconductive part 123.

<<Resin Layer>>

The resin layer 171 is similar to the resin layer 12, and further description is thus omitted. In this regard, the film thickness of the resin layer 171 may be the same as or different from that of the resin layer 124.

The protective film 130 shown in FIG. 14 includes a resin base material and an adhesive layer, and the first protective film may be a protective film including a resin base material and a resin layer provided on one face of the resin base material. Specifically, the electroconductive film 180 with the protective films shown in FIG. 18 includes: an electroconductive film 120; a first protective film 190 peelably provided on the first face 120A of the electroconductive film 120; and a second protective film 140 peelably provided on the second face 120B that is the opposite side of the electroconductive film 120 from the first face 120A. The electroconductive film 180 with the protective films shown in FIG. 18 has the first protective film 190 only on one face (the first face 120A) of the electroconductive film 120, but may have first protective films peelably provided on both faces of the electroconductive film. Additionally, the first protective film may be provide on the surface of the electroconductive film with no first protective film on the back face of the electroconductive film. In FIG. 18, the elements indicated by the same reference numbers as in FIG. 14 are the same as those indicated in FIG. 14, and further description is thus omitted.

When the electroconductive film 180 with the protective films is heated at 150° C. for 60 minutes in a heating test, the electroconductive film 180 with the protective films after the heating test has the same amount of curl as the electroconductive film 110 with the protective films, and further description is thus omitted here.

<<First Protective Film>>

The first protective film 190 is a heat-resistant protective film, and includes a resin base material 191 and a resin layer 192 provided on one face of the resin base material 191. The first protective film 190 is peelably provided on the electroconductive film 120 in such a manner that the resin layer 192 is on the electroconductive part 122 side.

When the electroconductive film 120 and the first protective film 190 are each heated at 150° C. for 60 minutes with the first protective film 190 and the second protective film 140 peeled away from the electroconductive film 180 with the protective film, the absolute value of a difference between the thermal shrinkage ratio of the first protective film 190 in a first direction and the thermal shrinkage ratio of the light-transmitting base material 121 in the first direction is the same as with the electroconductive film 110 with the protective films, wherein the first direction is any direction within the surface 180A of the electroconductive film 180 with the protective films, and the second direction is a direction orthogonal to the first direction within the surface 180A of the electroconductive film 180 with the protective films.

<<Resin Base Material>>

The resin base material 191 is not limited to any particular material, and may be, for example, the same as the resin base material of the first protective film 130.

<<Resin Layer>>

The resin layer 192 is, for example, a hard coat layer. The resin layer 192 preferably has a film thickness of 1 µm or more and 10 µm or less. The resin layer 192 having a film thickness of 1 µm or more makes it possible to obtain a desired hardness, and the resin layer 192 having a film thickness of 10 µm or less makes cracks more unlikely to occur and allows easy handing. The film thickness of the resin layer 192 can be measured by the same measurement method as the film thickness of the light-transmitting base material 13. The minimum film thickness of the resin layer 192 is more preferably 4 µm or more in terms of inhibiting the resin layer 192 from being broken. The maximum film thickness of the resin layer 192 is more preferably 7 µm or less in terms of attempting to thin the resin layer 192 and at the same time inhibiting generation of a curl.

The resin layer 192 can be composed of at least a resin. In this regard, the resin layer 192 preferably contains, in addition to a resin, a silicone compound or a fluorine compound as an additive.

<Resin>

Examples of a resin in the resin layer 192 include resins containing a polymer (a cured or cross-linked product) of an ionizing radiation-polymerizable compound. As the ionizing radiation-polymerizable compound, the ionizing radiation-polymerizable compound preferably contains an alkylene oxide non-modified ionizing radiation-polymerizable compound and an alkylene oxide modified ionizing radiation-polymerizable compound. An alkylene oxide modified ionizing radiation-polymerizable compound has the characteristics that decrease the adhesion to the electroconductive part 122, and thus, using an alkylene oxide modified ionizing radiation-polymerizable compound makes it possible to secure desired adhesion to the electroconductive part 122, and makes it possible to adjust the adhesion of the resin layer 192 to the electroconductive part 122.

(Alkylene Oxide Non-Modified Ionizing Radiation-Polymerizable Compound)

An alkylene oxide non-modified ionizing radiation-polymerizable compound is a compound that is not modified with an alkylene oxide. As used herein, "alkylene oxide non-modified" refers to a structure not having an alkylene oxide such as ethylene oxide ($-CH_2-CH_2-O-$) or propylene oxide ($-CH_2-CH_2-CH_2-O-$) in the ionizing radiation-polymerizable compound. Examples of alkylene oxide non-modified ionizing radiation-polymerizable compounds include, but are not particularly limited to, ionizing radiation-polymerizable compounds listed in the section on the resin of the hard coat layer 24.

(Alkylene oxide modified ionizing radiation-polymerizable compound) An alkylene oxide modified ionizing radiation-polymerizable compound is a compound that is modified with an alkylene oxide. As used herein, "alkylene oxide modified" refers to a structure having an alkylene oxide such as ethylene oxide ($-CH_2-CH_2-O-$) or propylene oxide ($-CH_2-CH_2-CH_2-O-$) in the ionizing radiation-polymerizable compound. The alkylene oxide is preferably a $C_2$-$C_4$ alkylene oxide (ethylene oxide, propylene oxide, or butylene oxide) in terms of the peeling force for the protective film 190, particularly preferably a $C_2$-$C_3$ alkylene oxide (ethylene oxide or propylene oxide), further preferably a $C_2$ alkylene oxide (ethylene oxide).

The amount of the alkylene oxide modified ionizing radiation-polymerizable compound is preferably 30 parts by mass or more and 90 parts by mass or less with respect to 100 parts by mass of the alkylene oxide non-modified ionizing radiation-polymerizable compound. The alkylene oxide modified ionizing radiation-polymerizable compound in an amount of 30 parts by mass or more enables the peeling at the interface between the electroconductive part 122 and the resin layer 192 to be easy, and the alkylene oxide modified ionizing radiation-polymerizable compound in an amount of 90 parts by mass or less makes it possible to secure desired adhesion.

Examples of alkylene oxide modified ionizing radiation compounds include, but are not particularly limited to, compounds obtained by allowing the ionizing radiation-polymerizable compounds listed in the section on the first resin layer 22 to be modified with an alkylene oxide. Among these, ethylene oxide modified dipentaerythritolhexa(meth)acrylate, propylene oxide modified dipentaerythritolhexa(meth)acrylate, and the like are preferable in terms of the peeling force for the protective film 190.

<Silicone Compound>

A silicone compound is a component for making the resin layer 192 easily peelable from the electroconductive part 122. The resin layer 192 containing a silicone compound allows the silicone compound to be unevenly distributed at and around the interface between the electroconductive part 122 and the resin layer 192, thus enabling the protective film 190 to be easily peeled away at the interface between the electroconductive part 122 and the resin layer 192.

Such a silicone compound may have a polymerizable functional group. In cases where the silicone compound used is a silicone compound having a polymerizable functional group, the silicone compound is present as it is bound to the resin in the resin layer 32.

Examples of silicone compounds include, but are not particularly limited to: straight silicones such as dimethylpolysiloxane, methylphenylpolysiloxane, and methyl hydrogen polysiloxane; and modified silicones.

Examples of modified silicones include; ethylenic unsaturated group modified silicones such as (meth)acryl modified silicones; amino modified silicones, amide modified silicones, epoxy modified silicones, carboxy modified silicones, alcohol modified silicones, carbinol modified silicones, and mercapto modified silicones; and the like.

The amount of the silicone compound is preferably 0.05 parts by mass or more and 1 part by mass or less with respect to 100 parts by mass of the ionizing radiation-polymerizable compound. The silicone compound in an amount of 0.05 parts by mass or more enables the first protective film 190 to be easily peeled away at the interface between the electroconductive part 122 and the resin layer 192, and the silicone compound in an amount of 1 part by mass or less makes it possible to secure desired adhesion at the interface between the electroconductive part 122 and the resin layer 192.

Examples of commercially available products of silicone compounds include: SEIKABEAM 10-28 (manufactured by Dainichiseika Color & Chemicals Mfg. Co., Ltd.); BYK-313, BYK-322, BYK-331, BYK-333, BYK-345, BYK-377, BYK-378, BYK-UV3500, and BYK-UV3510 (which are all manufactured by BYK Japan KK); and the like.

<Fluorine Compound>

A fluorine compound is a component for making the resin layer 192 easily peelable from the electroconductive part 122. The resin layer 192 containing a fluorine compound allows the fluorine compound to be unevenly distributed at and around the interface between the electroconductive part 122 and the resin layer 192, thus enabling the protective film 190 to be easily peeled away at the interface between the electroconductive part 122 and the resin layer 192.

Such a fluorine compound may have a polymerizable functional group. In cases where the fluorine compound used is a fluorine compound having a polymerizable functional group, the fluorine compound is present as it is bound to the resin in the second resin layer 32.

The amount of the fluorine compound is preferably 0.05 parts by mass or more and 1 part by mass or less with respect to 100 parts by mass of the ionizing radiation-polymerizable compound. The fluorine compound in an amount of 0.05 parts by mass or more enables the first protective film 190 to be easily peeled away at the interface between the electroconductive part 122 and the resin layer 192, and the fluorine compound in an amount of 1 part by mass or less makes it possible to secure desired adhesion at the interface between the electroconductive part 122 and the resin layer 192.

Examples of commercially available products of fluorine compounds include F-568, F-556, F-554, F-553 (which are all manufactured by DIC Corporation), and the like.

The first protective film 190 shown in FIG. 18 includes a resin base material 191 but, as shown in FIG. 19, the first protective film may be a protective film not including a resin base material. Specifically, the electroconductive film 200 with the protective films shown in FIG. 19 includes: an electroconductive film 120; a first protective film 210 peelably provided on the first face 120A of the electroconductive film 120; and a second protective film 140 peelably provided on the second face 120B that is the opposite side of the electroconductive film 120 from the first face 120A. The first protective film 210 is composed of a resin layer and does not include a resin base material. The electroconductive film 200 with the protective films shown in FIG. 19 has the first protective film 210 only on one face (the first face 120A) of the electroconductive film 120, but may have first protective films peelably provided on both faces of the electroconductive film. Additionally, the first protective film may be provide on the surface of the electroconductive film with no first protective film on the back face of the electroconductive film. In FIG. 19, the elements indicated by the same reference numbers as in FIG. 14 are the same as those indicated in FIG. 14, and further description is thus omitted.

When the electroconductive film 200 with the protective films is heated at 150° C. for 60 minutes in a heating test, the electroconductive film 200 with the protective films after the heating test has the same amount of curl as the electroconductive film 110 with the protective films, and further description is thus omitted here.

<<First Protective Film>>

The first protective film 210 is a heat-resistant protective film and formed from a resin layer. The first protective film 210 is peelably provided on the electroconductive film 120.

When the electroconductive film 120 and the first protective film 210 are each heated at 150° C. for 60 minutes with the first protective film 210 and the second protective film 140 peeled away from the electroconductive film 200 with the protective films, the absolute value of a difference between the thermal shrinkage ratio of the first protective film 210 in a first direction and the thermal shrinkage ratio of the light-transmitting base material 121 in the first direction is the same as with the electroconductive film 110 with the protective films, wherein the first direction is any direction within the surface 200A of the electroconductive film 200 with the protective films, and the second direction is a direction orthogonal to the first direction within the surface 200A of the electroconductive film 200 with the protective films. Further description is thus omitted here.

The first protective film 210 is the same as the resin layer 192, and further description is thus omitted here.

<<Production Methods of Electroconductive Film with Protective Film>>

The electroconductive film 110 with the protective films can be produced, for example, as follows. First, the electroconductive film 120 is obtained in the same manner as in the first embodiment. After the electroconductive film 120 is formed, the first protective film 130 is peelably provided on the surface 122A of the electroconductive part 122. The electroconductive film 110 with the protective films is thus obtained.

In obtaining the electroconductive film 180 with the protective films, the electroconductive film 120 is first prepared. In the meantime, a resin layer composition is applied on one face of the resin base material 191 and dried to form a coating film of the resin layer composition. The coating film can be dried at a temperature of, for example, 40° C. or more and 150° C. or less. Here, the coating film does not need to be heated when dried.

The resin layer composition contains an ionizing radiation-polymerizable compound, and preferably further contains a silicone compound. The ionizing radiation-polymerizable compound is preferably a mixture of an alkylene oxide non-modified ionizing radiation-polymerizable compound and an alkylene oxide modified ionizing radiation-polymerizable compound. The resin layer composition may additionally contain a solvent and a polymerization initiator, as necessary.

After the coating film is formed, the electroconductive film 120 is brought into contact with the coating film in such a manner that the electroconductive part 122 is in contact with the coating film. Then, the coating film is cured by exposing the coating film to ionizing radiation with the electroconductive film 120 being in contact with the coating film. Thus, the resin layer 192 is formed, and the electroconductive film 180 with the protective films, having the first protective film 190 peelably adhered to the electroconductive film 120, is obtained.

Further, in obtaining the electroconductive film 200 with the protective films, the electroconductive film 120 is first prepared. Then, a resin layer composition is applied on the surface of the electroconductive part 122 and dried to form a coating film of the resin layer composition. The coating film can be dried at a temperature of, for example, 40° C. or more and 150° C. or less. Here, the coating film does not need to be heated when dried. The resin layer composition is the same as that used in forming the resin layer 192 of the electroconductive film 200 with the protective films, and further description is thus omitted here.

After the coating film is formed, the coating film is cured by exposing the coating film to ionizing radiation. Thus, the electroconductive film 200 with the protective films, having the first protective film 210 peelably adhered to the electroconductive film 120, is obtained.

<<Applications of Electroconductive Film with Protective Film>>

Examples of applications of the electroconductive films 110, 180, and 200 with the protective films include, but are not particularly limited to, sensors, touch panels, and the like. In cases where the electroconductive film 110, 180, or 200 with the protective films is used for a sensor of a touch panel, the electroconductive film 110, 180, or 200 with the protective films is processed, for example, in the below-mentioned manner. First, the second protective film 140 is peeled away from the electroconductive film 110, 180, and 200 with the protective films, and a laminate composed of the electroconductive film 120 and the first protective film 130, 190, or 210 is obtained. The laminate is placed in such a manner that the first protective film 130, 190, or 210 is on the line contact side (downward side) to prevent conveyance from causing a scratch to the electroconductive film 120. After the laminate is obtained, the light-transmitting base material 121 is thermally shrunk preliminarily by heating at 150° C. for 60 minutes.

Then, an electroconductive paste is applied on the surface 123A of the electroconductive part 123 by screen printing and the like. Examples of electroconductive pastes include silver pastes. After the electroconductive paste is applied, the electroconductive paste is fired by heating at 130° C. for 30 minutes to form electrical lead-out lines.

After the electrical lead-out lines are formed, predetermined regions in the electroconductive part 123 is exposed to laser light (for example, infrared laser) to pattern the electroconductive part 123. The exposure of the predetermined regions to laser light causes the heat of the laser light to sublimate the electroconductive fibers 125 included in these regions, and the sublimated electroconductive fibers 125 burst out through the light-transmitting resin 26 and are discharged out of the light-transmitting resin 126. This allows the electroconductive part 123 to be patterned into a predetermined shape.

Then, the first protective film 130 is peeled away from the electroconductive film 120, and the formation of the electrical lead-out lines and the patterning of the electroconductive part 122 are carried out in the same manner as above-mentioned.

According to the present embodiment, the first protective film 130, which is a heat-resistant protective film, is peelably provided on one face (the first face 120A) of the electroconductive film 120, thus making it possible that the first protective film 130 is not peeled away when the electroconductive film 120 is heated at 150° C. for 60 minutes. Additionally, when the electroconductive film 110, 180, or 200 with the protective films is heated at 150° C. for 60 minutes, the electroconductive film 110, 180, or 200 with the protective films after the heating has a curl in an amount within ±14 mm. This enables the curl of the electroconductive film 120 to be decreased. In cases where resin layers are formed on both faces of the light-transmitting base material, the above-mentioned amount of curl would be considered to be decreased, but is actually not decreased. When resin layers are formed on both faces of the light-transmitting base material, forming the resin layers at once results in lower volume-productivity, and thus, the layers are formed one by one, but forming the layers one by one involves exposing one resin layer to ionizing radiation twice in total: one time when the one resin layer itself is cured and the other time when the other resin layer is cured, thus resulting in causing the one resin layer to have a film quality different from the film quality of the other resin layer that is exposed to ionizing radiation only once. This conceivably causes the earlier formed resin layer to undergo a larger internal strain than the later formed resin layer, with the result that this strain has an impact during heating, thus causing a curl. The curl problem is marked particularly in cases where the light-transmitting base material has a small thickness specifically, 125 μm or less, and thus, the present embodiment is effective particularly in cases where the light-transmitting base material 13 has a thickness of 125 μm or less. Even the electroconductive film having the first protective films peelably provided on both faces thereof can be heated with none of the first protective films peeled away, in the same manner as above-mentioned, thus, enabling the curl of the electroconductive film 120 during heating to be decreased.

Even in cases where the electroconductive film 120 has a small thickness, the electroconductive film 120 has the first protective film 130 peelably provided on the first face 120A thereof, and thus, can be handled, with the first protective film 130 provided, and this can achieve easy handling.

In cases where electroconductive parts containing metallic nanowires are formed on both faces of an electroconductive film, the electrical resistance value of one electroconductive part is extremely larger than the electrical resistance value of the other electroconductive part, even if both electroconductive parts are formed in the same manner. This is considered to be for the below-mentioned reason. In forming the hard coat layer or the like, the light-transmitting base material in roll shape is first unreeled, and at this time, the light-transmitting base material is positively charged. Here, when positive charge of the light-transmitting base material is statically eliminated using a static elimination device, the positive charge present on the surface of the light-transmitting base material is statically eliminated, but the positive charge present inside is not statically eliminated. Because of this, forming the second electroconductive part before forming the resin layer allows the positive charge remaining inside the light-transmitting base material to migrate to the second electroconductive part side, causing the second electroconductive part to be affected by the positive charge. The first electroconductive part has a resin layer next thereto, and thus, is unlikely to be affected by the positive charge, and consequently, the first electroconductive part and the second electroconductive part conceivably have a large difference in the electrical resistance value therebetween. In this embodiment, however, the resin layer 124 is formed on the light-transmitting base material 121 before the second electroconductive part 123 is formed, and thus, the positive charge remaining inside the light-transmitting base material 121 migrates to the resin layer 124 side. Thus, the second electroconductive part 123 formed is more unlikely to be affected by the positive charge. Additionally, the film thickness of the resin layer 124 is smaller than the thickness of the light-transmitting base material 121, and thus, the positive charge present not only on the surface of the resin layer 124 but also inside can be statically eliminated using a static elimination device in forming the first electroconductive part 122. Thus, the first electroconductive part 122 is also more unlikely to be affected by the positive charge. This makes it possible that the surface resistance value of the second electroconductive part 123 is within ±30% of the surface resistance value of the first electroconductive part 122 and that the line resistance value of the second electroconductive part 123 is within ±30% of the line resistance value of the first electroconductive part 122, and thus, the first electroconductive part 122 and the second electroconductive part 123 can have a decreased difference in the electrical resistance value therebetween. For the same reason, the first electroconductive part 122 and the second electroconductive part 123 can have a decreased difference in the electrical resistance value therebetween also in the electroconductive film 170 having the resin layers 124 and 171 on both faces of the light-transmitting base material 121.

In cases where two electroconductive films each including a resin layer, a light-transmitting base material, and an electroconductive part in this order and having the electroconductive part only on one face are superposed to form a touch panel, two light-transmitting base materials and two resin layers are used, and an adhesive layer is provided between the electroconductive films. In the present embodiment, however, use of the electroconductive film 120 having the electroconductive parts 122 and 123 makes it possible to omit one light-transmitting base material, one resin layer, and one adhesive layer compared with use of two superposed electroconductive films having an electroconductive part only on one face. This makes it possible to attempt touch panels and image display devices thinner.

Minute irregularities are present on the surface of the light-transmitting base material, and thus, can increase the external haze, but according to the present embodiment, the resin layer 124 is provided on the first face 121A of the light-transmitting base material 121, and thus, the resin layer 24 can fill up the minute irregularities present on first face 121A of the light-transmitting base material 121. This makes it possible to decrease the external haze value. Additionally, heating the light-transmitting base material allows an oligomer component to be precipitated from the light-transmitting base material, increases the external haze value, and can cause the transparency to be reduced. In the present embodiment, however, forming the resin layer 124 on the first face 121A of the light-transmitting base material 121 makes it possible to inhibit an oligomer component from being precipitated from the light-transmitting base material 121. This makes it possible to inhibit an increase in the haze value of the electroconductive film 120 and secure the transparency even in cases where the electroconductive film 120 is heated.

According to the present embodiment, the use of electroconductive fibers 125 and 127, differing from ITO, enables providing an electroconductive film 120 which is hardly broken when folded. Thus, the electroconductive film 120 can be incorporated into a foldable image display device and then used. The foldable image display device may include an organic light-emitting diode (OLED) as a display element.

EXAMPLES

Now, the present invention will be described in more detail by way of examples. However, the present invention is not limited to those examples.

<Preparation of Hard Coat Layer Compositions>

First, the following components were combined to meet the composition requirements indicated below and thereby to obtain hard coat layer compositions.

(Hard Coat Layer Composition 1)
A mixture of pentaerythritol triacrylate and pentaerythritol tetraacrylate (product name "KAYARAD PET-30"; manufactured by Nippon Kayaku Co., Ltd.): 15 parts by mass
Polymethyl methacrylate (a polymer having a weight average molecular weight of 75,000): 15 parts by mass
A polymerization initiator (product name "Irgacure (registered trademark) 184"; manufactured by BASF Japan Ltd.): 1.5 parts by mass
Methyl ethyl ketone (MEK): 50 parts by mass
Cyclohexanone: 18.5 parts by mass (Hard Coat Layer Composition 2)
A mixture of pentaerythritol triacrylate and pentaerythritol tetraacrylate (product name "KAYARAD PET-30"; manufactured by Nippon Kayaku Co., Ltd.): 15 parts by mass
Polymethyl methacrylate (a polymer having a weight average molecular weight of 75,000): 15 parts by mass
A polymerization initiator (product name "Irgacure (registered trademark) OXE01", manufactured by BASF Japan Ltd.): 1.5 parts by mass
Methyl ethyl ketone (MEK): 50 parts by mass
Cyclohexanone: 18.5 parts by mass (Hard Coat Layer Composition 3)
Ethylene oxide modified bisphenol A diacrylate (product name "BPE-20"; manufactured by DKS Co. Ltd.; bifunctional): 25 parts by mass
A mixture of pentaerythritol triacrylate and pentaerythritol tetraacrylate (product name "KAYARAD PET-30"; manufactured by Nippon Kayaku Co., Ltd.): 25 parts by mass
A polymerization initiator (product name "Irgacure (registered trademark) 184"; manufactured by BASF Japan Ltd.): 4 parts by mass
A silicone compound (product name "SEIKABEAM 10-28(MB)"; manufactured by Dainichiseika Color & Chemicals Mfg. Co., Ltd.): 0.1 parts by mass
Methyl isobutyl ketone (MIBK): 100 parts by mass <Preparation of Silver Nanowire-Containing Compositions>

(Silver Nanowire-Containing Composition 1)
Ethylene glycol (EG) as a reducing agent and polyvinylpyrrolidone (PVP; having an average molecular weight of 1,300,000; manufactured by Aldrich) as an organic protecting agent were used to perform the following individual steps of core formation and particle growth to prepare a silver nanowire-containing composition.

1. Core Formation Step

To 100 mL of EG maintained at a temperature of 160° C. in a reaction vessel, 2.0 mL of a silver nitrate solution in EG (having a silver nitrate concentration of 1.0 mol/L) was added at a constant rate with stirring over one minute. Then, silver core particles were formed by reducing silver ions while the temperature was maintained at 160° C. for 10 minutes. The reaction liquid was yellow in color due to the surface plasmon absorption in nano-sized silver particles, confirming the reduction of silver ions and the subsequent formation of silver microparticles (core particles). Then, 10.0 mL of a PVP solution in EG (having a PVP concentration of $3.0 \times 10^{-1}$ mol/L) was added to the reaction liquid at a constant rate over 10 minutes.

2. Particle Growth Step

After the above-mentioned core formation step was completed, the reaction liquid containing the core particles was maintained at a temperature of 160° C. with stirring, to which 100 mL of a silver nitrate solution in EG (having a silver nitrate concentration of $1.0 \times 10^{-1}$ mol/L) and 100 mL of a PVP solution in EG (having a PVP concentration of $3.0 \times 10^{-1}$ mol/L) were added at a constant rate over 120 minutes by using the double-jet technique. In the course of the particle growth step, an aliquot was withdrawn every 30 minutes from the reaction liquid for electron microscopic observation. The observation indicated that the core particles formed in the core formation step grew into the shape of wires with the passage of time but no microparticles were generated during the particle growth step.

3. Desalting/Washing Step

After completion of the particle growth step, the reaction liquid was cooled down to room temperature and then applied to an ultrafiltration membrane with a molecular weight cut-off of 0.2 μm for desalting/washing and for solvent exchange to ethanol. Subsequently, the reaction liquid was concentrated to a volume of 100 mL to prepare a dispersion of silver nanowires. Finally, the concentrated reaction liquid was diluted with ethanol to achieve a silver nanowire concentration of 0.1% by mass, whereby the silver nanowire-containing composition 1 was obtained.

Measurement of fiber diameter and fiber length in silver nanowires in the silver nanowire-containing composition 1 indicated that the silver nanowires had a fiber diameter of 30 nm and a fiber length of 15 μm. The fiber diameter of the silver nanowires was obtained as the arithmetic mean of the fiber diameters of 100 electroconductive fibers in 50 images acquired at a magnification of 100,000 to 200,000 times using a transmission electron microscope (TEM) (product name "H-7650"; manufactured by Hitachi High-Technologies Corporation), which were measured on the acquired images by a software program accessory to the TEM. The above-mentioned fiber diameters were measured by setting the accelerating voltage to "100 kV," the emission current to "10 μA," the condenser lens aperture to "1," the objective lens aperture to "0," the observation mode to "HC," and the Spot to "2." Additionally, the fiber length of the silver nanowires was obtained as the arithmetic mean of the fiber lengths of 100 silver nanowires measured using a scanning electron microscope (SEM) (product name "S-4800 (Type 2)"; manufactured by Hitachi High-Technologies Corporation) at a magnification of 500 to 20,000,000 times. The above-mentioned fiber lengths were measured by setting the signal selection to "SE," the accelerating voltage to "3 kV," the emission current to "10 μA," and the SE detector to "Mixed." The fiber length of the silver nanowires was obtained as the arithmetic mean of the fiber lengths of 100 silver nanowires in 10 images acquired at a magnification of 500 to 20,000,000 times using a scanning electron microscope (SEM) (product name "S-4800 (Type 2)"; manufactured by Hitachi High-Technologies Corporation) on the SEM mode, which were measured on the acquired images by an accessory software program. The above-mentioned fiber length were measured using a 45° pre-tilted sample stub by setting the signal selection to "SE," the accelerating voltage to "3 kV," the emission current to "10 pA to 20 pA," the SE detector to "Mixed," the probe current to "Norm," the focus mode to "UHR," the condenser lens 1 to "5.0," the WD to "8 mm," and the Tilt to "30°." The TE detector was removed from the microscope system prior to the observation. When the fiber diameter of the silver nanowires was determined, a measurement sample produced by the following method was used. First, the silver nanowire-containing composition 1 was diluted with ethanol depending on the type of the dispersion medium in the composition to reduce the concentration of silver nanowires to 0.05% by mass or less. Furthermore, a drop of the diluted silver nanowire-containing composition 1 was applied on a carbon-coated grid mesh for TEM or STEM observation (a Cu grid with the model "#10-1012, Elastic Carbon Film ELS-C10 in the STEM Cu100P grid specification"), dried at room temperature, and then observed under the above-mentioned conditions, and the resulting observation image data was used to calculate the arithmetic mean. When the fiber length of the silver nanowire was determined, a measurement sample produced by the following method was used. First, the silver nanowire-containing composition 1 was applied on an untreated surface of a polyethylene terephthalate (PET) film in B5 size having a thickness of 50 μm at an application dose of 10 mg/m$^2$, and dried to evaporate the dispersion medium and to place electroconductive fibers on the surface of the PET film, and an electroconductive film was thereby produced. A piece having a size of 10 mm×10 mm was cut out of the central part of the electroconductive film. Then, the cut electroconductive film was attached flat against the tilted surface of a 45° pre-tilted SEM sample stub (model number "728-45"; manufactured by Nissin EM Co., Ltd.; 45° pre-tilted sample stub; 15 mm diameter×10 mm height; made of M4 aluminum) using a silver paste. Furthermore, the cut electroconductive film was sputtered with Pt—Pd for 20 to 30 seconds to obtain electrical conductivity. The fiber diameters and fiber lengths of the below-described silver nanowires were determined in the same manner.

(Silver Nanowire-Containing Composition 2)

The silver nanowire-containing composition 2 was obtained in the same manner as the silver nanowire-containing composition 1, except that the concentration of the silver nanowire was changed to 0.2% by mass.

(Silver Nanowire-Containing Composition 3)

The silver nanowire-containing composition 3 was obtained in the same manner as the silver nanowire-containing composition 1, except that microwaves were used in the particle growth step. Measurement of fiber diameter and fiber length in silver nanowires in the silver nanowire-containing composition 3 indicated that the silver nanowires had a fiber diameter of 26 nm and a fiber length of 16 μm.

<Preparation of Light-Transmitting Resin Composition>

The following components were combined to meet the composition requirements indicated below and thereby obtain a light-transmitting resin composition 1.

(Light-Transmitting Resin Composition 1)

A mixture of pentaerythritol triacrylate and pentaerythritol tetraacrylate (product name "KAYARAD PET-30"; manufactured by Nippon Kayaku Co., Ltd.): 5 parts by mass A polymerization initiator (product name "Irgacure (registered trademark) 184"; manufactured by BASF Japan Ltd.): 0.25 parts by mass Methyl ethyl ketone (MEK): 70 parts by mass Cyclohexanone: 24.75 parts by mass Examples A and Comparative Examples A Example A1

First, a polyethylene terephthalate film (product name "Cosmoshine (registered trademark) A4100"; manufactured by Toyobo Co., Ltd.) having a thickness of 50 μm and carrying an underlayer only on one surface was set up as a light-transmitting base material, and the hard coat layer composition 1 was applied on the surface of the underlayer of the polyethylene terephthalate film to form a coating film. Subsequently, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to cure the coating film, whereby a hard coat layer having a film thickness of 2 μm was formed.

After the hard coat layer was formed, the hard coat layer was subjected to static elimination. The static elimination was carried out using a voltage application type static eliminator (product name "SJ-H156A", manufactured by Keyence Corporation). The static eliminator was placed 50 mm apart from the hard coat layer.

After the hard coat layer was subjected to static elimination, the silver nanowire-containing composition 1 was applied at an application dose of 10 mg/m$^2$ on the untreated surface that was the opposite side of the polyethylene terephthalate film from the underlayer side. Then, the dispersion medium in the silver nanowire-containing composition 1 was evaporated by dry air blowing at 50° C. at a flow rate of 0.5 m/s for 15 seconds and subsequent dry air blowing at 70° C. at a flow rate of 10 m/s for 30 seconds over the applied silver nanowire-containing composition 1 to place a plurality of silver nanowires on the untreated surface.

Subsequently, the above-mentioned light-transmitting resin composition 1 was applied to cover the silver nanowires and to form a coating film. Then, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to form a light-transmitting resin having a film thickness of 100 nm by curing the coating film, whereby a second electroconductive part that had a film thickness of 100 nm and included the light-transmitting resin and the silver nanowires incorporated in the light-transmitting resin was obtained.

After the second electroconductive part was formed, the silver nanowire-containing composition 1 was applied at an application dose of 10 mg/m$^2$ on the surface of the hard coat layer. Then, the dispersion medium in the silver nanowire-containing composition 1 was evaporated by dry air blowing at 50° C. at a flow rate of 0.5 m/s for 15 seconds and subsequent dry air blowing at 70° C. at a flow rate of 10 m/s for 30 seconds over the applied silver nanowire-containing composition 1 to place a plurality of silver nanowires on the surface of the hard coat layer.

Subsequently, the above-mentioned light-transmitting resin composition 1 was applied to cover the silver nanowires and to form a coating film. Then, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to form a light-transmitting resin having a film thickness of 100 nm by curing the coating film, whereby a first electroconductive part having a film thickness of 100 nm and including the light-transmitting resin and the silver nanowires incorporated in the light-transmitting resin was obtained to obtain an electroconductive film.

The film thicknesses of the first electroconductive part and the second electroconductive part according to Example A1 was determined as the arithmetic mean of the thickness values measured at randomly selected 10 locations, wherein the thickness values were determined at the 10 locations in cross-sectional images of the electroconductive part acquired using a scanning transmission electron microscope (STEM). Specifically, the cross-sectional images were acquired by the following method. First, samples for observing a cross-section were produced from the electroconductive film. More specifically, a cut piece of the electroconductive film having a size of 2 mm×5 mm was placed in an embedding plate made of silicone, into which an epoxy resin was later poured to embed the whole electroconductive film in the resin. Then, the embedding resin was left to stand at 65° C. for 12 hours or more and cured. Subsequently, ultra-thin sections were produced using an ultramicrotome (product name "Ultramicrotome EM UC7"; manufactured by Leica Microsystems GmbH) at a feeding rate of 100 nm. The produced ultra-thin sections were collected on collodion-coated meshes (150 meshes) to obtain STEM samples. Then, a cross-sectional image of an STEM sample was acquired using a scanning transmission electron microscope (STEM) (product name "S-4800 (Type 2)"; manufactured by Hitachi High-Technologies Corporation). The cross-sectional image was acquired by setting the detector switch (signal selection) to "TE," the accelerating voltage to 30 kV, and the emission current to "10 µA." The focus, contrast, and brightness were appropriately adjusted at a magnification of 5,000 to 200,000 times so that each layer could be identified. The magnification is preferably in the range from 10,000 to 50,000 times, more preferably in the range from 25,000 to 40,000 times. An interface between layers acquired at an extremely high magnification is represented by pixels in a coarse resolution image and appears obscure. Thus, the magnification should not be increased excessively during the measurement of film thickness. The cross-section was imaged by additionally setting the beam monitor aperture to 3 and the objective lens aperture to 3, and also setting the WD to 8 mm. The film thickness of the first electroconductive part, the film thickness of the second electroconductive part, the thickness of the base material such the polyethylene terephthalate film, and the film thickness of the hard coat layer were measured by the above-mentioned method not only in Example A1 but also in all the following Examples and Comparative Examples. In this regard, the cross-sectional images of the base material and the hard coat layer were acquired with the magnification suitably adjusted to 100 to 20,000 times.

Example A2

In Example A2, an electroconductive film was obtained in the same manner as in Example A1, except that the first electroconductive part and the second electroconductive part were formed using the silver nanowire-containing composition 2 instead of the silver nanowire-containing composition 1.

Example A3

In Example A3, an electroconductive film was obtained in the same manner as in Example A1, except that a cycloolefin polymer film (product name "ZEONOR Film (registered trademark) ZF16"; manufactured by Zeon Corporation) having a thickness of 25 µm was used instead of the polyethylene terephthalate film and that the hard coat layer composition 2 was used instead of the hard coat layer composition 1.

Example A4

In Example A4, an electroconductive film was obtained in the same manner as in Example A1, except that a polyimide film having a structure represented by the above-mentioned chemical formula (1) and having a thickness of 50 µm was used instead of the polyethylene terephthalate film. In this regard, this polyimide film can be produced by a known method of producing polyimide films.

Example A5

First, a polyethylene terephthalate film (product name "Cosmoshine (registered trademark) A4300"; manufactured by Toyobo Co., Ltd.) having a thickness of 50 µm and carrying an underlayer on both faces was set up as a light-transmitting base material, and the hard coat layer composition 1 was applied on the surface of one underlayer of the polyethylene terephthalate film to form a coating film. Subsequently, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to cure the coating film, whereby a hard coat layer having a film thickness of 2 µm was formed. Additionally, a hard coat layer having a film thickness of 2 µm was formed on the surface of the other underlayer of the polyethylene terephthalate film in the same manner.

After the hard coat layers were formed on both faces, both the hard coat layers were subjected to static elimination. The static elimination was carried out in the same manner and on the same conditions as in Example A1.

After the hard coat layer was subjected to static elimination, the silver nanowire-containing composition 1 was applied at an application dose of 10 mg/m$^2$ on the surface of one hard coat layer. Then, the dispersion medium in the silver nanowire-containing composition 1 was evaporated by dry air blowing at 50° C. at a flow rate of 0.5 m/s for 15 seconds and subsequent dry air blowing at 70° C. at a flow rate of 10 m/s for 30 seconds over the applied silver nanowire-containing composition 1 to place a plurality of silver nanowires on the surface of this hard coat layer.

Subsequently, the above-mentioned light-transmitting resin composition 1 was applied to cover the silver nanowires and to form a coating film. Then, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to form a light-transmitting resin having a film thickness of 100 nm by curing the coating film, whereby a second electroconductive part that had a film thickness of 100 nm and included the light-transmitting resin and the silver nanowires incorporated in the light-transmitting resin was obtained.

After the second electroconductive part was formed, the silver nanowire-containing composition 1 was applied at an application dose of 10 mg/m$^2$ on the surface of the other hard coat layer. Then, the dispersion medium in the silver nanowire-containing composition 1 was evaporated by dry air blowing at 50° C. at a flow rate of 0.5 m/s for 15 seconds and subsequent dry air blowing at 70° C. at a flow rate of 10 m/s for 30 seconds over the applied silver nanowire-containing composition 1 to place a plurality of silver nanowires on the surface of this hard coat layer.

Subsequently, the above-mentioned light-transmitting resin composition 1 was applied to cover the silver nanowires and to form a coating film. Then, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to form a light-transmitting resin having a film thickness of 100 nm by curing the coating film, whereby a first electroconductive part having a film thickness of 100 nm and including the light-transmitting resin and the silver nanowires incorporated in the light-transmitting resin was obtained to obtain an electroconductive film.

Example A6

In Example A6, an electroconductive film was obtained in the same manner as in Example A1, except that, after the electroconductive film in Example A1 was formed, predetermined regions in the first electroconductive part and the second electroconductive part were exposed to laser light on the below-mentioned conditions to sublimate and remove the silver nanowires present in the regions, thus patterning the first electroconductive part and the second electroconductive part. The patterning resulted in forming a plurality of first electroconductive parts and second electroconductive parts; the first electroconductive parts and the second electroconductive parts were each linear, having a width of 5 mm; and nonconductive parts having a width of 30 μm were each formed between the first electroconductive parts and between the second electroconductive parts.

(Laser Light Exposure Conditions)
Type: YVO$_4$
Wavelength: 1064 nm
Pulse width: 8 to 10 ns
Frequency: 100 kHz
Spot diameter: 30 μm
Pulse energy: 16 μJ
Processing speed: 1200 mm/s Example A7

In Example A7, an electroconductive film was obtained in the same manner as in Example A2, except that, after the electroconductive film in Example A2 was formed, predetermined regions in the first electroconductive part and the second electroconductive part were exposed to laser light on the same conditions as in Example A3, thus patterning the first electroconductive part and the second electroconductive part. The patterning resulted in forming a plurality of first electroconductive parts and second electroconductive parts; the first electroconductive parts and the second electroconductive parts were each linear, having a width of 5 mm; and nonconductive parts having a width of 30 μm were each formed between the first electroconductive parts and between the second electroconductive parts.

Example A8

In Example A8, an electroconductive film was obtained in the same manner as in Example A5, except that the film thickness of each of both hard Example A9

In Example A9, an electroconductive film was obtained in the same manner as in Example A8, except that a polyethylene terephthalate film (product name "Cosmoshine (registered trademark) A4300"; manufactured by Toyobo Co., Ltd.) having a thickness of 38 μm and carrying underlayers on both surfaces was used instead of the polyethylene terephthalate film (product name "Cosmoshine (registered trademark) A4300"; manufactured by Toyobo Co., Ltd.) having a thickness of 50 μm and carrying underlayers on both surfaces.

Example A10

In Example A10, an electroconductive film was obtained in the same manner as in Example A8, except that a cycloolefin polymer film (product name "ZEONOR Film (registered trademark) ZF16"; manufactured by Zeon Corporation) having a thickness of 50 μm was used instead of the polyethylene terephthalate film and that the hard coat layer composition 2 was used instead of the hard coat layer composition 1.

Example A11

In Example A11, an electroconductive film was obtained in the same manner as in Example A8, except that a cycloolefin polymer film (product name "ZEONOR Film (registered trademark) ZF16"; manufactured by Zeon Corporation) having a thickness of 25 μm was used instead of the polyethylene terephthalate film and that the hard coat layer composition 2 was used instead of the hard coat layer composition 1.

Example A12

In Example A12, an electroconductive film was obtained in the same manner as in Example A8, except that a polyimide film having a structure represented by the above-mentioned chemical formula (1) and having a thickness of 80 μm was used instead of the polyethylene terephthalate film.

Example A13

In Example A13, an electroconductive film was obtained in the same manner as in Example A8, except that a polyimide film having a structure represented by the above-mentioned chemical formula (1) and having a thickness of 30 μm was used instead of the polyethylene terephthalate film.

Comparative Example A1

In Comparative Example A1, an electroconductive film was obtained in the same manner as in Example A1, except that the hard coat layer was not subjected to static elimination.

Comparative Example A2

First, a polyethylene terephthalate film (product name "Cosmoshine (registered trademark) A4100"; manufactured by Toyobo Co., Ltd.) having a thickness of 50 μm and carrying an underlayer on one surface was set up as a light-transmitting base material, and the silver nanowire-containing composition 1 was applied at an application dose of 10 mg/m$^2$ on the untreated surface that was the opposite side of the polyethylene terephthalate film from the underlayer side. Then, the dispersion medium in the silver nanowire-containing composition 1 was evaporated by dry air blowing at 50° C. at a flow rate of 0.5 m/s for 15 seconds and subsequent dry air blowing at 70° C. at a flow rate of 10 m/s for 30 seconds over the applied silver nanowire-containing composition 1 to place a plurality of silver nanowires on the untreated surface.

Subsequently, the above-mentioned light-transmitting resin composition 1 was applied to cover the silver nanowires and to form a coating film. Then, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to form a light-transmitting resin having a film thickness of 100 nm by curing the coating film, whereby a second electroconductive part including the light-transmitting resin and the silver nanowires incorporated in the light-transmitting resin was obtained.

After the second electroconductive part was formed, the hard coat layer composition 1 was applied on the surface of the underlayer of the polyethylene terephthalate film to form a coating film. Subsequently, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to cure the coating film, whereby a hard coat layer having a film thickness of 2 μm was formed.

After the hard coat layer was formed, the silver nanowire-containing composition 1 was applied at an application dose of 10 mg/m$^2$ on the surface of the hard coat layer without subjecting the hard coat layer to static elimination. Then, the dispersion medium in the silver nanowire-containing composition 1 was evaporated by dry air blowing at 50° C. at a flow rate of 0.5 m/s for 15 seconds and subsequent dry air blowing at 70° C. at a flow rate of 10 m/s for 30 seconds over the applied silver nanowire-containing composition 1 to place a plurality of silver nanowires on the surface of the hard coat layer.

Subsequently, the above-mentioned light-transmitting resin composition 1 was applied to cover the silver nanowires and to form a coating film. Then, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to form a light-transmitting resin having a film thickness of 100 nm by curing the coating film, whereby a first electroconductive part having a film thickness of 100 nm and including the light-transmitting resin and the silver nanowires incorporated in the light-transmitting resin was obtained to obtain an electroconductive film.

Comparative Example A3

In Comparative Example A3, an electroconductive film was obtained in the same manner as in Comparative Example A1, except that the first electroconductive part and the second electroconductive part were formed using the silver nanowire-containing composition 2 instead of the silver nanowire-containing composition 1.

Comparative Example A4

In Comparative Example A4, an electroconductive film was obtained in the same manner as in Comparative Example A2, except that the first electroconductive part and the second electroconductive part were formed using the silver nanowire-containing composition 2 instead of the silver nanowire-containing composition 1.

Comparative Example A5

In Comparative Example A5, an electroconductive film was obtained in the same manner as in Comparative Example A1, except that, after the electroconductive film in Comparative Example A1 was formed, predetermined regions in the first electroconductive part and the second electroconductive part were exposed to laser light on the same conditions as in Example A3, thus patterning the first electroconductive part and the second electroconductive part. The patterning resulted in forming a plurality of first electroconductive parts and second electroconductive parts; the first electroconductive parts and the second electroconductive parts were each linear, having a width of 5 mm; and nonconductive parts having a width of 30 μm were each formed between the first electroconductive parts and between the second electroconductive parts.

Comparative Example A6

In Comparative Example A6, an electroconductive film was obtained in the same manner as in Comparative Example A2, except that, after the electroconductive film in Comparative Example A2 was formed, predetermined regions in the first electroconductive part and the second electroconductive part were exposed to laser light on the same conditions as in Example A3, thus patterning the first electroconductive part and the second electroconductive part. The patterning resulted in forming a plurality of first electroconductive parts and second electroconductive parts; the first electroconductive parts and the second electroconductive parts were each linear, having a width of 5 mm; and nonconductive parts having a width of 30 μm were each formed between the first electroconductive parts and between the second electroconductive parts.

Comparative Example A7

In Comparative Example A7, an electroconductive film was obtained in the same manner as in Comparative Example A3, except that, after the electroconductive film in Comparative Example A3 was formed, predetermined regions in the first electroconductive part and the second electroconductive part were exposed to laser light on the same conditions as in Example A6, thus patterning the first electroconductive part and the second electroconductive part. The patterning resulted in forming a plurality of first electroconductive parts and second electroconductive parts; the first electroconductive parts and the second electroconductive parts were each linear, having a width of 5 mm; and nonconductive parts having a width of 30 µm were each formed between the first electroconductive parts and between the second electroconductive parts.

Comparative Example A8

In Comparative Example A8, an electroconductive film was obtained in the same manner as in Comparative Example A4, except that, after the electroconductive film in Comparative Example A4 was formed, predetermined regions in the first electroconductive part and the second electroconductive part were exposed to laser light on the same conditions as in Example A6, thus patterning the first electroconductive part and the second electroconductive part. The patterning resulted in forming a plurality of first electroconductive parts and second electroconductive parts; the first electroconductive parts and the second electroconductive parts were each linear, having a width of 5 mm; and nonconductive parts having a width of 30 µm were each formed between the first electroconductive parts and between the second electroconductive parts.

<Difference Ratio of Surface Resistance Value>

The surface resistance values of the first electroconductive parts and second electroconductive parts of the electroconductive films in Examples A1 to A5, A8 to A13 and Comparative Examples A1 to A4 were each measured to determine the difference ratio: how different the surface resistance value of the second electroconductive part is from the surface resistance value of the first electroconductive part. Specifically, the surface resistance value of each of the first electroconductive part and the second electroconductive part was measured using a contact-type resistivity meter (product name "Loresta-AX MCP-T370"; Manufactured by Mitsubishi Chemical Analytech Co., Ltd.; Type of sensor: ASP-probe) according to JIS K7194: 1994 (Testing method for resistivity of conductive plastics with a four-point probe array) in an environment at a temperature of 23° C. and a relative humidity of 50%. The surface resistance value was measured by placing a cut piece of the electroconductive film having a size 80 mm long×50 mm wide on a flat glass plate to create an uniformly flat surface, and then placing an ASP-probe on the center of the measurement electroconductive part facing upward, and evenly pressing all the electrode pins on the electroconductive part. For the measurement with the contact-type resistivity meter, the mode "Ω/□" as a sheet resistance measurement mode was selected. Subsequently, the start button was pushed and the instrument was held to obtain the result of the measurement. Three locations for measurement of the surface resistance value of each of the first electroconductive part and the second electroconductive part were in the central part of the electroconductive film, and the arithmetic mean of the surface resistance values at the three locations was determined as the surface resistance value. The measurement of the surface resistance value was carried out in an environment at a temperature of 23° C. and a relative humidity of 55%. Then, the obtained surface resistance values of the first electroconductive part and the second electroconductive part were used to determine the difference ratio (%) of the surface resistance value of the second electroconductive part to the surface resistance value of the first electroconductive part in accordance with the above-mentioned equation (3).

<Difference Ratio of Line Resistance Value>

The line resistance values of the first electroconductive part and second electroconductive part of the electroconductive films in Examples A1 to A13 and Comparative Examples A1 to A8 were each measured to determine the difference ratio: how different the line resistance value of the second electroconductive part is from the line resistance value of the first electroconductive part. The line resistance value was measured by bringing the probe terminals of a tester (product name "Digital MO Hitester 3454-11" manufactured by Hioki E.E. Corporation) into contact with both ends of a sample in the longitudinal direction, wherein the sample was cut out from the electroconductive film to have a rectangular shape 5 mm wide×100 mm long. Specifically, the Digital MO Hitester 3454-11 included two probe terminals (a red probe terminal and a black probe terminal, which are both pin-type terminals); the red probe terminal was brought into contact with one end of the first electroconductive part; the black probe terminal was brought into contact with the other end of the first electroconductive part; and thus, the line resistance value of the first electroconductive part was measured. Additionally, the line resistance value of the second electroconductive part was measured in the same manner as that of the first electroconductive part. Here, the measurement of the line resistance value was carried out in an environment at a temperature of 23° C. and a relative humidity of 50%. Then, the obtained line resistance values of the first electroconductive part and the second electroconductive part were used to determine the difference ratio of the line resistance value of the second electroconductive part to the line resistance value of the first electroconductive part in accordance with the above-mentioned equation (4).

<Measurement of Total Light Transmittance>

For the electroconductive films according to the above-mentioned Examples A1 to A13 and Comparative Examples A1 to A8, the total light transmittance was measured using a haze meter (product name "HM-150"; manufactured by Murakami Color Research Laboratory Co., Ltd.) according to JIS K7361-1: 1997 in an environment at a temperature of 23° C. and a relative humidity of 50%. The total light transmittance was determined as the arithmetic mean of three measurement values obtained from one electroconductive film, wherein a sample having a size of 50 mm×100 mm was cut out from the electroconductive film, and the sample without curl or wrinkle and without any dirt such as fingerprints or dusts was then placed in the haze meter in such a manner that the first electroconductive part faced the light source.

<Measurement of Haze>

For the electroconductive films according to the above-mentioned Examples A1 to A13 and Comparative Examples A1 to A8, the haze value (total haze value) of each electroconductive film was measured using a haze meter (product name "HM-150"; manufactured by Murakami Color Research Laboratory Co., Ltd.) according to JIS K7136: 2000 in an environment at a temperature of 23° C. and a relative humidity of 50%. The haze value was determined as the arithmetic mean of three measurement values obtained from one electroconductive film, wherein a sample having a size of 50 mm×100 mm was cut out from the electroconductive film, and the sample without curl or wrinkle and without any dirt such as fingerprints or dusts was then placed in the haze meter in such a manner that the first electroconductive part faced the light source.

<Flexibility>

(1) Evaluation of Resistance Values Before and After Successive Foldability Test The electroconductive films according to Examples A8 to A13 were subjected to a successive foldability test to evaluate the resistance values before and after the successive foldability test. Specifically, a sample having a rectangular sample having a size 125 mm long×50 mm wide was cut out of the electroconductive film before the successive foldability test. After each sample was cut out of the electroconductive film, a silver paste (product name "DW-520H-14"; manufactured by Toyobo Co., Ltd.) was applied on portions 10 mm long×50 mm wide each at both longitudinal ends of the first electroconductive part and both longitudinal ends of the second electroconductive part in the sample, and heated at 130° C. for 30 minutes to form cured silver pastes on both ends of the first electroconductive part and both ends of the second electroconductive part. Here, the distance between both ends of the first electroconductive part and the distance between both ends of the second electroconductive part were constant at 105 mm. Then, the electrical resistance value of the first electroconductive part of the sample before the successive foldability test was measured using a tester (product name "Digital MO Hitester 3454-11"; manufactured by Hioki E.E. Corporation). Specifically, because the Digital MO Hitester 3454-11 included two probe terminals (a red probe terminal and a black probe terminal; both are pin-type terminals), the red probe terminal and the black probe terminal were respectively contacted with the cured silver paste provided on one end of the first electroconductive part and the cured silver paste provided on the other end of the first electroconductive part to measure the electrical resistance value in an environment at a temperature of 23° C. and a relative humidity of 50%. Additionally, the electrical resistance value of the second electroconductive part before the successive foldability test was measured in the same manner as that of the first electroconductive part. Subsequently, the sample having the short edges (50 mm) fixed with fixing members was mounted to an endurance testing machine (product name "DLDMLH-FS"; manufactured by Yuasa System Co., Ltd.; in accordance with IEC62715-6-1) in such a manner that the minimum gap φ between the two opposing edges was 4 mm (the outer width of the bent part: 4 mm), as shown in FIG. 3(C), and the successive foldability test was carried out by repeating, one hundred thousand times, a process in which the sample was folded by 180 degrees and then unfolded with the first electroconductive part facing inward (with the second electroconductive part facing outward). Similarly, a sample was produced from the electroconductive film according to each of Examples 9, 11, and 13 in the same manner as above-mentioned, the short edges of the sample were fixed with fixing members, and the sample was mounted in such a manner that the minimum gap φ between the two opposing edges was 4 mm (the outer width of the bent part: 4 mm), and the successive foldability test was carried out by repeating, two hundred thousand times, a process in which the sample was folded by 180 degrees and then unfolded with the first electroconductive part facing inward (with the second electroconductive part facing outward). Furthermore, a sample was produced from the electroconductive film according to each of Examples 9, 11, and 13 in the same manner as above-mentioned, the short edges of the sample were fixed with fixing members, and the sample was mounted in such a manner that the minimum gap φ between the two opposing edges was 3 mm (the outer width of the bent part: 3 mm), and the successive foldability test was carried out by repeating, three hundred thousand times, a process in which the sample was folded by 180 degrees and then unfolded with the first electroconductive part facing inward (with the second electroconductive part facing outward). After the successive foldability test was carried out, the sample after the successive foldability test was measured for electrical resistance on the first electroconductive part and the second electroconductive part, similarly to the sample before the successive foldability test. Then, the electrical resistance value ratio of the electrical resistance value of the first electroconductive part of the sample after the successive foldability test to that of the first electroconductive part of the same sample before the successive foldability test (the electrical resistance value of the first electroconductive part of the sample after the successive foldability test/the electrical resistance value of the first electroconductive part of the sample before the successive foldability test) was calculated. Additionally, the electrical resistance value ratio of the electrical resistance value of the second electroconductive part of the sample after the successive foldability test to that of the second electroconductive part of the same sample before the successive foldability test (the electrical resistance value of the second electroconductive part of the sample after the successive foldability test/the electrical resistance value of the second electroconductive part of the sample before the successive foldability test) was calculated. Then, the results of the successive foldability tests were evaluated on the basis of the following evaluation criteria. The arithmetic mean of three measurements was determined as the electrical resistance value ratio.

⊙: the electrical resistance value ratio was 1.5 or less for both of the first electroconductive part and the second electroconductive part.

○: the electrical resistance value ratio was 1.5 or less for one of the first electroconductive part and the second electroconductive part, but more than 1.5 and 3 or less for the other.

x: the electrical resistance value ratio was more than 3 for one of the first electroconductive part and the second electroconductive part.

(2) Evaluation of Crease After Successive Foldability Test

The appearance of the electroconductive film according to each of Examples A8 to A13 after the successive foldability test was observed to evaluate the bent part of the electroconductive film for any crease generated. The successive foldability test was carried out by the method described in the section <Evaluation of Surface Resistance Value before and after Successive Foldability Test>. A crease was visually observed in an environment at a temperature of 23° C. and a relative humidity of 50%. In observing such a crease, the bent part was uniformly observed with transmitted light and reflected light under white illumination (at 800 luxes to 2000 luxes) in a bright room, and both the portion corresponding to the internal side and the portion corresponding to the external side at the bent part after folding were observed. In order that the position to be observed could be easily known in observing the crease, a sample before the successive foldability test was placed between the fixing members of an endurance testing machine, and folded once, and a permanent marker or the like was used to put, on both ends, marks indicating the bent part, as shown in FIG. 4, wherein both the ends were positioned in the direction along the bent part and orthogonal to the folding direction. After the successive foldability test, a permanent marker was used to draw a line connecting the marks on both the ends of the bent part, with the sample removed from the endurance testing machine after the successive foldability test. Then, in observing the crease, the whole bent part, which was a region formed by the marks for both the ends of the bent part and the lines connecting the marks, was observed visually. Here, no crease was observed in observing the region corresponding to the bent part of each electroconductive film before the successive foldability test. The evaluation criteria were as below-mentioned.
- ○: no crease was observed on the electroconductive film after the successive foldability test.
- Δ: a few creases were observed on the electroconductive film after the successive foldability test but at a level which was not problematic for practical usage.
- x: some creases were clearly observed on the electroconductive film after the successive foldability test.

(3) Evaluation of Microcrack After Successive Foldability Test

The appearance of the electroconductive film according to each of Examples A8 to A13 after the successive foldability test was observed to evaluate the bent part of the electroconductive film for any microcrack generated. The successive foldability test was carried out by the method described in the section <Evaluation of Surface Resistance Value before and after Successive Foldability Test>. The microcracks were observed using a digital microscope (product name "VHX-5000"; manufactured by Keyence Corporation) in an environment at 23° C. and a relative humidity of 50%. Specifically, a sample after the successive foldability test was first spread slowly, and the sample was fixed with a tape to the stage of a microscope. In cases where the crease was persistent, the portion to be observed was made as flat as possible. However, the portion to be observed (the bent part) at and around the center of the sample was not touched with a hand and handled to a degree to which no force was applied. Then, both the portion corresponding to the internal side and the portion corresponding to the external side after folding were observed. Such microcracks were observed in a dark field, with reflected light, with ring illumination selected as the illumination of a digital microscope, and at a magnification of 200 times. In order that the position to be observed could be easily known in observing the microcracks, a sample before the successive foldability test was placed between the fixing members of an endurance testing machine, and folded once, and a permanent marker or the like was used to put, on both ends, marks indicating the bent part, as shown in FIG. 4, wherein both the ends were positioned in the direction along the bent part and orthogonal to the folding direction. After the successive foldability test, a permanent marker was used to draw a line connecting the marks on both the ends of the bent part, with the sample removed from the endurance testing machine after the successive foldability test. In observing the microcracks, the microscope was set in such a manner that the center of the field-of-view range of the microscope was aligned with the center of the bent part. Here, no microcrack was observed in observing the region corresponding to the bent part of each electroconductive film before the successive foldability test. The evaluation criteria were as below-mentioned.

(Microcrack)
- ○: no microcrack was observed on the electroconductive film after the successive foldability test.
- Δ: a few microcracks were observed on the electroconductive film after the successive foldability test but at a level which was not problematic for practical usage.
- x: some microcracks were clearly observed on the electroconductive film after the successive foldability test.

The results are shown in Tables 1 and 2 below.

TABLE 1

| | Surface resistance value | | | Line resistance value | | | Haze value (%) | Total light transmittance (%) |
|---|---|---|---|---|---|---|---|---|
| | First electroconductive part (Ω/□) | Second electroconductive part (Ω/□) | Difference ratio (%) | First electroconductive part (Ω) | Second electroconductive part (Ω) | Difference ratio (%) | | |
| Example A1 | 52 | 50 | −3.8 | 1059 | 1012 | −4.4 | 1.3 | 90.7 |
| Example A2 | 31 | 28 | −9.7 | 638 | 572 | −10.3 | 1.7 | 89.3 |
| Example A3 | 50 | 49 | −2.0 | 1002 | 985 | −1.7 | 1.1 | 90.1 |
| Example A4 | 45 | 50 | 11.1 | 934 | 983 | 5.3 | 1.6 | 87.5 |
| Example A5 | 52 | 48 | −7.7 | 1080 | 952 | −11.9 | 1.3 | 90.1 |
| Example A6 | — | — | — | 1041 | 998 | −4.1 | 1.2 | 91.1 |
| Example A7 | — | — | — | 623 | 561 | −10.0 | 1.6 | 89.5 |
| Example A8 | 52 | 48 | −7.7 | 1080 | 952 | −11.9 | 1.3 | 90.1 |
| Example A9 | 51 | 50 | −2.0 | 1080 | 952 | −11.9 | 1.3 | 89.8 |
| Example A10 | 52 | 49 | −5.8 | 1014 | 1008 | −0.6 | 1.1 | 90.0 |
| Example A11 | 50 | 50 | 0.0 | 999 | 1052 | 5.3 | 1.0 | 89.9 |
| Example A12 | 53 | 57 | 7.5 | 1003 | 1140 | 13.7 | 1.6 | 87.8 |
| Example A13 | 53 | 51 | −3.8 | 1024 | 989 | −3.4 | 1.5 | 87.4 |
| Comparative Example A1 | 48 | 66 | 37.5 | 982 | 1331 | 35.5 | 1.4 | 91.3 |
| Comparative Example A2 | 50 | 69 | 38.0 | 1010 | 1380 | 36.6 | 1.4 | 91.3 |
| Comparative Example A3 | 28 | 38 | 35.7 | 569 | 781 | 37.3 | 1.8 | 89.3 |
| Comparative Example A4 | 29 | 41 | 41.4 | 605 | 820 | 35.5 | 1.8 | 89.3 |
| Comparative Example A5 | — | — | — | 962 | 1323 | 37.5 | 1.3 | 91.5 |
| Comparative Example A6 | — | — | — | 1000 | 1350 | 35.0 | 1.3 | 91.5 |
| Comparative Example A7 | — | — | — | 558 | 755 | 35.3 | 1.7 | 89.5 |
| Comparative Example A8 | — | — | — | 600 | 820 | 36.7 | 1.7 | 89.5 |

TABLE 2

| | Flexibility | | | | | | | | |
|---|---|---|---|---|---|---|---|---|---|
| | φ 4 mm/100,000 times | | | φ 4 mm/200,000 times | | | φ 3 mm/300,000 times | | |
| | Electrical resistance value ratio | Crease | Microcrack | Electrical resistance value ratio | Crease | Microcrack | Electrical resistance value ratio | Crease | Microcrack |
| Example A8 | ⊙ | Δ | Δ | — | — | — | — | — | — |
| Example A9 | ⊙ | ○ | ○ | ⊙ | Δ | ○ | ⊙ | Δ | Δ |
| Example A10 | ⊙ | Δ | Δ | — | — | — | — | — | — |
| Example A11 | ⊙ | ○ | ○ | ⊙ | ○ | ○ | ⊙ | ○ | ○ |
| Example A12 | ⊙ | Δ | ○ | — | — | — | — | — | — |
| Example A13 | ⊙ | ○ | ○ | ⊙ | ○ | ○ | ⊙ | Δ | ○ |

In the electroconductive film according to each of Comparative Examples A1 to A4, the surface resistance value of the second electroconductive part was out of the range of ±30% of the surface resistance value of the first electroconductive part, and thus, the difference between the electrical resistance value of the first electroconductive part and the electrical resistance value the second electroconductive part was out of control. However, in the electroconductive film according to each of Examples A1 to A5 and A8 to A13, the surface resistance value of the second electroconductive part was within ±30% of the surface resistance value of the first electroconductive part, and thus, the difference between the electrical resistance value of the first electroconductive part and the electrical resistance value the second electroconductive part was under control.

Furthermore, in the electroconductive film according to each of Comparative Examples A1 to A8, the line resistance value of the second electroconductive part was out of the range of ±30% of the line resistance value of the first electroconductive part, and thus, the difference between the electrical resistance value of the first electroconductive part and the electrical resistance value the second electroconductive part was out of control. However, in the electroconductive film according to each of Examples A1 to A13, the line resistance value of the second electroconductive part was within ±30% of the line resistance value of the first electroconductive part, and thus, the difference between the electrical resistance value of the first electroconductive part and the electrical resistance value the second electroconductive part was under control.

In cases where the polyethylene terephthalate film in the electroconductive film according to Example A9 had a smaller thickness than that in the electroconductive film according to Example A8, the electroconductive film according to Example A9 had better flexibility than the electroconductive film according to Example A8. In cases where the cycloolefin polymer film in the electroconductive film according to Example A11 had a smaller thickness than that in the electroconductive film according to Example A10, the electroconductive film according to Example A11 had better flexibility than the electroconductive film according to Example A10. In cases where the polyimide film in the electroconductive film according to Example A13 had a smaller thickness than that in the electroconductive film according to Example A12, the electroconductive film according to Example A13 had better flexibility than the electroconductive film according to Example A12. When the electroconductive film including hard coat layers on both faces of the light-transmitting base material was subjected to the above-mentioned successive foldability test, one of the hard coat layers was necessarily bent, facing outward, which is what is called outward bending, and thus, the hard coat layers are more likely to generate microcracks, but in the electroconductive films according to Examples A9 to A13, no microcrack was observed, or a few microcracks were observed but at a level that was not problematic for practical usage. In this regard, the electroconductive film according to Examples A11 and A13 were evaluated for flexibility with a gap of 2 mm and by repeating the folding and unfolding process three hundred thousand times, and afforded the same results as the evaluation results obtained with a gap of 3 mm and by repeating the folding and unfolding process three hundred thousand times.

The flexibility found favorable when evaluated with a gap φ of 4 mm and by repeating the folding and unfolding process two hundred thousand times means that, for example, a foldable display is in condition for approximately ten years while the display is opened and closed even 50 times or more a day, and the flexibility found favorable when evaluated with a gap φ of 3 mm and by repeating the folding and unfolding process three hundred thousand times means that such a display is in condition for approximately ten years while the display is opened and closed even 75 times or more a day. The reason why the performance can be maintained at this level is considered to be not only that the effects of the resin system and film thickness of the light-transmitting base material are in place, but also that the excellent balance of the whole electroconductive film has an effect. For example, the thickness (total thickness) of the electroconductive film found favorable when evaluated by repeating the folding and unfolding process one hundred thousand times was 45 μm or less, and the thickness of the electroconductive film (total thickness) the flexibility of which was found favorable when evaluated by repeating the folding and unfolding process two hundred thousand times or three hundred thousand times was 35 μm or less. In particular, the base material having the flexibility found favorable even by repeating the folding and unfolding process three hundred thousand times was a cycloolefin polymer film. In this regard, the cycloolefin polymer film the flexibility of which was found favorable in repeating the folding and unfolding process three hundred thousand times was used for a more stringent evaluation made with a gap φ of 2 mm and by repeating the folding and unfolding process five hundred thousand times, with the result that the cycloolefin polymer film having a thickness of 25 μm exhibited a very few creases in some cases, but other performance results were not problematic. Then, the cycloolefin polymer film having a still smaller thickness of 15 μm was subjected to the same test, and all the performance results were favorable. In this case, the thickness (total thickness) of the electroconductive film was 25 μm or less.

Before and after the successive foldability test was carried out on the electroconductive film according to each of Examples A8 to A13, a portion at and around the interface between each film as a light-transmitting base material and the hard coat layer was observed using the above-mentioned digital microscope on the above-mentioned conditions, with the result that none of peeling and the like was observed, and that the adhesion was favorable.

In this regard, the indentation hardnesses of the hard coat layer and the light-transmitting base material in the electroconductive film according to each of Examples A1 to A13 were measured in an environment at a temperature of 23° C. and a relative humidity of 50%, with the result that the hard coat layer had a higher indentation hardness than the light-transmitting base material. The indentation hardness of the hard coat layer was measured as below-mentioned. A cut piece of the electroconductive film having a size of 10 mm×10 mm was first placed in an embedding plate made of silicone, into which an epoxy resin was later poured to embed the whole electroconductive film in the resin. Then, the embedding resin was left to stand at 65° C. for 12 hours or more and cured. Subsequently, ultra-thin sections were produced using an ultramicrotome (product name "Ultramicrotome EM UC7"; manufactured by Leica Microsystems GmbH) at a feeding rate of 100 nm. Then, the block remaining after cutting out the ultra-thin sections was used as a measurement sample. Then, the measurement sample was fixed to a commercially available slide glass (product name "Slide Glass (Strainer) 1-9645-11" manufactured by As One Corporation) via an adhesive resin (product name "ARON ALPHA (registered trademark) for general use" manufactured by Toagosei Co., Ltd.) in such a manner that the cross-section obtained by cutting out the above-mentioned section in the measurement sample was substantially perpendicular to the surface of the slide glass. Specifically, a drop of the above-mentioned adhesive resin was placed at the center of the slide glass. In this step, the adhesive resin was not spread over the slide glass, and one drop of the adhesive resin was applied in such a manner that the adhesive resin did not extend beyond the measurement sample. The measurement sample was brought into contact with the slide glass in such a manner that the cross-section obtained by cutting out the above-mentioned section in the measurement sample was substantially perpendicular to the surface of the slide glass, and then, the adhesive resin was pressed and spread between the slide glass and the measurement sample which were thus adhered to each other tentatively. The resulting piece was left to stand as it was at room temperature for 12 hours to fix the measurement sample to the slide glass by adhesion. Then, a flat position was found in the cross-section of the measurement sample, and in measurement of a displacement criterion, a Berkovich indenter was pressed on the hard coat layer at this flat position using the "T1950 TriboIndenter", manufactured by Hysitron, Inc., with a load applied to the indenter at a speed of 10 nm/second from a displacement of 0 nm to a displacement of 100 nm in 10 seconds in such a manner that the maximum indentation displacement was 100 nm, and then, the indenter was retained at a displacement of 100 nm for 5 seconds followed by unloading from a displacement of 100 nm to a displacement of 0 nm in 10 seconds. Then, an indentation depth h (nm) corresponding to an indentation load F(N) thus obtained was continuously measured to prepare a load-displacement curve. From the prepared load-displacement curve, an indentation hardness $H_{IT}$ was determined in accordance with the above-mentioned equation (1) using a value obtained by dividing the maximum indentation load $F_{max}$(N) by a contact projection area $A_p$ (mm$^2$) over which the indenter was in contact with each layer. The arithmetic mean of the measurements at 10 different locations was determined as the indentation hardness. In this regard, $A_p$ was a contact projection area, for which the tip curvature of the indenter was corrected using fused quartz as a standard sample in accordance with the Oliver-Pharr method. Additionally, the indentation hardness of the light-transmitting base material was measured in the same manner as the indentation hardness of the hard coat layer.

Examples B and Comparative Examples B

Example B1

First, a polyethylene terephthalate film (product name "Cosmoshine (registered trademark) A4100"; manufactured by Toyobo Co., Ltd.) having a thickness of 50 μm and carrying an underlayer on one surface was set up as a light-transmitting base material, and the hard coat layer composition 1 was applied on the surface of the underlayer of the light-transmitting base material to form a coating film. Subsequently, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to cure the coating film, whereby a hard coat layer having a film thickness of 2 μm was formed.

After the hard coat layer was formed, the hard coat layer was subjected to static elimination. The static elimination was carried out using a voltage application type static eliminator (product name "SJ-H156A", manufactured by Keyence Corporation). The static eliminator was placed 50 mm apart from the hard coat layer.

After the hard coat layer was subjected to static elimination, the silver nanowire-containing composition 1 was applied at an application dose of 10 mg/m$^2$ on the untreated surface that was the opposite side of the light-transmitting base material from the underlayer side. Then, the dispersion medium in the silver nanowire-containing composition 1 was evaporated by dry air blowing at 50° C. at a flow rate of 0.5 m/s for 15 seconds and subsequent dry air blowing at 70° C. at a flow rate of 10 m/s for 30 seconds over the applied silver nanowire-containing composition 1 to place a plurality of silver nanowires on the untreated surface.

Subsequently, the above-mentioned light-transmitting resin composition 1 was applied to cover the silver nanowires and to form a coating film. Then, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to form a light-transmitting resin having a film thickness of 100 nm by curing the coating film, whereby a second electroconductive part that had a film thickness of 100 nm and included the light-transmitting resin and the silver nanowires incorporated in the light-transmitting resin was obtained.

After the second electroconductive part was formed, a second protective film, which was a polyethylene film (product name "SUNYTECT (registered trademark) PAC-3-50THK", manufactured by Sun A. Kaken Co., Ltd.) having a thickness of 50 μm, was peelably provided on the surface of the second electroconductive part.

After the second protective film was provided, the silver nanowire-containing composition 1 was applied at an application dose of 10 mg/m² on the surface of the hard coat layer. Then, the dispersion medium in the silver nanowire-containing composition 1 was evaporated by dry air blowing at 50° C. at a flow rate of 0.5 m/s for 15 seconds and subsequent dry air blowing at 70° C. at a flow rate of 10 m/s for 30 seconds over the applied silver nanowire-containing composition 1 to place a plurality of silver nanowires on the surface of the hard coat layer.

Subsequently, the above-mentioned light-transmitting resin composition 1 was applied to cover the silver nanowires and to form a coating film. Then, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm² to form a light-transmitting resin having a film thickness of 100 nm by curing the coating film, whereby a first electroconductive part that had a film thickness of 100 nm and included the light-transmitting resin and the silver nanowires incorporated in the light-transmitting resin was obtained.

After the first electroconductive part was formed, a first protective film, which was a polyethylene terephthalate film (product name "CP170U", manufactured by Nitto Denko Corporation) having a thickness of 125 μm, was peelably provided on the surface of the first electroconductive part to obtain an electroconductive film with a protective film.

Not only in Example B1 but also in all the following Examples and Comparative Examples, the film thickness of the first electroconductive part, the film thickness of the second electroconductive part, the thickness of the base material such as the polyethylene terephthalate film, the film thickness of the hard coat layer, the thickness of the first protective film, and the thickness of the second protective film were measured by the same method as the measurement method of the film thickness of the electroconductive part in Examples A. In this regard, the cross-sectional images of the base material, the hard coat layer, the first protective film, and the second protective film were acquired with the magnification suitably adjusted to 100 to 20,000 times.

Example B2

In Example B2, an electroconductive film with a protective film was obtained in the same manner as in Example B1, except that, instead of the polyethylene terephthalate film (product name "CP170U"; manufactured by Nitto Denko Corporation), a first protective film, which was a polyethylene terephthalate film (product name "E-MASK (registered trademark) TP200"; manufactured by Nitto Denko Corporation) having a thickness of 38 μm, was peelably provided on the surface of the first electroconductive part.

Example B3

In Example B3, an electroconductive film with a protective film was obtained in the same manner as in Example B1, except that, instead of the polyethylene terephthalate film (product name "CP170U", manufactured by Nitto Denko Corporation), a first protective film, which was a polyethylene terephthalate film (product name "SAT TM40125TG", manufactured by Sun A. Kaken Co., Ltd.) having a thickness of 125 μm, was peelably provided on the surface of the first electroconductive part.

Example B4

In Example B4, an electroconductive film with a protective film was obtained in the same manner as in Example B1, except that a polyethylene terephthalate film (product name "Cosmoshine (registered trademark) A4100"; manufactured by Toyobo Co., Ltd.) having a thickness of 125 μm, instead of a thickness of 50 μm, was used as the light-transmitting base material, and that, instead of the polyethylene terephthalate film (product name "CP170U"; manufactured by Nitto Denko Corporation) having a thickness of 125 μm, a first protective film, which was a polyethylene terephthalate film (product name "E-MASK (registered trademark) TP200"; manufactured by Nitto Denko Corporation) having a thickness of 38 μm, was peelably adhered to the surface of the first electroconductive part.

Example B5

In Examples B5, an electroconductive film with a protective film was obtained in the same manner as in Example B1, except that a polyethylene terephthalate film (product name "Cosmoshine (registered trademark) A4100"; manufactured by Toyobo Co., Ltd.) having a thickness of 125 μm, instead of a thickness of 50 μm, was used as the light-transmitting base material, and that, instead of the polyethylene terephthalate film (product name "SAT TM40125TG", manufactured by Sun A. Kaken Co., Ltd.) having a thickness of 125 μm, a first protective film, which was a polyethylene terephthalate film (product name "CP170U", manufactured by Nitto Denko Corporation) having a thickness of 125 μm, was peelably provided on the surface of the first electroconductive part.

Example B6

In Example B6, an electroconductive film with a protective film was obtained in the same manner as in Example B1, except that, instead of the polyethylene film (product name "SUNYTECT (registered trademark) PAC-3-50THK"; manufactured by Sun A. Kaken Co., Ltd.), a first protective film, which was a polyethylene terephthalate film (product name "E-MASK (registered trademark) TP200"; manufactured by Nitto Denko Corporation) having a thickness of 38 μm, was peelably provided on the surface of the second electroconductive part.

Example B7

An electroconductive film with a protective film was obtained in the same manner as in Example B1, except that a first electroconductive part having a film thickness of 0.1 μm and a second electroconductive part having a film thickness of 0.1 μm were formed using the silver nanowire-containing composition 3 instead of the silver nanowire-containing composition 1.

Example B8

First, a polyethylene terephthalate film (product name "Cosmoshine (registered trademark) A4100"; manufactured by Toyobo Co., Ltd.) having a thickness of 50 μm and carrying an underlayer on one surface was set up as a light-transmitting base material, and the silver nanowire-containing composition 1 was applied at an application dose of 10 mg/m² on the untreated surface that was the opposite side of the light-transmitting base material from the underlayer side. Then, the dispersion medium in the silver nanowire-containing composition 1 was evaporated by dry air blowing at 50° C. at a flow rate of 0.5 m/s for 15 seconds and subsequent dry air blowing at 70° C. at a flow rate of 10 m/s for 30 seconds over the applied silver nanowire-containing composition 1 to place a plurality of silver nanowires on the untreated surface.

Subsequently, the above-mentioned light-transmitting resin composition 1 was applied to cover the silver nanowires and to form a coating film. Then, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to form a light-transmitting resin having a film thickness of 100 nm by curing the coating film, whereby a second electroconductive part that had a film thickness of 100 nm and included the light-transmitting resin and the silver nanowires incorporated in the light-transmitting resin was obtained.

After the second electroconductive part was formed, a second protective film, which was a polyethylene film (product name "SUNYTECT (registered trademark) PAC-3-50THK", manufactured by Sun A. Kaken Co., Ltd.) having a thickness of 50 μm, was peelably provided on the surface of the second electroconductive part.

After the second protective film was provided, the hard coat layer composition 1 was applied on the surface of the underlayer of the light-transmitting base material to form a coating film. Subsequently, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to cure the coating film, whereby a hard coat layer having a film thickness of 2 μm was formed.

After the hard coat layer was formed, the silver nanowire-containing composition 1 was applied at an application dose of 10 mg/m$^2$ on the surface of the hard coat layer without subjecting the hard coat layer to static elimination. Then, the dispersion medium in the silver nanowire-containing composition 1 was evaporated by dry air blowing at 50° C. at a flow rate of 0.5 m/s for 15 seconds and subsequent dry air blowing at 70° C. at a flow rate of 10 m/s for 30 seconds over the applied silver nanowire-containing composition 1 to place a plurality of silver nanowires on the surface of the hard coat layer.

Subsequently, the above-mentioned light-transmitting resin composition 1 was applied to cover the silver nanowires and to form a coating film. Then, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to form a light-transmitting resin having a film thickness of 100 nm by curing the coating film, whereby a first electroconductive part that had a film thickness of 100 nm and included the light-transmitting resin and the silver nanowires incorporated in the light-transmitting resin was obtained.

After the first electroconductive part was formed, a first protective film, which was a polyethylene terephthalate film (product name "CP170U", manufactured by Nitto Denko Corporation) having a thickness of 125 μm, was peelably provided on the surface of the first electroconductive part to obtain an electroconductive film with a protective film.

Example B9

First, a polyethylene terephthalate film (product name "Cosmoshine (registered trademark) A4100"; manufactured by Toyobo Co., Ltd.) having a thickness of 50 μm and carrying an underlayer on one surface was set up as a light-transmitting base material, and the silver nanowire-containing composition 1 was applied at an application dose of 10 mg/m$^2$ on the untreated surface that was the opposite side of the light-transmitting base material from the underlayer side. Then, the dispersion medium in the silver nanowire-containing composition 1 was evaporated by dry air blowing at 50° C. at a flow rate of 0.5 m/s for 15 seconds and subsequent dry air blowing at 70° C. at a flow rate of 10 m/s for 30 seconds over the applied silver nanowire-containing composition 1 to place a plurality of silver nanowires on the untreated surface.

Subsequently, the above-mentioned light-transmitting resin composition 1 was applied to cover the silver nanowires and to form a coating film. Then, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to form a light-transmitting resin having a film thickness of 100 nm by curing the coating film, whereby a second electroconductive part that had a film thickness of 100 nm and included the light-transmitting resin and the silver nanowires incorporated in the light-transmitting resin was obtained.

After the second electroconductive part was formed, a second protective film, which was a polyethylene film (product name "SUNYTECT (registered trademark) PAC-3-50THK", manufactured by Sun A. Kaken Co., Ltd.) having a thickness of 50 μm, was peelably provided on the surface of the second electroconductive part.

After the second protective film was provided, the hard coat layer composition 1 was applied on the surface of the underlayer of the light-transmitting base material to form a coating film. Subsequently, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to cure the coating film, whereby a hard coat layer having a film thickness of 2 μm was formed.

After the hard coat layer was formed, the silver nanowire-containing composition 1 was applied at an application dose of 10 mg/m$^2$ on the surface of the hard coat layer without subjecting the hard coat layer to static elimination. Then, the dispersion medium in the silver nanowire-containing composition 1 was evaporated by dry air blowing at 50° C. at a flow rate of 0.5 m/s for 15 seconds and subsequent dry air blowing at 70° C. at a flow rate of 10 m/s for 30 seconds over the applied silver nanowire-containing composition 1 to place a plurality of silver nanowires on the surface of the hard coat layer.

Subsequently, the above-mentioned light-transmitting resin composition 1 was applied to cover the silver nanowires and to form a coating film. Then, the formed coating film was dried by dry air blowing at 50° C. at a flow rate of 0.5 m/s for 15 seconds and subsequent dry air blowing at 70°

C. at a flow rate of 10 m/s for 30 seconds over the coating film to evaporate the solvent in the coating film, and then exposed to ultraviolet light to a cumulative light dose of 100 mJ/cm$^2$ to form a light-transmitting resin having a film thickness of 100 nm by curing the coating film, whereby a first electroconductive part having a film thickness of 100 nm and including the light-transmitting resin and the silver nanowires incorporated in the light-transmitting resin was obtained to obtain an electroconductive film.

Meanwhile, the hard coat layer composition 3 was applied on one face of another polyethylene terephthalate base material (product name "Cosmoshine (registered trademark) A4300"; manufactured by Toyobo Co., Ltd.) having a thickness of 100 μm to form a coating film. Subsequently, dry air at 70° C. was blown at a flow rate of 10 m/s for 30 seconds over the formed coating film, which was thus dried to evaporate the solvent in the coating film.

Then, the electroconductive film was brought into contact with the dried coating film in such a manner that the first electroconductive part was brought into contact with the coating film, and with this state maintained, the electroconductive film was exposed to ultraviolet light to a cumulative light dose of 100 mJ/cm$^2$ to cure the coating film. Thus, a polyethylene terephthalate base material provided peelably provided on the surface of the first electroconductive part and a first protective film adhered to the first electroconductive part and composed of a hard coat layer having a thickness of 6 μm were obtained to obtain an electroconductive film with a protective film.

Example B10

In Example B10, an electroconductive film was obtained in the same manner as in Example B1, except that, instead of the polyethylene terephthalate film (product name "Cosmoshine (registered trademark) A4100"; manufactured by Toyobo Co., Ltd.), a cycloolefin polymer film (product name "ZEONOR Film (registered trademark) ZF16"; manufactured by Zeon Corporation) having a thickness of 25 μm was used as the light-transmitting base material, and that the hard coat layer composition 2 was used instead of the hard coat layer composition 1.

Example B11

In Example B11, an electroconductive film was obtained in the same manner as in Example B1, except that, instead of the polyethylene terephthalate film, a polyimide film having a structure represented by the above-mentioned chemical formula (1) and having a thickness of 50 μm was used as the light-transmitting base material.

Example B12

First, a polyethylene terephthalate film (product name "Cosmoshine (registered trademark) A4300"; manufactured by Toyobo Co., Ltd.) having a thickness of 50 μm and carrying underlayers on both faces was set up as a light-transmitting base material, and the hard coat layer composition 1 was applied on the surface of one underlayer of the light-transmitting base material to form a coating film. Subsequently, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to cure the coating film, whereby a hard coat layer having a film thickness of 2 μm was formed. Additionally, a hard coat layer having a film thickness of 2 μm was formed on the surface of the other underlayer of the polyethylene terephthalate film in the same manner.

After the hard coat layers were formed on both faces, the hard coat layers were each subjected to static elimination. The static elimination was carried out using a voltage application type static eliminator (product name "SJ-H156A", manufactured by Keyence Corporation). The static eliminator was placed 50 mm apart from the hard coat layer.

After the hard coat layer was each subjected to static elimination, the silver nanowire-containing composition 1 was applied at an application dose of 10 mg/m$^2$ on the surface of one hard coat layer. Then, the dispersion medium in the silver nanowire-containing composition 1 was evaporated by dry air blowing at 50° C. at a flow rate of 0.5 m/s for 15 seconds and subsequent dry air blowing at 70° C. at a flow rate of 10 m/s for 30 seconds over the applied silver nanowire-containing composition 1 to place a plurality of silver nanowires on the surface of this hard coat layer.

Subsequently, the above-mentioned light-transmitting resin composition 1 was applied to cover the silver nanowires and to form a coating film. Then, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to form a light-transmitting resin having a film thickness of 100 nm by curing the coating film, whereby a second electroconductive part that had a film thickness of 100 nm and included the light-transmitting resin and the silver nanowires incorporated in the light-transmitting resin was obtained.

After the second electroconductive part was formed, a second protective film, which was a polyethylene film (product name "SUNYTECT (registered trademark) PAC-3-50THK", manufactured by Sun A. Kaken Co., Ltd.) having a thickness of 50 μm, was peelably provided on the surface of the second electroconductive part.

After the second protective film was provided, the silver nanowire-containing composition 1 was applied at an application dose of 10 mg/m$^2$ on the surface of the other hard coat layer. Then, the dispersion medium in the silver nanowire-containing composition 1 was evaporated by dry air blowing at 50° C. at a flow rate of 0.5 m/s for 15 seconds and subsequent dry air blowing at 70° C. at a flow rate of 10 m/s for 30 seconds over the applied silver nanowire-containing composition 1 to place a plurality of silver nanowires on the surface of this hard coat layer.

Subsequently, the above-mentioned light-transmitting resin composition 1 was applied to cover the silver nanowires and to form a coating film. Then, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to form a light-transmitting resin having a film thickness of 100 nm by curing the coating film, whereby a first electroconductive part that had a film thickness of 100 nm and included the light-transmitting resin and the silver nanowires incorporated in the light-transmitting resin was obtained.

After the first electroconductive part was formed, a first protective film, which was a polyethylene terephthalate film (product name "CP170U", manufactured by Nitto Denko Corporation) having a thickness of 125 μm, was peelably provided on the surface of the first electroconductive part to obtain an electroconductive film with a protective film.

Example B13

In Example B13, an electroconductive film was obtained in the same manner as in Example B12, except that the film thickness of each of both hard coat layers was 1 μm.

Example B14

In Example B14, an electroconductive film was obtained in the same manner as in Example B13, except that a polyethylene terephthalate film (product name "Cosmoshine (registered trademark) A4300"; manufactured by Toyobo Co., Ltd.) having a thickness of 38 μm and carrying underlayers on both surfaces was used instead of the polyethylene terephthalate film (product name "Cosmoshine A4300"; manufactured by Toyobo Co., Ltd.) having a thickness of 50 μm and carrying underlayers on both surfaces.

Example B15

In Example B15, an electroconductive film was obtained in the same manner as in Example B13, except that a cycloolefin polymer film (product name "ZEONOR Film (registered trademark) ZF16"; manufactured by Zeon Corporation) having a thickness of 50 μm was used instead of the polyethylene terephthalate film, and that the hard coat layer composition 2 was used instead of the hard coat layer composition 1.

Example B16

In Example B16, an electroconductive film was obtained in the same manner as in Example B13, except that a cycloolefin polymer film (product name "ZEONOR Film (registered trademark) ZF16"; manufactured by Zeon Corporation) having a thickness of 25 μm was used instead of the polyethylene terephthalate film, and that the hard coat layer composition 2 was used instead of the hard coat layer composition 1.

Example B17

In Example B17, an electroconductive film was obtained in the same manner as in Example B13, except that a polyimide film having a structure represented by the above-mentioned chemical formula (1) and having a thickness of 80 μm was used instead of the polyethylene terephthalate film.

Example B18

In Example B18, an electroconductive film was obtained in the same manner as in Example B13, except that a polyimide film having a structure represented by the above-mentioned chemical formula (1) and having a thickness of 30 μm was used instead of the polyethylene terephthalate film.

Comparative Example B1

In Comparative Example B1, an electroconductive film with a protective film was obtained in the same manner as in Example B1, except that the polyethylene terephthalate film (product name "CP170U", manufactured by Nitto Denko Corporation) was not provided on the surface of the first electroconductive part. In other words, the electroconductive film with the protective film according to Comparative Example B1 had the second protective film, which was a polyethylene film (product name "SUNYTECT (registered trademark) PAC-3-50THK", manufactured by Sun A. Kaken Co., Ltd.), peelably provided on the surface of the electroconductive film, and the back face of the electroconductive film was exposed.

Comparative Example B2

In Comparative Example B2, an electroconductive film with protective films was obtained in the same manner as in Example B1, except that, instead of the polyethylene terephthalate film (product name "CP170U"; manufactured by Nitto Denko Corporation), the second protective film, which was a polyethylene film (product name "SUNYTECT (registered trademark) PAC-3-50THK", manufactured by Nitto Denko Corporation) having a thickness of 50 μm, was provided on the surface of the first electroconductive part. In other words, the electroconductive film with the protective films according to Comparative Example B2 had the second protective film, which was a polyethylene film (product name "SUNYTECT (registered trademark) PAC-3-50THK", manufactured by Sun A. Kaken Co., Ltd.), peelably provided on both the surface and back face of the electroconductive film.

Comparative Example B3

In Comparative Example B3, an electroconductive film with a protective film was obtained in the same manner as in Example B1, except that, instead of the polyethylene terephthalate film (product name "CP170U"; manufactured by Nitto Denko Corporation), the first protective film, which was a polyethylene terephthalate film (product name "SUNYTECT (registered trademark) NSA33T"; manufactured by Sun A. Kaken Co., Ltd.) having a thickness of 38 μm, was provided on the surface of the first electroconductive part. In other words, the electroconductive film with the protective film according to Comparative Example B3 had the first protective film, which was a polyethylene terephthalate film (product name "SUNYTECT (registered trademark) NSA33T", manufactured by Sun A. Kaken Co., Ltd.), peelably provided on the surface of the electroconductive film, and the back face of the electroconductive film was exposed.

<Heat Resistance Test>

On the electroconductive films with the protective films according to Examples B1 to B18 and Comparative Examples B1 to B3, a heating test was carried out to check whether the protective film was melted. Specifically, a heating test in which a piece having a size 100 mm long×100 mm wide cut out of the electroconductive film with the protective films was heated at 150° C. for 60 minutes was carried out to check whether the protective film was melted during the heating test. On the electroconductive films with the protective films according to Examples B1 to B5 and B7 to B18, however, the heating test was carried out, with the polyethylene film as the second protective film peeled away. Whether the protective film was melted during the heating test was visually observed. The evaluation criteria were as described below.

○: the protective film was not melted.
  x: the protective film was melted.

<Thermal Shrinkage Ratio>

With all protective films peeled away from the electroconductive films with the protective films according to Example B1 to B18, the electroconductive films and the first protective films were each subjected to a heating test; the thermal shrinkage ratios of the first protective film and the light-transmitting base material in a first direction and a second direction orthogonal to the first direction were each determined; and the absolute value of a difference between the thermal shrinkage ratio of the first protective film and the thermal shrinkage ratio of the light-transmitting base material in the first direction, and the absolute value of a difference between the thermal shrinkage ratio of the first protective film and the thermal shrinkage ratio of the light-transmitting base material in the second direction were determined. Specifically, a piece having a size 100 mm long×100 mm wide was first cut out of the electroconductive film with the protective films, any direction was defined as the first direction, and a direction orthogonal to the first direction was defined as a second direction. Then, all protective films were peeled away from the cut piece of the electroconductive film with the protective films; in an environment at a temperature of 23° C. and a relative humidity of 50%, the lengths of the electroconductive film and the first protective film in the first direction were each measured three times; the lengths of the electroconductive film and the first protective film in the second direction were each measured three times; the arithmetic mean values of the lengths of the electroconductive film and the first protective film in the first direction before the heating test were each determined; and the arithmetic mean values of the lengths of the electroconductive film and the first protective film in the second direction were each determined. Then, a heating test in which the electroconductive film and the first protective film were each heated at 150° C. for 60 minutes was carried out. The heating test was carried out using a heating device (product name "HISPEC Horizontal Type, 200° C. Series", manufactured by Kusumoto Chemicals, Ltd.). Then, the electroconductive film and the first protective film were taken away from the heating device; in an environment at 25° C. and a relative humidity of 50%, 10 minutes after completion of the heating, the lengths of the electroconductive film and the first protective film in the first direction were each measured three times; the lengths of the electroconductive film and the first protective film in the second direction were each measured three times; the arithmetic mean values of the lengths of the electroconductive film and the first protective film in the first direction after the heating test were each determined; and the arithmetic mean values of the lengths of the electroconductive film and the first protective film in the second direction were each determined. Then, using these arithmetic mean values, the thermal shrinkage ratios of the electroconductive film and the first protective film in the first direction were each determined in accordance with the above-mentioned equation (5), and the thermal shrinkage ratios of the electroconductive film and the first protective film in the second direction were each determined in accordance with the above-mentioned equation (6). Then, the absolute value of the difference between the thermal shrinkage ratio of the first protective film and the thermal shrinkage ratio of the light-transmitting base material in the first direction, and the absolute value of the difference between the thermal shrinkage ratio of the first protective film and the thermal shrinkage ratio of the light-transmitting base material in the second direction were determined. Here, the thermal shrinkage ratios were measured, with the electroconductive film and the first protective film placed on a flat table.

<Amount of Curl>

On the electroconductive films with the protective films according to Examples B1 to B18 and Comparative Examples B1 to B3, a heating test was carried out to measure the amount of curl after the heating test. Specifically, a heating test in which a piece having a size 340 mm long×340 mm wide cut out of the electroconductive film with the protective films was heated at 150° C. for 60 minutes was carried out. Here, on the electroconductive films with the protective films according to Examples B1 to B5 and B7 to B18, the heating test was carried out, with the second protective film peeled away. Additionally, on the electroconductive films with the protective films according to Example B4 and Comparative Examples B1 to B3, the heating test was carried, with the protective film not peeled away. The heating test was carried out using a heating device (product name "HISPEC Horizontal Type, 200° C. Series", manufactured by Kusumoto Chemicals, Ltd.). In this case, the electroconductive film with the protective films was placed with the protective film facing downward in the heating device. Then, the electroconductive film with the protective films was taken out of the heating device, and the amount of curl was measured in an environment at a temperature of 23° C. and a relative humidity of 50%, 10 minutes after completion of the heating. The amount of curl was measured as: the average value of the heights up to which the four corners of the electroconductive film with the protective films or the electroconductive film were curled, in cases where the four corners were curled upward from a flat table; or the height of the position in the central portion of the electroconductive film with the protective films or the electroconductive film, the position being the most apart from the table, in cases where the central portion of the electroconductive film with the protective films or the electroconductive film was curled upward from the table; wherein the electroconductive film with the protective films or the electroconductive film after the heating test was placed on the table with the protective film facing the table. In cases where the upper face of the electroconductive film with the protective films was curled in recessed form, the amount of curl was defined as positive (+), and in cases where the upper face of the electroconductive film with the protective films was curled in protruding form, the amount of curl was defined as negative (−).

<Surface Resistance Value Difference Ratio>

All protective films were peeled away from the electroconductive films with the protective films according to Examples B1 to B18, and with each electroconductive film alone, the surface resistance values of the first electroconductive part and the second electroconductive part were each measured to determine the difference ratio: how different the surface resistance value of the second electroconductive part is from the surface resistance value of the first electroconductive part. The surface resistance values of the first electroconductive part and the second electroconductive part were each measured on the same measurement conditions as the surface resistance values of the first electroconductive part and the second electroconductive part in Examples A, and the surface resistance value difference ratio was determined in accordance with the same equation as that for determining the surface resistance difference ratio in Examples A.

<Measurement of Total Light Transmittance>

All protective films were peeled away from the electroconductive films with the protective films according to Examples B1 to B18, and with each electroconductive film alone, the total light transmittance was measured using a haze meter (product name "HM-150", manufactured by Murakami Color Research Laboratory Co., Ltd.) in the same manner and on the same measurement conditions as the total light transmittance in Examples A.

<Measurement of Haze>

All protective films were peeled away from the electroconductive films with the protective films according to Examples B1 to B18, and with each electroconductive film alone, the haze value (total haze value) of the electroconductive film was measured using a haze meter (product name "HM-150", manufactured by Murakami Color Research Laboratory Co., Ltd.) in the same manner and on the same measurement conditions as the haze value in Examples A.

<Flexibility>

(1) Evaluation of Resistance Value Before and After Successive Foldability Test

All protective films were peeled away from the electroconductive films with the protective films according to Examples B13 to B18, and with each electroconductive film alone, a successive foldability test was carried out to evaluate the resistance values before and after the successive foldability test. The resistance value was evaluated by the same method as the method of evaluating flexibility in Examples A. Additionally, the successive foldability test in the evaluation of the resistance value was carried out on the same test conditions as the successive foldability test in Examples A, and the electrical resistance value was measured on the same measurement conditions as the electrical resistance value in Examples A. Then, the results were evaluated on the basis of the following evaluation criteria. The arithmetic mean of three measurements was determined as the electrical resistance value ratio.

⊙: the electrical resistance value ratio was 1.5 or less for both of the first electroconductive part and the second electroconductive part.

○: the electrical resistance value ratio was 1.5 or less for one of the first electroconductive part and the second electroconductive part, but more than 1.5 and 3 or less for the other.

x: the electrical resistance value ratio was more than 3 for one of the first electroconductive part and the second electroconductive part.

(2) Evaluation of Crease after Successive Foldability Test

All protective films were peeled away from the electroconductive films with the protective films according to Examples B13 to B18, and with each electroconductive film alone, a successive foldability test was carried out to observe the appearance and evaluate the bent part of the electroconductive film for any crease. The successive foldability test was carried out on the same test conditions as the successive foldability test in Examples A. Here, no creases were observed in observing the region corresponding to the bent part of each electroconductive film before the successive foldability test. The creases were observed in the same manner and on the same conditions as in Examples A. The evaluation criteria were as below-mentioned.

(Creases)

○: no crease was observed on the electroconductive film after the successive foldability test.

Δ: a few creases were observed on the electroconductive film after the successive foldability test but at a level which was not problematic for practical usage.

x: some creases were clearly observed on the electroconductive film after the successive foldability test.

(3) Evaluation of Microcrack After Successive Foldability Test

All protective films were peeled away from the electroconductive films with the protective films according to Examples B13 to B18, and with each electroconductive film alone, a successive foldability test was carried out to observe the appearance and evaluate the bent part of the electroconductive film for any microcrack. The successive foldability test was carried out on the same test conditions as the successive foldability test in Examples A. Here, no microcrack was observed in observing the region corresponding to the bent part of each electroconductive film before the successive foldability test. The microcracks were observed in the same manner and on the same conditions as in Examples A. The evaluation criteria were as below-mentioned.

(Microcracks)

○: no microcrack was observed on the electroconductive film after the successive foldability test.

Δ: a few microcracks were observed on the electroconductive film after the successive foldability test but at a level which was not problematic for practical usage.

x: some microcracks were clearly observed on the electroconductive film after the successive foldability test.

The results are shown in Tables 3 to 6 below.

TABLE 3

| | First protective film | Second protective film | Thickness First protective film (μm) | Thickness Light-transmitting base material (μm) | Ratio (%) |
|---|---|---|---|---|---|
| Example B1 | provided (one face) | provided (one face) | 125 | 50 | 250 |
| Example B2 | provided (one face) | provided (one face) | 38 | 50 | 76 |
| Example B3 | provided (one face) | provided (one face) | 125 | 50 | 250 |
| Example B4 | provided (one face) | provided (one face) | 38 | 125 | 30 |
| Example B5 | provided (one face) | provided (one face) | 125 | 125 | 100 |
| Example B6 | provided (both faces) | not provided | 38,125 | 50 | 76,250 |
| Example B7 | provided (one face) | provided (one face) | 125 | 50 | 250 |
| Example B8 | provided (one face) | provided (one face) | 125 | 50 | 250 |
| Example B9 | provided (one face) | provided (one face) | 106 | 50 | 212 |
| Example B10 | provided (one face) | provided (one face) | 125 | 25 | 500 |
| Example B11 | provided (one face) | provided (one face) | 125 | 50 | 250 |
| Example B12 | provided (one face) | provided (one face) | 125 | 50 | 250 |
| Example B13 | provided (one face) | provided (one face) | 125 | 50 | 250 |
| Example B14 | provided (one face) | provided (one face) | 125 | 38 | 329 |

TABLE 3-continued

| | First protective film | Second protective film | Thickness First protective film (μm) | Light-transmitting base material (μm) | Ratio (%) |
|---|---|---|---|---|---|
| Example B15 | provided (one face) | provided (one face) | 125 | 50 | 250 |
| Example B16 | provided (one face) | provided (one face) | 125 | 25 | 500 |
| Example B17 | provided (one face) | provided (one face) | 125 | 80 | 156 |
| Example B18 | provided (one face) | provided (one face) | 125 | 30 | 417 |
| Comparative Example B1 | not provided | provided (one face) | — | — | — |
| Comparative Example B2 | not provided | provided (both faces) | — | — | — |
| Comparative Example B3 | provided (one face) | not provided | 38 | 50 | 76 |

TABLE 4

| | Heat resistance | Thermal shrinkage ratio in first direction (%) | | | Thermal shrinkage ratio in second direction (%) | | | Amount of curl (mm) |
|---|---|---|---|---|---|---|---|---|
| | | First protective film | Light-transmitting base material | Difference | First protective film | Light-transmitting base material | Difference | |
| Example B1 | ○ | 0.48 | 0.42 | 0.06 | −0.05 | −0.03 | 0.02 | 8.2 |
| Example B2 | ○ | 0.53 | 0.42 | 0.16 | −0.15 | −0.03 | 0.12 | 7.0 |
| Example B3 | ○ | 0.54 | 0.42 | 0.10 | 0.06 | −0.03 | 0.09 | 4.3 |
| Example B4 | ○ | 0.53 | 0.37 | 0.16 | −0.15 | 0.07 | 0.22 | 9.7 |
| Example B5 | ○ | 0.48 | 0.37 | 0.11 | −0.05 | 0.07 | 0.12 | 6.2 |
| Example B6 | ○ | 0.48 | 0.42 | 0.16 | −0.1 | −0.03 | 0.07 | 6.5 |
| Example B7 | ○ | 0.48 | 0.42 | 0.04 | −0.05 | −0.03 | 0.02 | 8.2 |
| Example B8 | ○ | 0.48 | 0.42 | 0.04 | −0.05 | −0.03 | 0.02 | 8.2 |
| Example B9 | ○ | 0.46 | 0.42 | 0.04 | 0.18 | −0.03 | 0.21 | 3.0 |
| Example B10 | ○ | 0.48 | 0.20 | 0.28 | −0.05 | 0.09 | −0.14 | 3.7 |
| Example B11 | ○ | 0.48 | 0.26 | 0.22 | −0.05 | 0.06 | −0.11 | 2.8 |
| Example B12 | ○ | 0.48 | 0.78 | −0.30 | −0.05 | 0.25 | −0.30 | 0.0 |
| Example B13 | ○ | 0.48 | 0.78 | −0.30 | −0.05 | 0.25 | −0.30 | 0.0 |
| Example B14 | ○ | 0.48 | 0.76 | −0.28 | −0.05 | 0.22 | −0.27 | 0.0 |
| Example B15 | ○ | 0.48 | 0.19 | 0.29 | −0.05 | 0.09 | −0.14 | 4.0 |
| Example B16 | ○ | 0.48 | 0.20 | 0.28 | −0.05 | 0.09 | −0.14 | 3.7 |
| Example B17 | ○ | 0.48 | 0.20 | 0.28 | −0.05 | 0.12 | −0.17 | 2.9 |
| Example B18 | ○ | 0.48 | 0.26 | 0.22 | −0.05 | 0.06 | −0.11 | 2.8 |
| Comparative Example B1 | X | — | — | — | — | — | — | impossible to measure |
| Comparative Example B2 | X | — | — | — | — | — | — | impossible to measure |
| Comparative Example B3 | ○ | 1.25 | 0.42 | 0.83 | −0.01 | −0.03 | 0.02 | −15 |

TABLE 5

| | Surface resistance value | | | Total light transmittance (%) | Haze value (%) |
|---|---|---|---|---|---|
| | First electroconductive part (Ω/□) | Second electroconductive part (Ω/□) | Difference ratio (%) | | |
| Example B1 | 52 | 50 | −3.8 | 90.7 | 1.3 |
| Example B2 | 52 | 50 | −3.8 | 90.7 | 1.3 |
| Example B3 | 52 | 50 | −3.8 | 90.7 | 1.3 |
| Example B4 | 52 | 50 | −3.8 | 90.7 | 1.3 |
| Example B5 | 52 | 50 | −3.8 | 90.7 | 1.3 |
| Example B6 | 52 | 50 | −3.8 | 90.7 | 1.3 |
| Example B7 | 52 | 50 | −3.8 | 90.7 | 1.3 |
| Example B8 | 50 | 69 | 38.0 | 91.3 | 1.4 |
| Example B9 | 50 | 69 | 38.0 | 91.3 | 1.4 |
| Example B10 | 50 | 49 | −2.0 | 90.1 | 1.1 |
| Example B11 | 45 | 50 | 11.1 | 87.5 | 1.6 |
| Example B12 | 52 | 48 | −7.7 | 90.1 | 1.3 |
| Example B13 | 52 | 48 | −7.7 | 90.1 | 1.3 |

TABLE 5-continued

| | Surface resistance value | | | | |
|---|---|---|---|---|---|
| | First electroconductive part (Ω/□) | Second electroconductive part (Ω/□) | Difference ratio (%) | Total light transmittance (%) | Haze value (%) |
| Example B14 | 51 | 50 | −2.0 | 89.8 | 1.3 |
| Example B15 | 52 | 49 | −5.8 | 90.0 | 1.1 |
| Example B16 | 50 | 50 | 0.0 | 89.9 | 1.0 |
| Example B17 | 53 | 57 | 7.5 | 87.8 | 1.6 |
| Example B18 | 53 | 51 | −3.8 | 87.4 | 1.5 |

TABLE 6

| | Flexibility | | | | | | | | |
|---|---|---|---|---|---|---|---|---|---|
| | φ 4 mm/100,000 times | | | φ 4 mm/200,000 times | | | φ 3 mm/300,000 times | | |
| | Electrical resistance value ratio | Crease | Microcrack | Electrical resistance value ratio | Crease | Microcrack | Electrical resistance value ratio | Crease | Microcrack |
| Example B13 | ⊙ | Δ | Δ | — | — | — | — | — | — |
| Example B14 | ⊙ | ○ | ○ | ⊙ | Δ | ○ | ⊙ | Δ | Δ |
| Example B15 | ⊙ | Δ | Δ | — | — | — | — | — | — |
| Example B16 | ⊙ | ○ | ○ | ⊙ | ○ | ○ | ⊙ | ○ | ○ |
| Example B17 | ⊙ | Δ | ○ | — | — | — | — | — | — |
| Example B18 | ⊙ | ○ | ○ | ⊙ | ○ | ○ | ⊙ | Δ | ○ |

From the heat resistance results, it can be understood that the second protective films were melted when the electroconductive films with the protective films according to Comparative Examples B1 and B2 were heated with the second protective film provided on the electroconductive film. Because of this, the second protective film needs to be peeled away in the heating step. In contrast, it can be understood that the first protective films were not melted even when the electroconductive films with the protective films according to Examples B1 to B18 were heated with the first protective film provided on the electroconductive film. Because of this, it can be understood that the first protective film does not need to be peeled away in the heating step.

The electroconductive films with the protective films according to Comparative Examples B1 and B2 were subjected to the heating test with the second protective film provided, and thus, were curled markedly, making it impossible to measure the amount of curl after the heating test. Additionally, the electroconductive film with the protective films according to Comparative Example B3 was subjected to the heating test with the first protective film provided, and the thermal shrinkage ratio difference between the first protective film and the light-transmitting base material was large, thus causing the amount of curl after the heating test to be large. In contrast, the electroconductive films with the protective films according to Examples B1 to B18 were subjected to the heating test with the first protective film provided, and the thermal shrinkage ratio difference between the first protective film and the light-transmitting base material was small, thus causing the amount of curl after the heating test to be small.

In the electroconductive film obtained by peeling the first protective film and the second protective film away from the electroconductive film with the protective films according to Example B8, the surface resistance value of the second electroconductive part was out of the range of ±30% of the surface resistance value of the first electroconductive part, and thus, the difference ratio between the electrical resistance value of the first electroconductive part and the electrical resistance value the second electroconductive part was high. In contrast, in the electroconductive film obtained by peeling the first protective film and the second protective film away from the electroconductive film with the protective films according to Examples B1 to B7 and B9 to B18, the surface resistance value of the second electroconductive part was within the range of ±30% of the surface resistance value of the first electroconductive part, and thus, the difference ratio between the electrical resistance value of the first electroconductive part and the electrical resistance value of the second electroconductive part was under control.

The polyethylene terephthalate film in the electroconductive film according to Example B14 had a smaller thickness than that in the electroconductive film according to Example B13, and thus, the electroconductive film according to Example B14 had better flexibility than the electroconductive film according to Example B13. Additionally, the cycloolefin polymer film in the electroconductive film according to Example B16 had a smaller thickness than that in the electroconductive film according to Example B15, and thus, the electroconductive film according to Example A16 had better flexibility than the electroconductive film according to Example B15. The polyethylene terephthalate film in the electroconductive film according to Example B18 had a smaller thickness than that in the electroconductive film according to Example B17, and thus, the electroconductive film according to Example B18 had better flexibility than the electroconductive film according to Example B17. When the electroconductive film including hard coat layers on both faces of the light-transmitting base material is subjected to the above-mentioned successive foldability test, one of the hard coat layers is necessarily bent, facing outward, which is what is called outward bending, and thus, the hard coat layers are more likely to generate microcracks, but in the electroconductive films according to Examples B13 to B18, no microcrack was observed, or a few microcracks were observed but at a level that was not problematic for practical usage. In this regard, the electroconductive films according to Examples B16 and B18 were evaluated for flexibility with a gap of 2 mm and by repeating the folding and unfolding process three hundred thousand times, and afforded the same results as the evaluation results obtained with a gap of 3 mm and by repeating the folding and unfolding process three hundred thousand times.

Before and after the successive foldability test was carried out on the electroconductive film according to each of Examples B13 to B18, a portion at and around the interface between each film as a light-transmitting base material and the hard coat layer was observed using the above-mentioned digital microscope on the above-mentioned conditions, with the result that none of peeling and the like was observed, and that the adhesion was favorable.

The indentation hardnesses of the hard coat layer and the light-transmitting base material in the electroconductive film with the protective films according to each of Examples B1 to B18 were measured in the same manner and on the same measurement conditions as in the indentation hardnesses in Examples A, with the result that the hard coat layer had a higher indentation hardness than the light-transmitting base material.

LIST OF REFERENCE NUMERALS 10, 30, 40, 120, 170: Electroconductive film
10A, 120A: Surface
10B, 120B: Back face
11, 41, 122: First electroconductive part
12, 31, 124, 131: Resin layer
13, 121: Light-transmitting base material
14, 42, 123: Second electroconductive part
15, 17, 45, 47, 125, 127: Electroconductive fibers
16, 18, 46, 48, 126, 128: Light-transmitting resin
50: Image display device
60: Display panel
62: Display element
80: Touch Panel
110, 180, 200: Electroconductive film with protective film
130, 190, 210: First protective film
140: Second protective film

The invention claimed is:

1. An electroconductive film comprising a first electroconductive part and a second electroconductive part,
wherein a surface of the second electroconductive part forms at least a part of a surface of the electroconductive film,
a surface of the first electroconductive part forms at least a part of a back face of the electroconductive film,
the first electroconductive part and the second electroconductive part each contain electroconductive fibers,
the electroconductive film further comprises a resin layer and a light-transmitting base material in this order from the first electroconductive part toward the second electroconductive part and between the first electroconductive part and the second electroconductive part,
the second electroconductive part directly contacts the light-transmitting base material, and
a difference between a surface resistance value of the second electroconductive part and a surface resistance value of the first electroconductive part is within ±30% of the surface resistance value of the first electroconductive part.

2. An electroconductive film comprising a first electroconductive part and a second electroconductive part,
wherein a surface of the second electroconductive part forms at least a part of a surface of the electroconductive film,
the surface of the first electroconductive part forms at least a part of the back face of the electroconductive film,
the first electroconductive part and the second electroconductive part each contain electroconductive fibers,
the electroconductive film further comprises a resin layer and a light-transmitting base material in this order from the first electroconductive part toward the second electroconductive part and between the first electroconductive part and the second electroconductive part,
the second electroconductive part directly contacts the light-transmitting base material, and
a difference between a line resistance value of the second electroconductive part and a line resistance value of the first electroconductive part is within ±30% of the line resistance value of the first electroconductive part,
wherein the line resistance value of each of the first electroconductive part and the second electroconductive part is measured on a piece having a size 5 mm wide and 100 mm long cut out of the electroconductive film.

3. The electroconductive film according to claim 1, wherein the light-transmitting base material comprises an underlayer on one face thereof, and the resin layer is adjacent to the underlayer.

4. The electroconductive film according to claim 1, wherein the light-transmitting base material comprises a cycloolefin polymer resin, and the light-transmitting base material has a thickness of 45 µm or less.

5. The electroconductive film according to claim 1, wherein the light-transmitting base material comprises a polyester resin, and the light-transmitting base material has a thickness of 45 µm or less.

6. The electroconductive film according to claim 1, wherein the light-transmitting base material comprises at least one of a polyimide resin, a polyamide resin, and a polyamideimide resin, and the light-transmitting base material has a thickness of 75 µm or less.

7. The electroconductive film according to claim 4,
wherein the ratio of the electrical resistance value of the first electroconductive part after a successive foldability test to the electrical resistance value of the first electroconductive part before the successive foldability test is 3 or less, and
the ratio of the electrical resistance value of the second electroconductive part after the successive foldability test to the electrical resistance value of the second electroconductive part before the successive foldability test is 3 or less, and
the successive foldability test is carried out by repeating, one hundred thousand times, a process in which the electroconductive film with the first electroconductive part facing inward is folded by 180 degrees so as to leave a gap of 4 mm between the opposite edges of the electroconductive film and then unfolded.

8. The electroconductive film according to claim 5,
wherein the ratio of the electrical resistance value of the first electroconductive part after a successive foldability test to the electrical resistance value of the first electroconductive part before the successive foldability test is 3 or less, and the ratio of the electrical resistance value of the second electroconductive part after the successive foldability test to the electrical resistance value of the second electroconductive part before the successive foldability test is 3 or less, and the successive foldability test is carried out by repeating, one hundred thousand times, a process in which the electroconductive film with the first electroconductive part facing inward is folded by 180 degrees so as to leave a gap of 4 mm between the opposite edges of the electroconductive film and then unfolded.

9. The electroconductive film according to claim 6, wherein the ratio of the electrical resistance value of the first electroconductive part after a successive foldability test to the electrical resistance value of the first electroconductive part before the successive foldability test is 3 or less, and the ratio of the electrical resistance value of the second electroconductive part after the successive foldability test to the electrical resistance value of the second electroconductive part before the successive foldability test is 3 or less, and wherein the successive foldability test is carried out by repeating, one hundred thousand times, a process in which the electroconductive film with the first electroconductive part facing inward is folded by 180 degrees so as to leave a gap of 4 mm between the opposite edges of the electroconductive film and then unfolded.

10. The electroconductive film according to claim 1, wherein the electroconductive film has a haze value of 5% or less.

11. The electroconductive film according to claim 1, wherein the electroconductive film has a total light transmittance of 80% or more.

12. A sensor comprising the electroconductive film according to claim 1.

13. A touch panel comprising the electroconductive film according to claim 1.

14. An image display device comprising the touch panel according to claim 13.

15. An electroconductive film with a protective film, comprising an electroconductive film and a first protective film peelably provided on at least one face of the electroconductive film, wherein the electroconductive film includes a light-transmitting base material, a first electroconductive part provided on a first face of the light-transmitting base material, and a second electroconductive part provided directly on a second face of the light-transmitting base material opposite from the first face, and the first and second electroconductive parts each containing electroconductive fibers and a light-transmitting resin, the light-transmitting base material has a thickness of 80 micrometers or less, the first protective film is a heat-resistant protective film, and an amount of a curl of the electroconductive film with the protective film is within ±14 mm when the electroconductive film with the protective film is heated at 150° C. for 60 minutes.

16. The electroconductive film with the protective film according to claim 15, wherein, when the first protective film is peeled away from the electroconductive film with the protective film, and the electroconductive film and the first protective film are each heated at 150° ° C. for 60 minutes, the absolute value of a difference between the thermal shrinkage ratio of the first protective film in a first direction and the thermal shrinkage ratio of the light-transmitting base material in the first direction is 0.3% or less, and the absolute value of a difference between the thermal shrinkage ratio of the first protective film in a second direction and the thermal shrinkage ratio of the light-transmitting base material in the second direction is 0.3% or less, wherein the first direction is any direction within the surface of the electroconductive film with the protective film, and the second direction is a direction orthogonal to the first direction within the surface of the electroconductive film with the protective film.

17. The electroconductive film with the protective film according to claim 15, wherein the thickness of the first protective film is 300% or less of the thickness of the light-transmitting base material.

18. The electroconductive film with the protective film according to claim 15, wherein the first protective film is peelably provided on the surface of the first electroconductive part, and the electroconductive film with the protective film further comprises a second protective film that is a non-heat-resistant protective film peelably provided on the surface of the second electroconductive part.

19. The electroconductive film with the protective film according to claim 15, wherein the surface resistance value of the second electroconductive part is within ±30% of the surface resistance value of the first electroconductive part.

20. The electroconductive film with the protective film according to claim 15, further comprising a resin layer provided between the light-transmitting base material and the first electroconductive part.

21. The electroconductive film with the protective film according to claim 15, wherein the light-transmitting base material comprises a cycloolefin polymer resin, and the light-transmitting base material has a thickness of 35 μm or less.

22. The electroconductive film with the protective film according to claim 15, wherein the light-transmitting base material comprises a polyester resin, and the light-transmitting base material has a thickness of 45 μm or less.

23. The electroconductive film with the protective film according to claim 15, wherein the light-transmitting base material comprises at least one of a polyimide resin, a polyamide resin, and a polyamideimide resin, and the light-transmitting base material has a thickness of 75 μm or less.

24. The electroconductive film according to claim 21, wherein the ratio of the electrical resistance value of the first electroconductive part after a successive foldability test to the electrical resistance value of the first electroconductive part before the successive foldability test is 3 or less, and the ratio of the electrical resistance value of the second electroconductive part after the successive foldability test to the electrical resistance value of the second electroconductive part before the successive foldability test is 3 or less, and wherein the successive foldability test is carried out by repeating, one hundred thousand times, a process in which the electroconductive film with the first electroconductive part facing inward is folded by 180 degrees so as to leave a gap of 4 mm between the opposite edges of the electroconductive film and then unfolded.

* * * * *